US012225494B2

(12) United States Patent
Oteri et al.

(10) Patent No.: US 12,225,494 B2
(45) Date of Patent: Feb. 11, 2025

(54) SYSTEMS, METHODS AND APPARATUSES FOR MULTIPLE ACCESS POINT (MULTI-AP) COORDINATION IN WIRELESS LOCAL AREA NETWORKS (WLANS)

(71) Applicant: INTERDIGITAL PATENT HOLDINGS, INC., Wilmington, DE (US)

(72) Inventors: Oghenekome Oteri, San Diego, CA (US); Alphan Sahin, Westbury, NY (US); Xiaofei Wang, North Caldwell, NJ (US); Hanqing Lou, Syosset, NY (US); Li-Hsiang Sun, San Diego, CA (US); Rui Yang, Greenlawn, NY (US); Frank La Sita, Long Beach, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/211,509

(22) Filed: Jun. 19, 2023

(65) Prior Publication Data

US 2024/0040531 A1 Feb. 1, 2024

Related U.S. Application Data

(63) Continuation of application No. 17/292,154, filed as application No. PCT/US2019/060508 on Nov. 8, 2019, now Pat. No. 11,683,774.

(Continued)

(51) Int. Cl.
*H04W 4/00* (2018.01)
*H04W 8/00* (2009.01)
(Continued)

(52) U.S. Cl.
CPC ........... *H04W 60/04* (2013.01); *H04W 8/005* (2013.01); *H04W 84/12* (2013.01)

(58) Field of Classification Search
CPC ..... H04W 60/04; H04W 60/00; H04W 8/005; H04W 84/12; H04W 76/15; H04W 4/00
(Continued)

(56) References Cited

U.S. PATENT DOCUMENTS 10,015,821 B2 6/2018 Oteri et al.
10,159,039 B2 12/2018 Kannan
(Continued)

FOREIGN PATENT DOCUMENTS

| WO | 2014/074919 | 5/2014 |
|----|-------------|--------|
| WO | 2017/124011 | 7/2017 |

OTHER PUBLICATIONS

Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).

(Continued)

*Primary Examiner* — Marceau Milord
(74) *Attorney, Agent, or Firm* — Volpe Koenig

(57) ABSTRACT

Methods and apparatuses are described herein for multiple AP coordination in wireless local area networks (WLANs). For example, a station (STA) may receive, from a first access points (APs), a probe response frame that includes one or more indicators indicating multiple AP operation capabilities of the first AP and a second AP. The STA may transmit, to at least one of the first AP or the second AP, a multiple AP association request frame that enables the first AP to be (Continued)

associated with the second AP for a multiple AP operation. The STA may receive, from the first AP, a first multiple AP association response frame indicating acceptance or rejection of the multiple AP operation with the first AP. The STA may receive, from the second AP, a second multiple AP association response frame indicating acceptance or rejection of the multiple AP operation with the second AP.

20 Claims, 34 Drawing Sheets

Related U.S. Application Data

(60) Provisional application No. 62/873,396, filed on Jul. 12, 2019, provisional application No. 62/815,130, filed on Mar. 7, 2019, provisional application No. 62/790,738, filed on Jan. 10, 2019, provisional application No. 62/757,507, filed on Nov. 8, 2018.

(51) Int. Cl.
*H04W 60/04* (2009.01)
*H04W 84/12* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,683,774 | B2* | 6/2023 | Oteri | H04W 76/15 370/329 |
| 2013/0301607 | A1 | 11/2013 | McCann et al. | |
| 2014/0016628 | A1 | 1/2014 | McCann et al. | |
| 2014/0254422 | A1 | 9/2014 | Mehta | |
| 2014/0269654 | A1 | 9/2014 | Canpolat et al. | |
| 2014/0301260 | A1 | 10/2014 | Park et al. | |
| 2015/0237654 | A1 | 8/2015 | Park et al. | |
| 2015/0295629 | A1 | 10/2015 | Xia et al. | |
| 2016/0105850 | A1 | 4/2016 | Wentink | |
| 2016/0205065 | A1 | 7/2016 | Ghosh et al. | |
| 2016/0234808 | A1 | 8/2016 | Da Silva et al. | |
| 2017/0150540 | A1 | 5/2017 | Li et al. | |
| 2018/0007651 | A1 | 1/2018 | Vamaraju | |
| 2018/0205502 | A1 | 7/2018 | Merlin et al. | |
| 2018/0206143 | A1 | 7/2018 | Patil et al. | |
| 2018/0206174 | A1* | 7/2018 | Zhou | H04B 1/0483 |
| 2018/0206190 | A1 | 7/2018 | Cherian et al. | |
| 2018/0213580 | A1 | 7/2018 | Taskin et al. | |
| 2018/0310240 | A1* | 10/2018 | Kannan | H04W 48/14 |
| 2018/0376467 | A1 | 12/2018 | Patil et al. | |
| 2019/0014538 | A1* | 1/2019 | Patil | H04W 48/10 |
| 2019/0082382 | A1 | 3/2019 | Homchaudhuri et al. | |
| 2019/0132724 | A1* | 5/2019 | Asterjadhi | H04W 8/005 |
| 2019/0150214 | A1 | 5/2019 | Zhou et al. | |
| 2019/0191451 | A1 | 6/2019 | Patil et al. | |

OTHER PUBLICATIONS

Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax D3.0 (Jun. 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Jafar et al., "Degrees of Freedom Region of the MIMO X Channel," IEEE Transactions on Information Theory, vol. 54, Issue 1, pp. 151-170 (Jan. 2008).
Liu et al., "Discussions on Multi-AP Coordination," IEEE 802.11-18/1509r0 (Aug. 22, 2018).
Montemurro, "EHT TIG Agenda," IEEE 802.11-18/1067r2 (Jul. 10, 2018).
Oteri et al., "Coordinated Multi-AP Transmission for EHT," IEEE 802.11-19/0071r0 (Jan. 13, 2019).
Oteri et al., "Technology Features for 802.11 EHT," IEEE 802.11-18/1547r0 (Sep. 7, 2018).
Porat et al., "Constrained Distributed MU-MIMO," IEEE 802.11-18/1439r0 (Sep. 4, 2018).
Srinivasa et al., "AP Coordinated Beamforming for EHT," IEEE 802.11-18/1510r1 (Sep. 10, 2018).
Yang et al., "Considerations on AP Coordination," 802.11-18-1576-01-0eht (Sep. 13, 2018).
Yang et al., "Discussion on EHT Study Group Formation," IEEE 802.11-18/1180r0 (Jul. 9, 2018).

\* cited by examiner

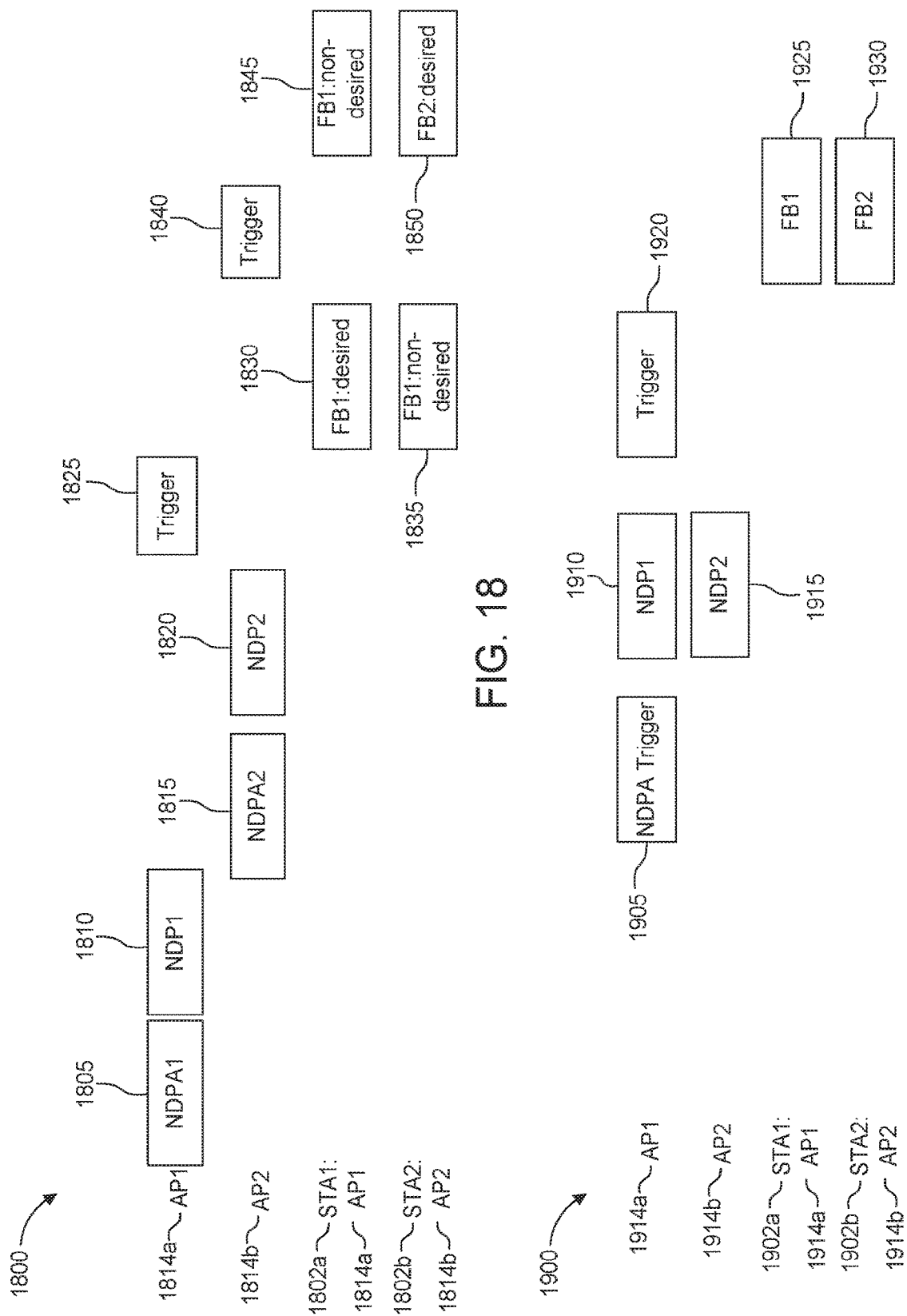

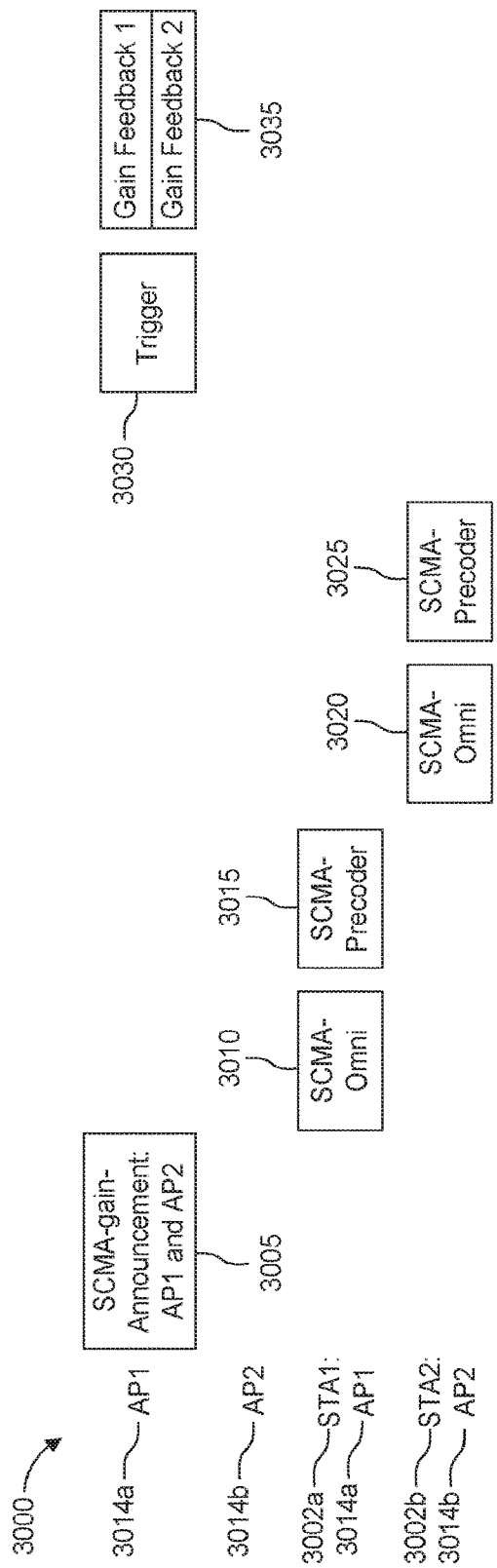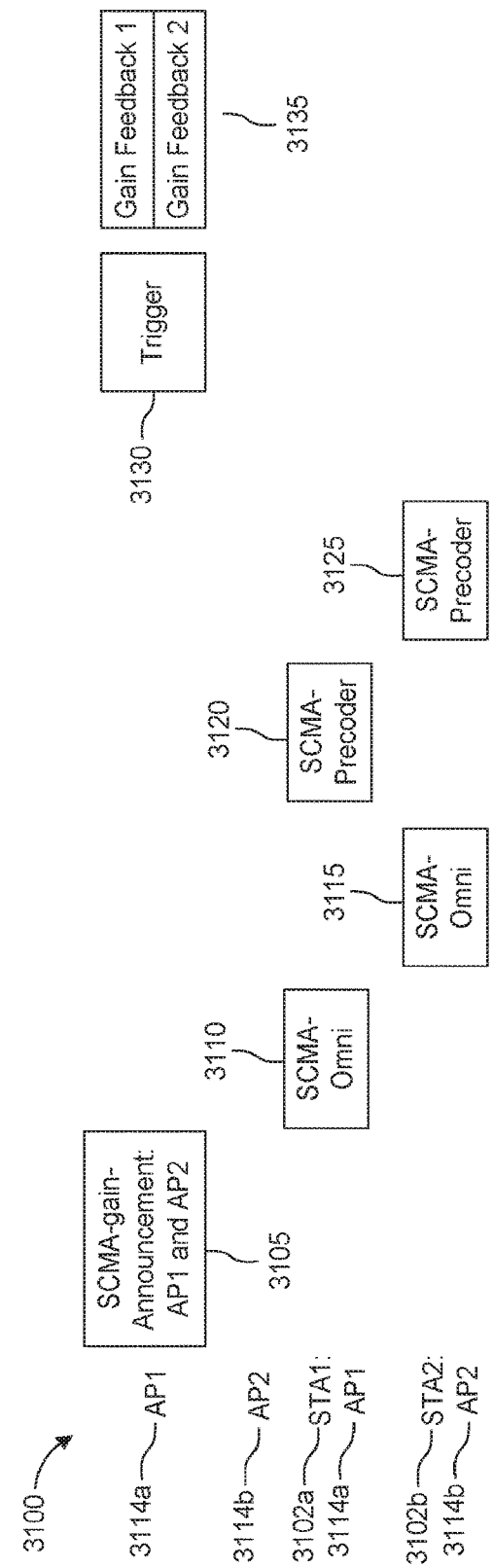

SYSTEMS, METHODS AND APPARATUSES FOR MULTIPLE ACCESS POINT (MULTI-AP) COORDINATION IN WIRELESS LOCAL AREA NETWORKS (WLANS)

CROSS-REFERENCE TO RELATED APPLICATIONS

This application claims the benefit of and priority to U.S. Nonprovisional application Ser. No. 17/292,154, filed May 7, 2021; which claims priority under 35 U.S.C. § 371 to P.C.T. Application No. PCT/US2019/060508, filed Nov. 8, 2019; which claims priority to U.S. Provisional Application No. 62/873,396, filed Jul. 12, 2019; U.S. Provisional Application No. 62/815,130, filed Mar. 7, 2019; U.S. Provisional Application No. 62/790,738, filed Jan. 10, 2019; and U.S. Provisional Application No. 62/757,507, filed Nov. 8, 2018, the contents of each of which are hereby incorporated by reference herein.

BACKGROUND

In the existing wireless networks (e.g., WLAN) implemented by Institute of Electrical and Electronics Engineers (IEEE) 802.11 standards, a station (STA) may send an association request to an access point (AP) to which the STA would like to associate in order to establish the appropriate connection state. If the elements of the association request match the capabilities of the AP, the AP sends an association response to the STA to indicate that the STA is in a member of the basic service set (BSS) where the AP is associated with. In the existing wireless networks, the STA merely exchanges the request and response frames to associate with a single AP, but any support for the multiple AP discovery and multiple AP association from a single STA is not provided. Thus, methods and apparatuses that enable a single STA to discover multiple APs and associate with more than one AP are needed.

SUMMARY

Systems, methods and apparatuses are described herein for multiple AP (or multi-AP) coordination in wireless local area networks (WLANs). For example, a station (STA) may receive, from a first access point (AP), a probe response frame that includes one or more indicators indicating multiple AP operation capabilities of the first AP and a second AP. The multiple AP operation capabilities may comprise a multiple AP joint transmission capability, a multiple AP hybrid automatic repeat request (HARQ) capability, a multiple AP multiple-input multiple-output (MIMO) capability, a dynamic AP selection capability, a multiple AP roaming capability, or a multiple AP coordinated beamforming capability. The STA may then transmit, to at least one of the first AP or the second AP, a multiple AP association request frame that enables the first AP to be associated with the second AP for a multiple AP operation with the STA. Multiple AP operation may include reception of signals by the STA from the first AP and the second AP, for example, using coordinated orthogonal frequency-division multiple access (OFDMA) or coordinated nulling. Upon transmitting the multiple AP association request frame, the STA may receive, from the first AP, a first multiple AP association response frame that indicates acceptance or rejection of the multiple AP operation with the first AP. The STA may also receive, from the second AP, a second multiple AP association response frame that indicates acceptance or rejection of the multiple AP operation with the second AP. On a condition that both the first and second multiple AP association response frames indicate acceptance, the STA may perform the multiple AP operation with the first AP and the second AP.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 11B is a system diagram illustrating an example wireless transmit/receive unit (WTRU) that may be used within the communications system illustrated in FIG. 1A according to an embodiment;

FIG. 18 is a diagram illustrating an example singling flow for independent null data packet announcement (NDPA)/null data packet (NDP) and trigger based feedback;

FIG. 19 is a signaling diagram illustrating an example of master trigger based NDPA/NDP and master trigger based feedback;

FIG. 30 is a diagram illustrating an example of sparse code multiple access (SCMA) gain estimation type 1;

FIG. 31 is a diagram illustrating an example of SCMA gain estimation type 2;

DETAILED DESCRIPTION

Figure 1A:
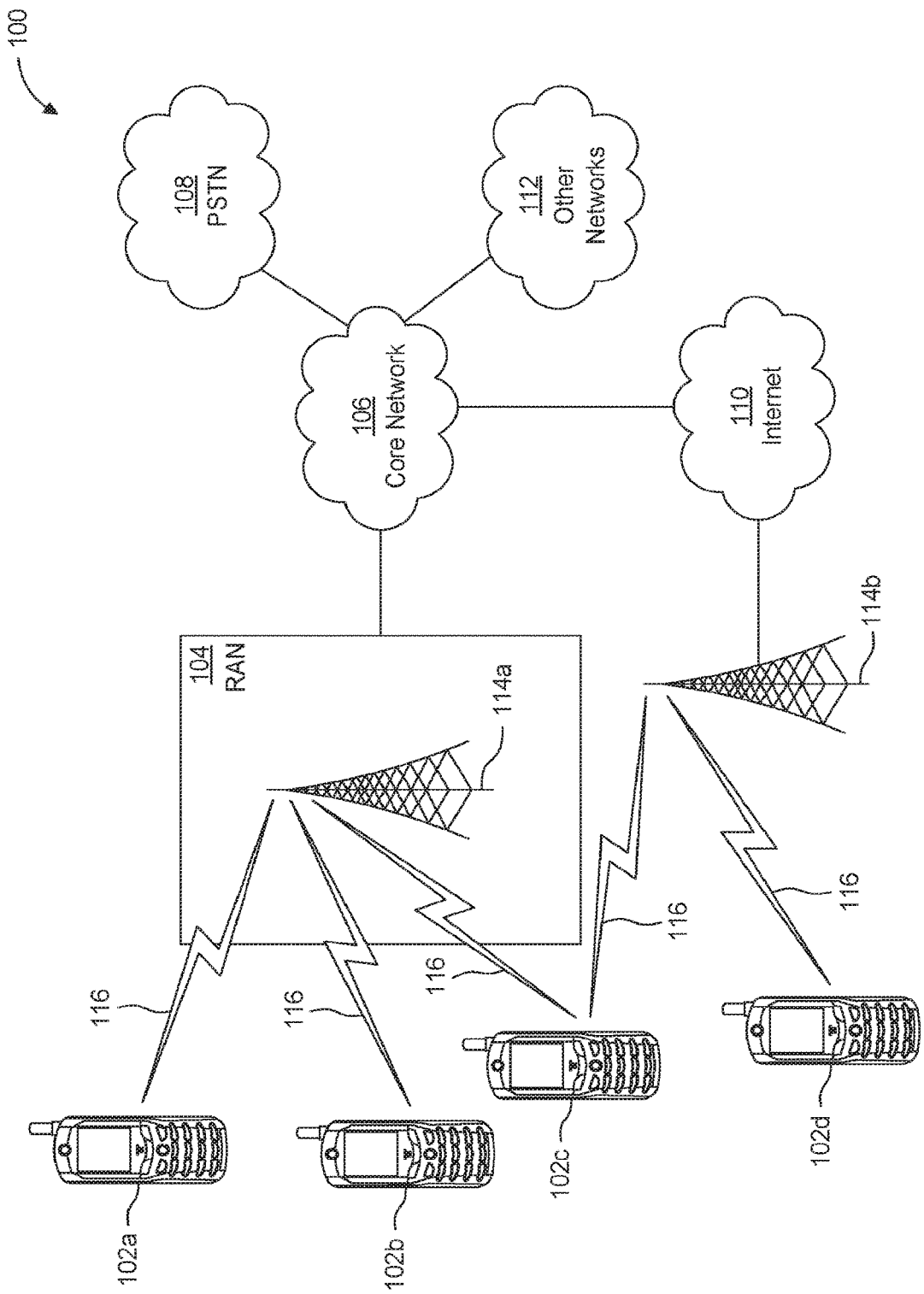
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
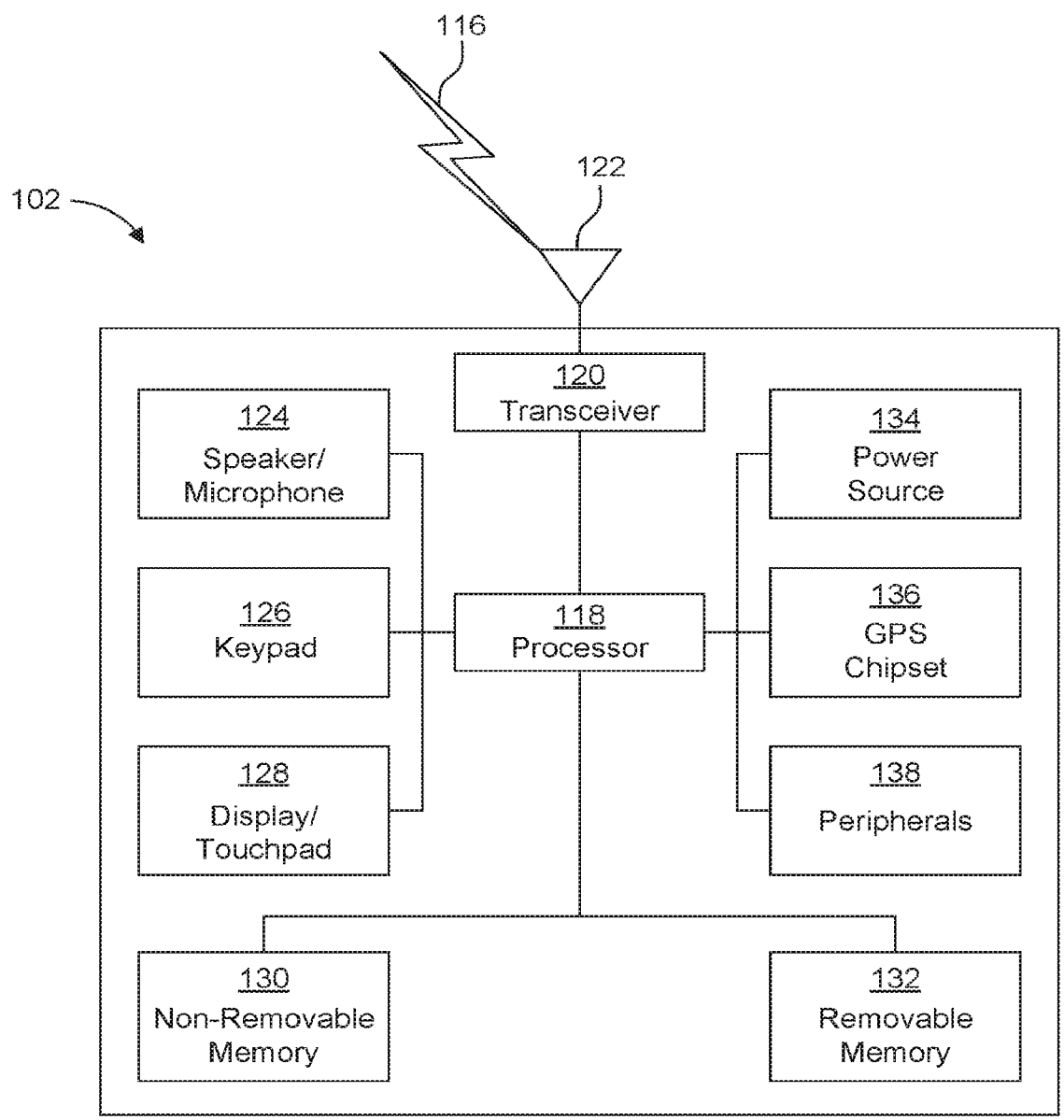
FIG. 1C is a system diagram illustrating an example radio access network (RAN) and an example core network (CN) that may be used within the communications system illustrated in FIG. 1A according to an embodiment.
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
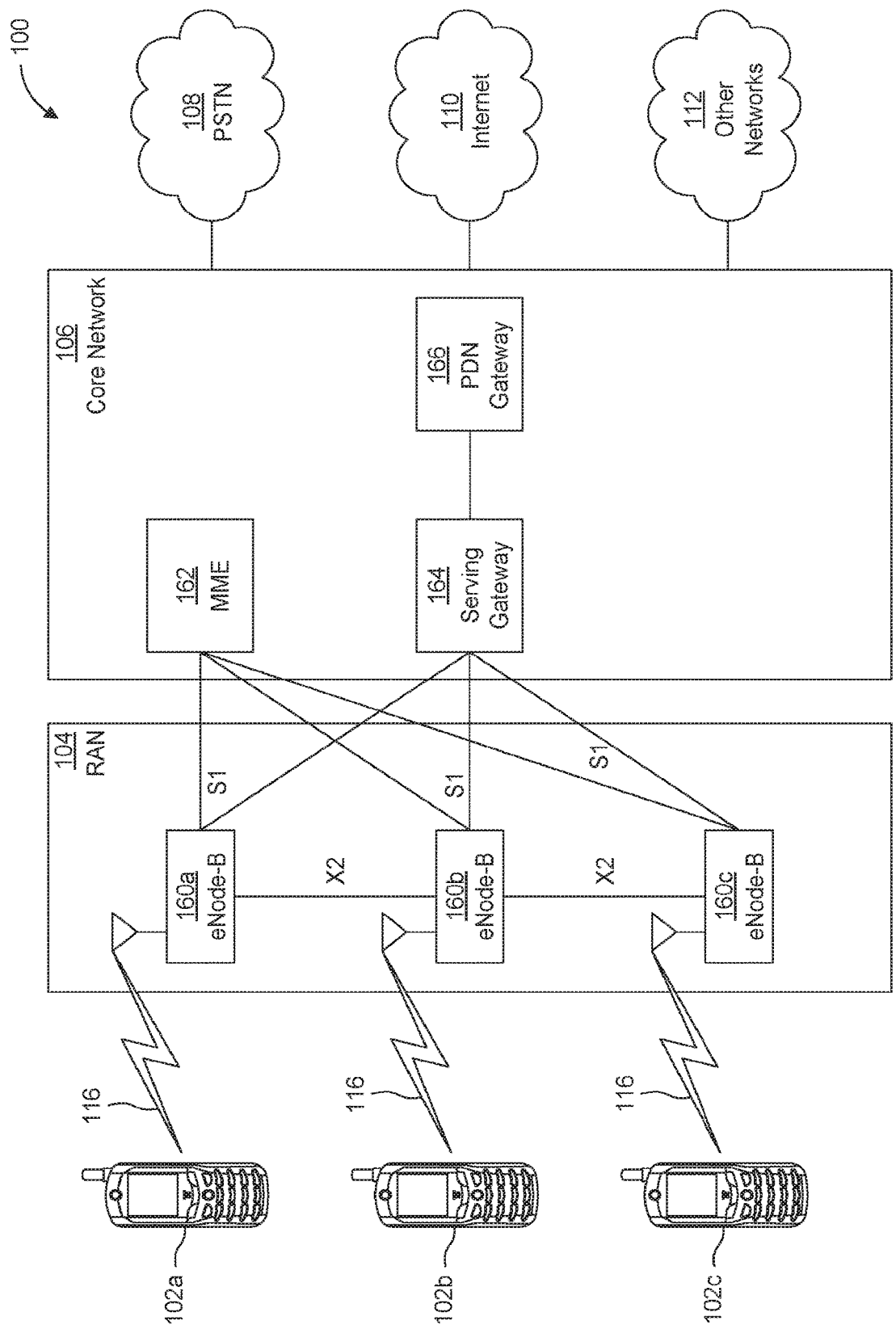

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11 n, and 802.11ac. 802.11af supports 5 MHz, 10 MHz and 20 MHz bandwidths in the TV White Space (TVWS) spectrum, and 802.11 ah supports 1 MHz, 2 MHz, 4 MHz, 8 MHz, and 16 MHz bandwidths using non-TVWS spectrum. According to a representative embodiment, 802.11 ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
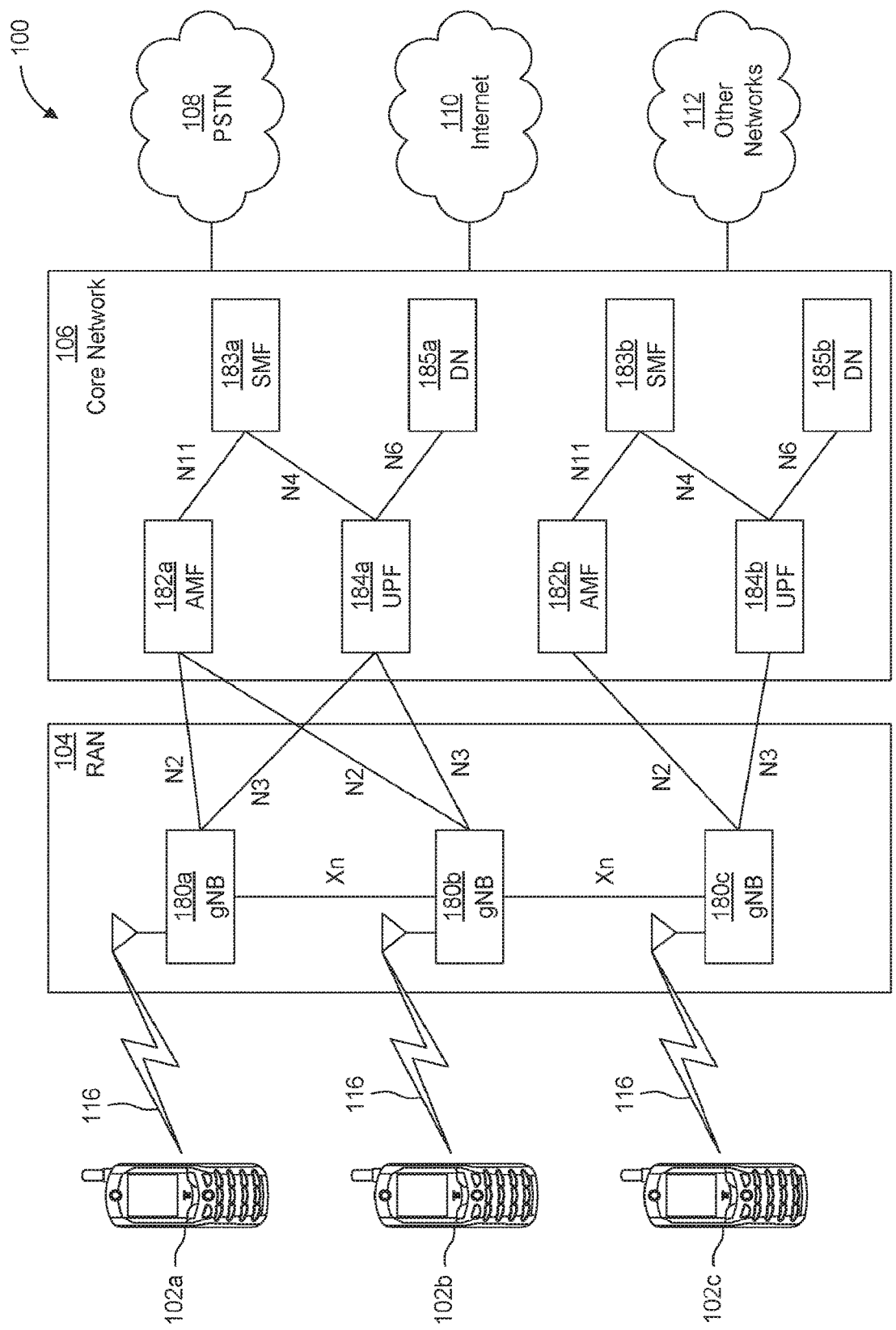

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In IEEE 802.1 lac, very high throughput (VHT) STAs may support 20 MHz, 40 MHz, 80 MHz, and 160 MHz wide channels. The 40 MHz and 80 MHz channels may be formed by combining contiguous 20 MHz channels, similar to IEEE 802.11n. A 160 MHz channel may be formed either by combining 8 contiguous 20 MHz channels or by combining two non-contiguous 80 MHz channels. This may be referred to as an 80+80 configuration. For the 80+80 configuration, the data, after channel encoding, may be passed through a segment parser that divides it into two streams. Inverse fast Fourier transform (IFFT) and time domain processing may be performed on each stream separately. The streams may then be mapped onto the two channels and the data transmitted. At the receiver, this mechanism may be reversed, and the combined data may be sent to the MAC.

IEEE 802.11af and 802.11ah support sub 1 GHz modes of operation. For these specifications, the channel operating bandwidths and carriers may be reduced relative to those used in IEEE 802.11n and 802.11ac. IEEE 802.11af supports 5 MHz, 10 MHz and 20 MHz bandwidths in the TV White Space (TVWS) spectrum, and IEEE 802.11ah supports 1 MHz, 2 MHz, 4 MHz, 8 MHz, and 16 MHz bandwidths using non-TVWS spectrum. For IEEE 802.11 ah, this may be used to support for meter type control (MTC) devices in a macro coverage area. MTC devices may have limited capabilities, including only supporting limited bandwidths, but may also have a requirement for a very long battery life.

WLAN systems that support multiple channels and channel widths, such as IEEE 802.11n, 802.11ac, 802.11af, and 802.11ah, may include a channel designated as the primary channel. The primary channel may have a bandwidth equal to the largest common operating bandwidth supported by all STAs in the BSS. The bandwidth of the primary channel may, therefore, be limited by the STA, of all STAs operating in a BSS, which supports the smallest bandwidth operating mode. For IEEE 802.11ah, for example, the primary channel may be 1 MHz wide if there are STAs (e.g., MTC devices) that only support a 1 MHz mode even if the AP, and other STAs in the BSS, supports a 2 MHz, 4 MHz, 8 MHz, 16 MHz, or other channel bandwidth operating mode. All carrier sensing and NAV settings may depend on the status of the primary channel. For example, if the primary channel is busy, for example, due to a STA supporting only a 1 MHz operating mode transmitting to the AP, then the entire available frequency band may be considered busy even though the majority of it remains idle and available.

In the United States, the available frequency bands that may be used by IEEE 802.11ah may be from 902 MHz to 928 MHz. In Korea, the available frequency bands may be from 917.5 MHz to 923.5 MHz, and in Japan, the available frequency bands may be from 916.5 MHz to 927.5 MHz. The total bandwidth available for IEEE 802.11 ah may be 6 MHz to 26 MHz, depending on the country code.

The IEEE 802.11™ High Efficiency WLAN (HEW) includes embodiments to enhance the quality of service all users experience for a broad spectrum of wireless users in many scenarios, including high-density scenarios in the 2.4 GHz, 5 GHz and 6 GHz bands. New use cases that support dense deployments of AP, STAs, and associated Radio Resource Management (RRM) technologies are being considered by the 802.11 HEW.

Potential applications for HEW include emerging usage scenarios, such as data delivery for stadium events, high user density scenarios, such as train stations or enterprise/retail environments, and increased dependence on video delivery and wireless services for medical applications.

In 802.11 ax or HEW, the measured traffic for a variety of applications has a large likelihood for short packets, and there are network applications that may also generate short packets. The applications may include virtual office, transmit power control (TPC) acknowledgement (ACK), video streaming ACK, device/controller (such as mice, keyboards and game controls), access (e.g., probe request/response), network selection (e.g., probe requests and access network query protocol (ANQP)) and network management (e.g., control frames). Further, multi-user (MU) features that include uplink (UL) and downlink (DL) OFDMA and UL and DL MU-MIMO have been introduced, and a mechanism for multiplexing UL random access for different purposes has been specified.

The IEEE 802.11 Extremely High Throughput (EHT) includes embodiments to further increase peak throughput and improve efficiency of the IEEE 802.11 networks. The use cases and applications for EHT may include high throughput and low latency applications, such as video-over-WLAN, augmented reality (AR) and virtual reality (VR). A list of features in the EHT may include multiple AP, multi-band, 320 MHz bandwidth, 16 spatial streams, HARQ, full duplex (in time and frequency domains), AP coordination, semi-orthogonal multiple access (SOMA), and new designs for 6 GHz channel access.

In a typical IEEE 802.11 network, STAs may be associated with a single AP and may transmit to and from that AP with little or no coordination with transmissions in neighboring BSSs. A STA may defer to an overlapping basic service set (OBSS) transmission based on a CSMA protocol that is entirely independent between BSSs. In IEEE 802.11ax, some level of coordination between OBSSs was introduced by spatial re-use (SR) procedures and may allow OBSS transmissions based on an adjusted energy detection threshold (e.g., using the OBSS PD procedure) or by knowledge of the amount of interference that may be tolerated by a receiving OBSS STA (e.g., using the SRP procedure).

Embodiments described herein may provide for procedures that enable more coordination between the OBSSs by allowing transmission to or from multiple APs to one or more STAs. The multiple AP coordination between OBSSs may be performed within an unlicensed band and/or specific to an IEEE 802.11 protocol.

Multiple AP/eNBs may transmit to the same or multiple STAs/WTRUs in the same or different time and frequency resource using joint processing/transmission, with the objective of improving the overall throughput for the considered STA/WTRU. Dynamic cell selection may be treated as a special case of joint processing in which only one of the set of AP/eNBs is actively transmitting data at any time. On the other hand, multiple AP/eNBs may transmit to different STAs/WTRUs (e.g., each AP/eNB serving its own STA/WTRU) in the same or different time and frequency resource using coordinated beamforming/scheduling, with the objective of reducing interference experienced by each STA/WTRU. Significant improvements in cell average and/or cell edge throughput may be achieved by multiple AP/eNB coordination. Multiple transmit antennas may be assumed to be available for each STA/WTRU/AP/base station. Simultaneous interference suppression for other STAs/WTRUs and signal quality optimization for the desired STA/WTRU may be handled through spatial domain signal processing at each base station.

In general, some degree of channel state information may be assumed to be available at the APs or base stations, through, for example, explicit feedback. Also, a certain degree of timing/frequency synchronization may be assumed, such that more complicated signal processing to deal with inter-carrier or inter-symbol interference may be avoided.

Multiple AP transmission schemes in WLANs may be classified based on coordinated OFDMA, coordinated nulling/beamforming, and coordinated SU/MU transmission. For coordinated SU transmission, multiple APs may transmit to a STA in one resource unit (RU). Coordinated SU transmission may be one of the following (in order of increased complexity): dynamic selection, coordinated SU beamforming and coordinated MU beamforming. For coordinated point selection, the transmission may be dynamically selected from one of the set of APs and may include HARQ. For coordinated SU beamforming, the transmission may be from the multiple APs simultaneously, and the transmission may be beamformed. For coordinated MU beamforming, multiple APs may transmit or receive data to/from multiple STAs in one RU.

Figure 2:
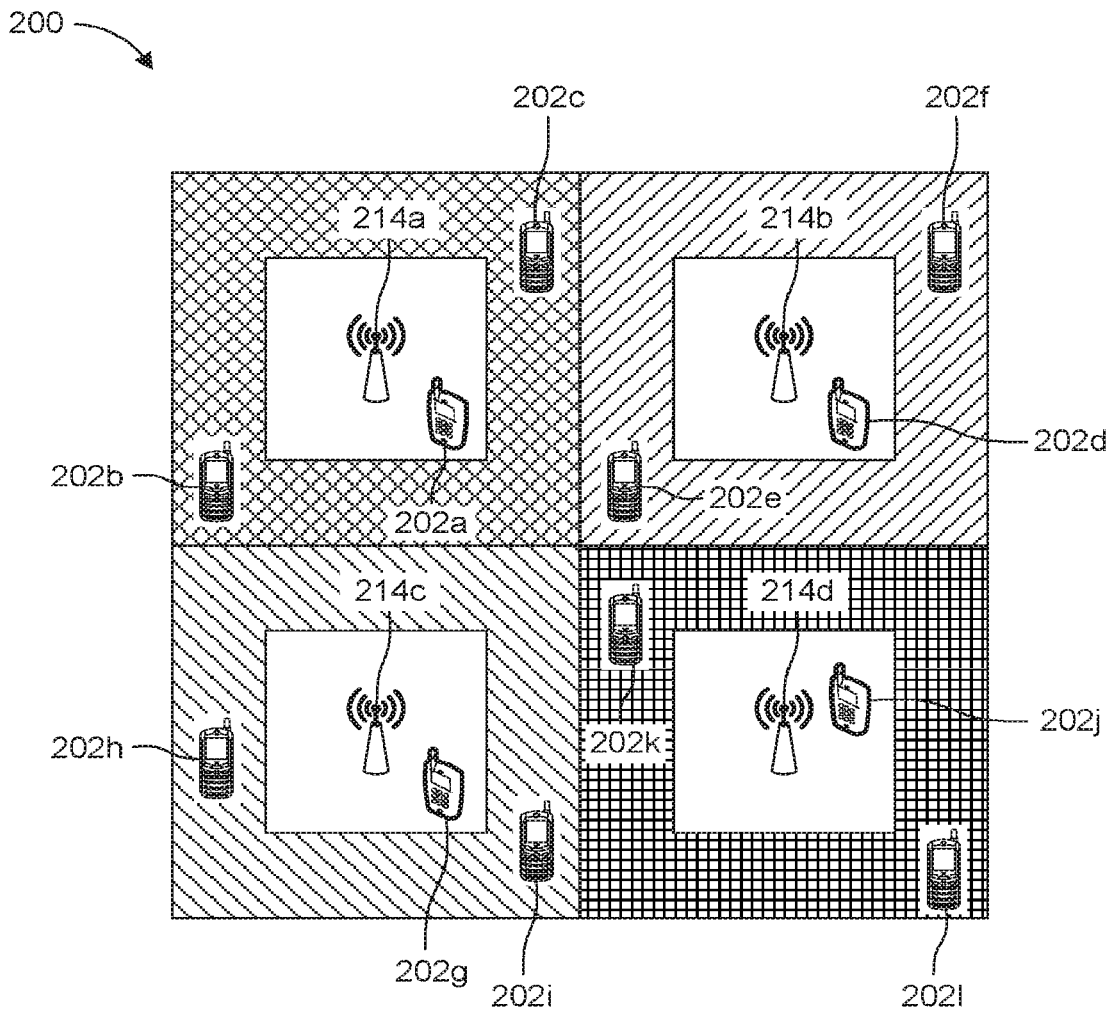
FIG. 2 is a diagram illustrating an example of coordinated orthogonal frequency-division multiple access (OFDMA)

FIG. 2 illustrates an example 200 of coordinated orthogonal frequency-division multiple access (OFDMA), which may be used in combination of any of other embodiments described herein. In coordinated OFDMA, each group of RUs may be used by one AP (e.g., 214a, 214b, 214c, or 214d) to transmit or receive data. For example, as illustrated in FIG. 2, the STAs 202a-202l may be divided to two groups, cell center STAs 202a, 202d, 202g, 202j, and cell edge STAs 202b, 202c, 202e, 202f, 202h, 202i, 202k, 202j. The APs 214a, 214b, 214c, 214d may allow its STAs 202a, 202d, 202g, 202j (i.e. cell center STAs) that are not affected by interference to use the entire bandwidth. However, the APs 214a, 214b, 214c, 214d may limit its STAs 202b, 202c, 202e, 202f, 202h, 202i, 202k, 202l (i.e. cell edge STAs) that may be affected by interference to use only partial frequency bandwidth. For example, the STA 202a is allowed to use the entire bandwidth (e.g., full spectrum/channel) while the STAs 202b, 202c are limited to use only certain part of the bandwidth. The data or information communicated between the APs 214a, 214b, 214c, 214d and the STAs 202a-202l may be beamformed or have MU-MIMO on each RU 205, 210, 220, 225, 230, 235, 240, 245. Complexity may be relatively low to medium. In one embodiment, the APs may split the OFDMA resource units (RUs) between themselves in a coordinated manner, with each AP restricted to specific RUs. In another embodiment, the APs may allow STAs that are not affected by interference, or will not affect others, to use the entire bandwidth while restricting access for the STAs that may be affected. This is called fractional frequency reuse (FFR).

Figure 3:
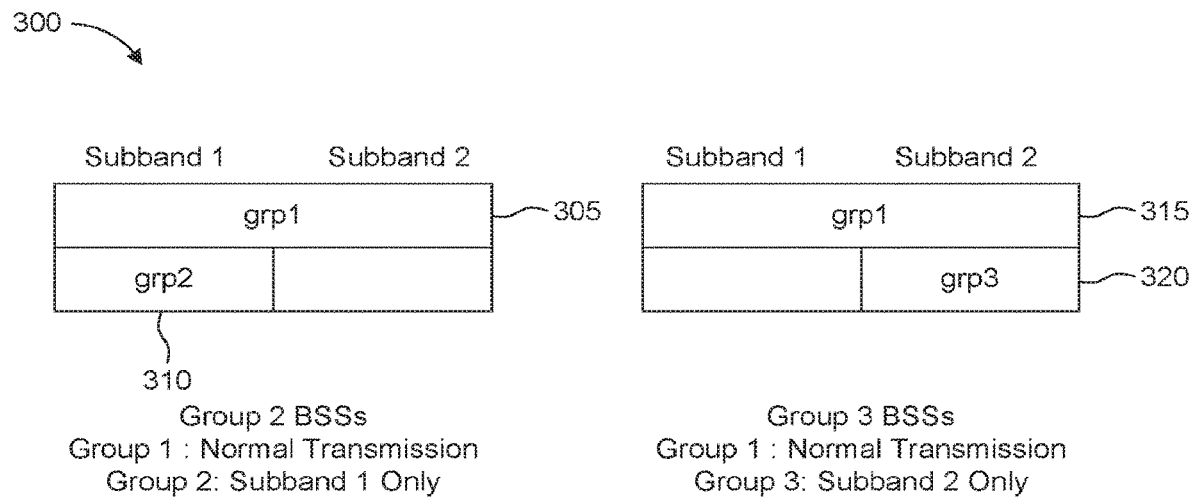
FIG. 3 is a diagram illustrating an example resource allocation for coordinated OFDMA.

FIG. 3 illustrates an example resource allocation 300 for coordinated OFDMA, which may be used in combination of any of other embodiments described herein. As illustrated in FIG. 3, STAs (e.g., cell center STAs) associated with group1 resources 305, 315 (e.g., center group RUs) may be allowed to use the entire band (e.g., subband1 and subband2), STAs (e.g., cell edge STAs) associated with the group2 resource 310 or group3 resource 320 may be limited to use only allocated resource (e.g., subband1 or subband 2).

Figure 4:
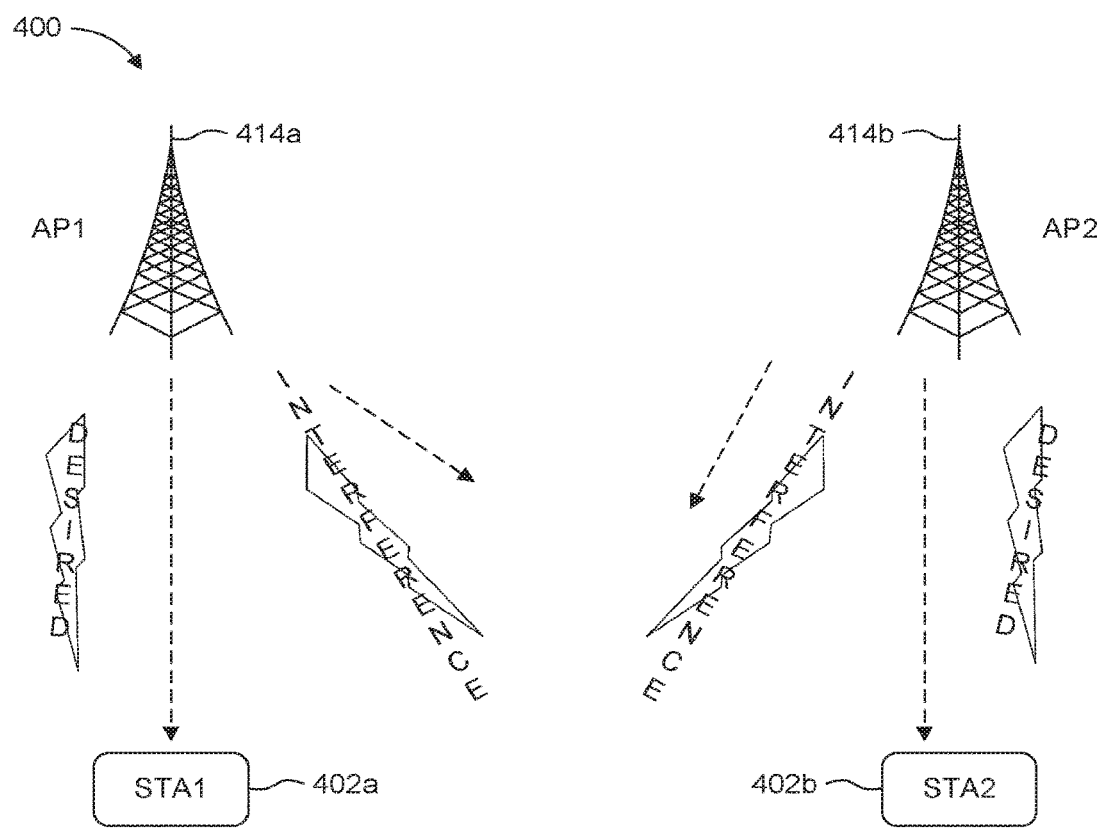
FIG. 4 is a diagram illustrating an example of coordinated nulling/coordinated beamforming.

FIG. 4 illustrates an example 400 of coordinated beamforming/coordinated nulling (CB/CN), which may be used in combination of any of other embodiments described herein. In coordinated beamforming/coordinated nulling, each AP (e.g., AP1 414a and AP2 414b) may apply precoding to transmit information to or from its desired STA or STAs (e.g., STA1 402a and STA2 402b) and suppress interference to or from it. In the example illustrated in FIG. 4, the data for each STA (e.g., STA1 402a or STA2 402b) may only be needed at its associated AP (e.g., AP1 414a or AP2 414b), although channel information from the other STA (e.g., STA2 402b or STA1 402a) may be needed at both APs (e.g., AP1 414a and AP2 414b).

Figure 5:
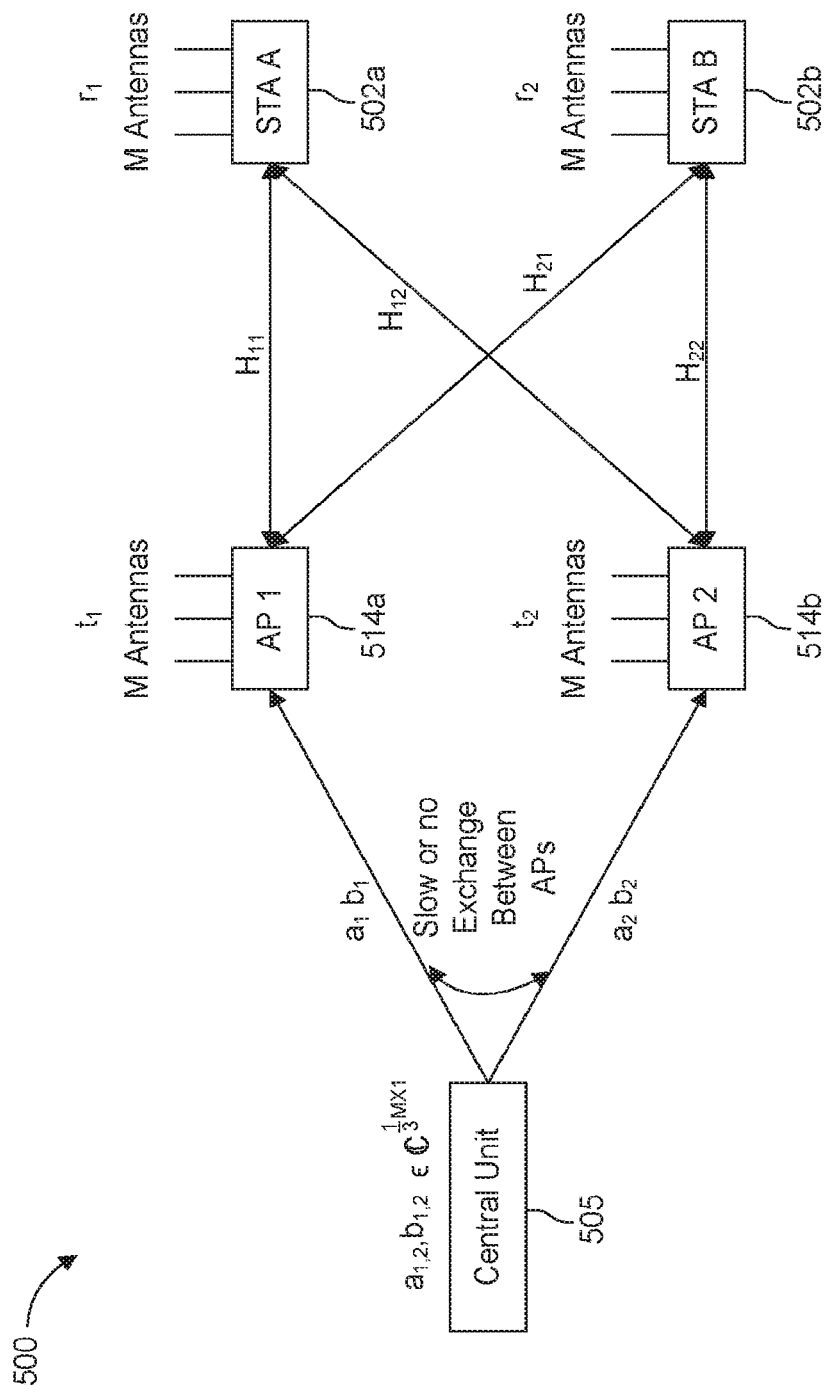
FIG. 5 is a diagram illustrating an example of coordinated nulling/coordinated beamforming (CB/CN) using interference alignment.

FIG. 5 illustrates an example 500 of coordinated nulling/coordinated beamforming (CB/CN) using interference alignment (IA), which may be used in combination of any of other embodiments described herein. In interference alignment, APs may precode the information for STAs such that the undesired information (e.g., STA1 information is undesired for STA2) falls into an interference subspace at STAs after the APs' signals pass through the channel. In the example illustrated in FIG. 5 where two APs, AP1 514a and AP2 514b, and two STAs, STA A 502a and STA B 502b, are in a wireless medium, AP1 514a and AP2 514b may be in the same BSS and connected through a central unit that distributes the information for STA A 502a, for example $a_1 \in$ $$\mathbb{C}^{\frac{1}{3}M \times 1}$$

and $a_2 \in$ $$\mathbb{C}^{\frac{1}{3}M \times 1}$$

and STA B 502b, for example $b_1 \in$ $$\mathbb{C}^{\frac{1}{3}M \times 1}$$

and $b_2 \in$ $$\mathbb{C}^{\frac{1}{3}M \times 1},$$

to the AP1 514a and AP2 514b, where M may be the number of antennas at STAs 502a, 502b and APs 514a, 514b. The information available at AP1 514a may be $a_1$ and $b_1$. The information available at AP2 514b may be $a_2$ and $b_2$. The information exchange between APs 514a, 514b through the central unit may be slow or assumed to be none. However, the APs 514a, 514b may communicate between them through a wireless medium with low-data rate but reliable communication protocols. The channels between AP1 514a and STA A 502a, STA B 502b may be denoted by $H_{11}$, $H_{21}$ $\in \mathbb{C}^{M \times M}$, and the channels between AP2 514b and STA A 502a, STA B 502b may be denoted by $H_{12}$, $H_{22} \in \mathbb{C}^{M \times M}$.

The operations at AP1 514a and AP2 514b for a group of subcarriers or a single subcarrier may be as follows:

$$t_1 = H_{11}^{-1} V_1 b_1 + H_{21}^{-1} V_2 a_1$$

$$t_2 = H_{12}^{-1} V_1 b_2 + H_{22}^{-1} V_2 a_2,$$

where $t_1 \in \mathbb{C}^{M \times 1}$ and $t_2 \in \mathbb{C}^{M \times 1}$ may be the transmitted symbols from AP1 514a and AP2 514b, respectively, and $V_1$ and $V_2$ may be the interference subspaces for STA A 502a and STA B 502b, respectively. The received symbols at the STA A 502a and STA B 502b may be shown as:

$$r_1 = \underbrace{V_1(b_1 + b_2)}_{\text{Interference Alignment}} + H_{12}H_{22}^{-1}V_2 a_2 + H_{11}H_{21}^{-1}V_2 a_1 + n_1$$

$$r_2 = \underbrace{V_2(a_1 + a_2)}_{\text{Interference Alignment}} + H_{22}H_{12}^{-1}V_1 b_2 + H_{21}H_{11}^{-1}V_1 + n_2$$

Because of the precoding at AP1 514a and AP2 514b, the interference components, due to cross channels, may fall in the same subspace, for example $V_1$ for STA A 502a and $V_2$ for STA B 502a. This scheme may correspond to a particular case of an interference alignment (IA) scheme. The main benefit for this particular scheme may be that the AP1 514a or AP2 514b may not need to use the channel state information related to AP2 514b or AP1 514a. Hence, it may decrease the traffic by eliminating the need for information exchange between the APs 514a, 514b. In addition, it may serve M information by using APs 514a, 514b and STAs 502a, 502b equipped with M antennas.

In coordinated single user (SU) or multi user (MU) transmission, multiple APs may coordinate to simultaneously transmit information to or from a single STA or multiple STAs. In this case, both the channel information and the data for the STAs may be needed at both APs. The coordinated SU or MU transmission may be, for example, one of coordinated SU transmission or coordinated MU beamforming.

For coordinated SU transmission, multiple APs may transmit to a STA in one RU and may be one of (in order of increased complexity) dynamic point selection, coordinated SU beamforming or joint precoding. For dynamic point selection, the transmission may be dynamically selected from one of the set of APs and may incorporate HARQ.

Figure 6:
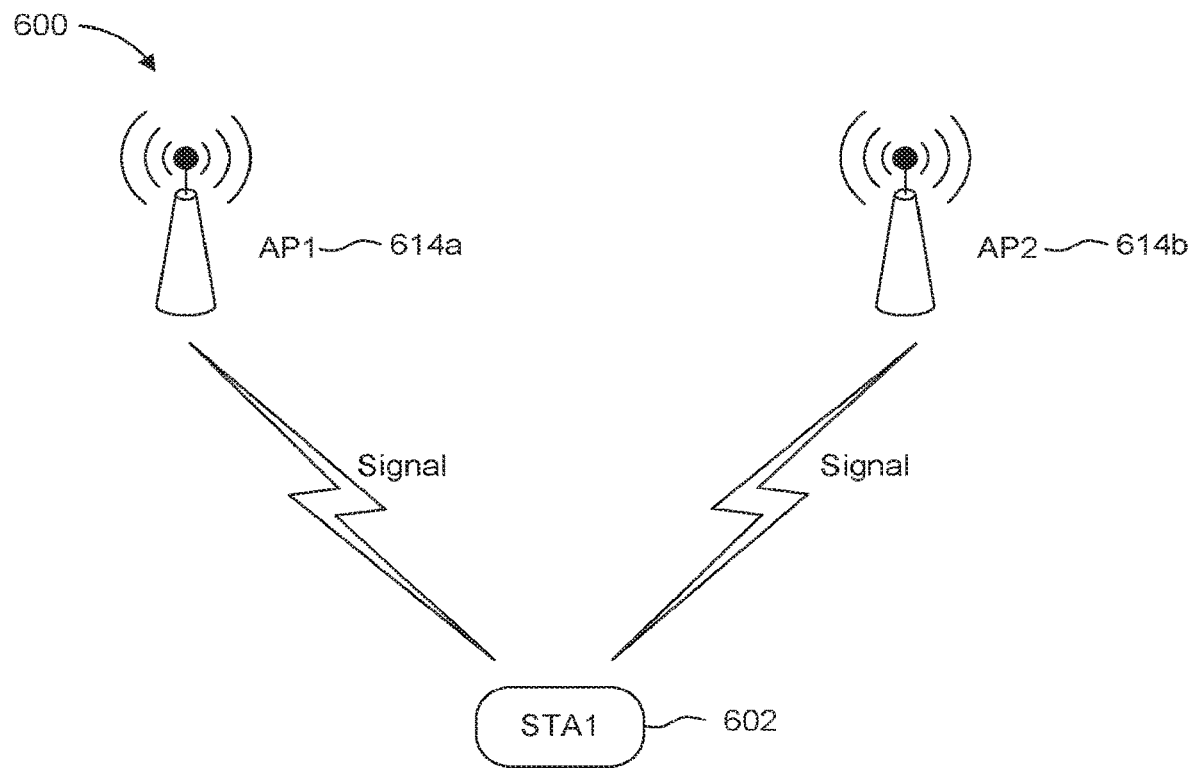
FIG. 6 is a diagram illustrating an example of single user joint precoded multiple access point (multi-AP) transmission or coordinated singer user (SU) beamforming.

FIG. 6 illustrates an example 600 of single user (SU) joint precoded multiple AP transmission or coordinated SU beamforming, which may be used in combination of any of other embodiments described herein. In coordinated joint precoding, the transmission may be simultaneously from the multiple APs (e.g., AP1 614a and AP2 614b), and the transmission may be beamformed or precoded to the desired STA (e.g., STA1 602a) on one or more RUs. For example, as illustrated in FIG. 6, AP1 614a and AP2 614b may send signals to STA1 602 in one UR for the coordinated SU transmission.

Figure 7:
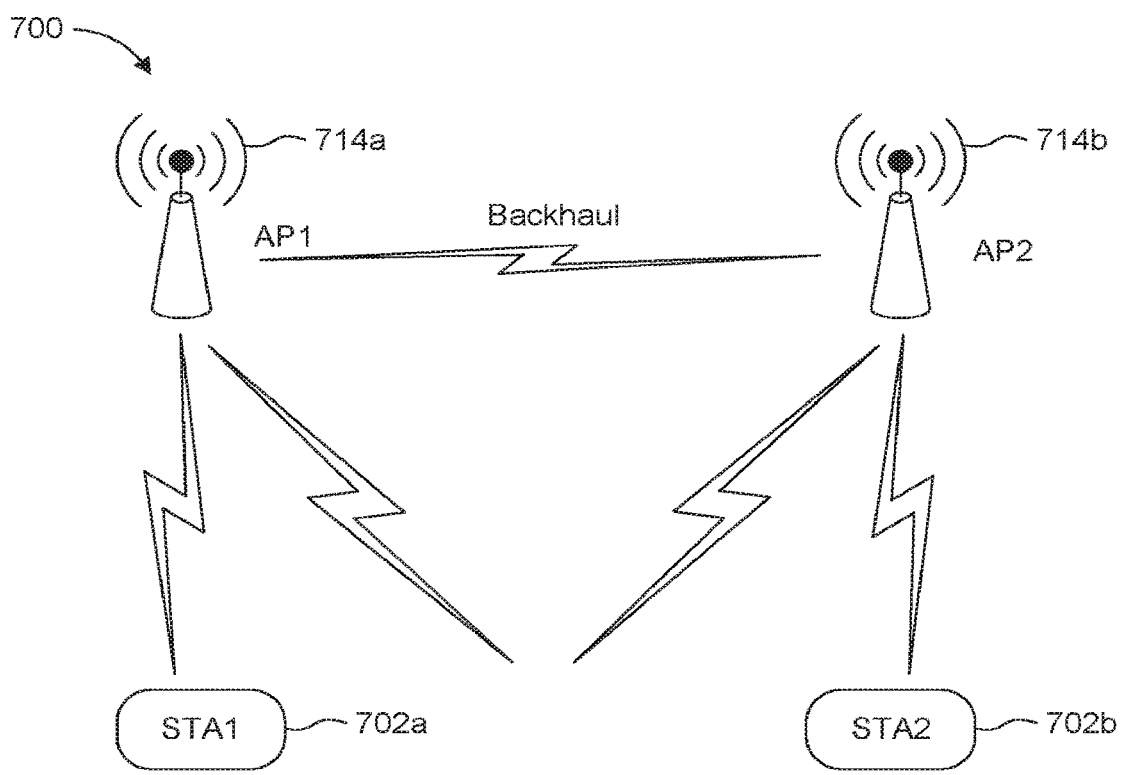
FIG. 7 is a diagram illustrating an example of multi-user joint precoded multiple AP transmission or coordinated multi user (MU) beamforming.

FIG. 7 illustrates an example 700 of multi user (MU) precoded multiple AP transmission or coordinated MU beamforming, which may be used in combination of any of other embodiments described herein. For coordinated MU beamforming, multiple APs (e.g., AP1 714a and AP2 714b) may transmit or receive data to/from multiple STAs (e.g., STA1 702a and STA2 702b) on one or more RUs. For example, as illustrated in FIG. 7, AP1 714a and AP2 714b coordinate (e.g., via backhaul) to simultaneously transmit/receive data to/from STA1 702a and STA2 702b in one or more RUs. Multiple AP schemes described herein may include scenarios related to coordinated beamforming and joint processing.

In IEEE 802.11 systems, a STA may send an association request to an AP, and if the association is successful, receive an association response from the AP to indicate that it is a member of the BSS. For multiple AP systems, an AP may be affected by multiple APs and may require some level of association with each AP. Multiple AP association described herein may enable a single STA to discover multiple APs and associate with more than one AP.

Further, to enable coordinated OFDMA in trigger based IEEE 802.11 systems, such as IEEE 802.11ax and beyond, embodiments described herein may enable STAs to identify whether the STAs are cell center or cell edge STAs and to feedback this information to the AP in a trigger-based OFDMA system. Embodiments described herein may also enable the STAs and/or APs to perform trigger-based scheduled coordinated OFDMA schemes and/or trigger-based random access coordinated OFDMA schemes. The OFDMA transmissions from the different BSSs may be synchronized to ensure orthogonality in the presence of different timing offsets.

Further, for coordinated beamforming and coordinated nulling, the transmitter (or transmitting STA) may estimate the effective channels to both the desired receiver (or desired receiving STA) and the interferee receiver (e.g., the receiver or STA subject to interference from the transmitter). Channel feedback may be used to feedback from the desired receiver that is within the BSS. The feedback may also be requested from the receiver in another BSS or a BSS associated to the current BSS using multiple AP association. Further, embodiments described herein may enable requesting feedback in an efficient manner for both the desired and interferee receiver. The direction of the desired transmission (e.g., uplink or downlink) and the interferee (e.g., uplink or downlink) may be considered. Both trigger-based and non-trigger-based procedures may be provided for.

Further, embodiments described herein may provide for design specific transmission procedures for the different system architectures with respect to obtaining an effective channel and designing effective precoders. The architectures may be based on whether: (1) both transmitters are DL from APs (DL-DL); (2) both transmitters are uplink (UL-UL) from STAs; or (3) one of the transmitters is an AP and the other a STA or vice versa (DL-U or UL-DL). In one example, for UL-UL architectures, spatial reuse parameter (SRP)-based spatial reuse (SR) in IEEE 802.11ax may be used or modified. In SRP-based spatial reuse (SR), a STA may receive an SRP PPDU with an indication of the maximum amount of interference that the AP may tolerate from another STA in a neighboring BSS that wants to simultaneously transmit while the AP is receiving a frame from a specific STA (e.g., in an SR manner).

Further, to enable multiple AP transmission in the DL with beamforming or beam nulling techniques, APs may need to know the DL channel state information (CSI) for all STAs. Assuming that DL and UL channels are reciprocal, the APs may obtain the DL CSI from reception of a UL reference, pilot or training signal transmitted from the STAs. From this, the APs may obtain information such as path losses from different STAs to different APs, which may assist the APs in achieving multiple AP DL beamforming or nulling. However, if the UL transmissions from the STAs are power-controlled, signals received from all the STAs may have the same or similar power levels. Accordingly, in such scenarios, the AP may not be able to determine the path losses and pathloss information between APs and STAs may, therefore, be obtained. If the STA is power-limited, the reciprocal channel estimate at the AP derived from the STA transmitting an NDP may be poor due to it potentially being noise-limited. In such scenarios, the channel estimate to enable DL SU-MIMO or MU-MIMO may be performed and improved.

Figure 8A:
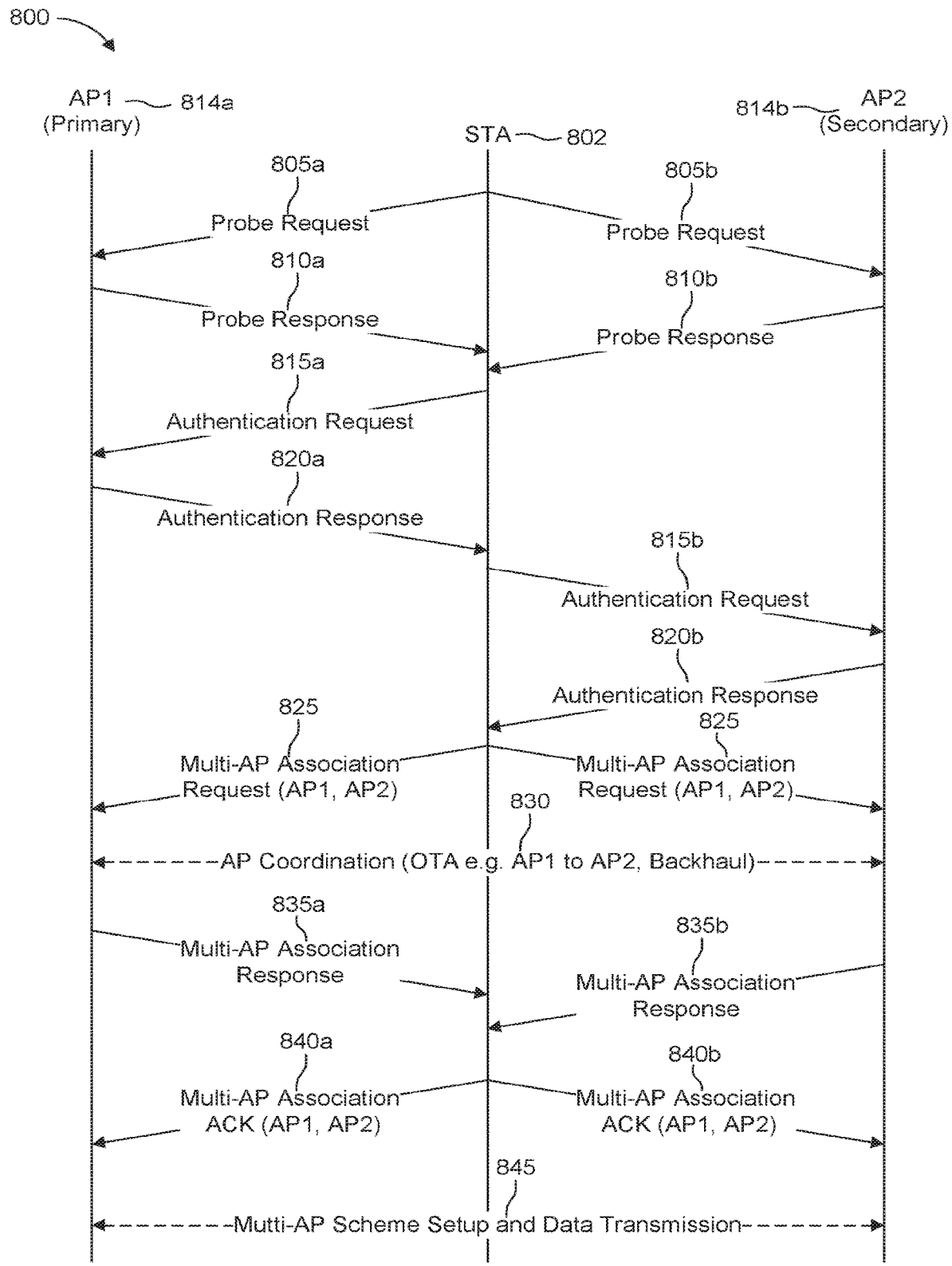
FIG. 8A is a diagram illustrating an example multiple AP association during station (STA) association.

The AP association procedure may occur as part of the typical STA association procedure. FIG. 8A illustrates an example multiple AP association 800 during STA association, which may be used in combination of any of other embodiments described herein.

In the example illustrated in FIG. 8A, the STA 802 sends probe request frames 805*a*, 805*b* (and/or authentication request frames 815*a*, 815*b*) and may identify the candidate APs such as AP1 814*a* and AP2 814*b*. In embodiments, each of the probe request frames 805*a*, 805*b* may include, but is not limited to, a request for multiple AP association, transmission, and/or reception capabilities. The APs (e.g., AP1 814*a* and AP2 814*b*) that received the probe request frames 805*a*, 805*b* (and/or authentication request frames 815*a*, 815*b*) send probe response frames 810*a*, 810*b* (and/or authentication response frames 820*a*, 820*b*) to the STA 802. Each of the probe response frames 810*a*, 810*b* may include, but is not limited to, multiple AP association, transmission, and/or reception capabilities. It may also include candidate coordinating APs (e.g., AP1 814*a* and AP2 814*b*) and their multiple AP capabilities (e.g., fractional frequency reuse (FFR), coordination, or joint transmission).

A STA 802 may connect to a primary AP (e.g., AP1 814*a*). In embodiments, the primary AP may be defined as the AP to which the STA would otherwise connect to for a single AP scenario. This may be, for example, the AP that the STA would otherwise connect to for IEEE 802.11 transmissions (e.g., IEEE 802.11ax or earlier). The secondary APs (e.g., AP2 814*b*) may be additional APs used for multiple AP transmission. In embodiments, the primary AP needs to be part of the transmission. In other embodiments, the best AP of the multiple AP service set may be used for transmission. There may be more than one secondary AP in the multiple AP service set, and the APs may be ordered, for example, as primary AP, secondary 1 AP, secondary 2 AP, tertiary AP, etc. The multiple AP service set or multiple AP service set may comprise a plurality of APs that are able to support the multiple AP association, transmission, and/or reception between the STA and the multiple APs.

As illustrated in FIG. 8A, the STA 802 may send one or more multiple AP association request frames 825 to the APs 814*a*, 814*b* with an indication of the priority in which the APs 814*a*, 814*b* are to be associated (e.g., primary AP, secondary AP, tertiary AP or AP1, AP2). The AP priority order may be explicitly signaled in the multiple AP association request frame 825 or may be implicitly signaled by the order in which the AP identifiers appear in the multiple AP association request frame 825.

The STA may identify the priority order from the strength at which beacons or probe response frames 810*a*, 810*b* are received from each of the APs. The beacons or probe response frames 810*a*, 810*b* may include the APs' capability information regarding multiple AP transmission/reception, such as a multiple AP service set element described in FIG. 10 as an example. The APs 814*a*, 814*b* may inform the STA 802 of the possible multiple AP combinations (e.g., a multiple AP service set) and associated multiple AP capabilities, and the STAs may select the subset to be used for the multiple AP association request frame 825.

Figure 11:
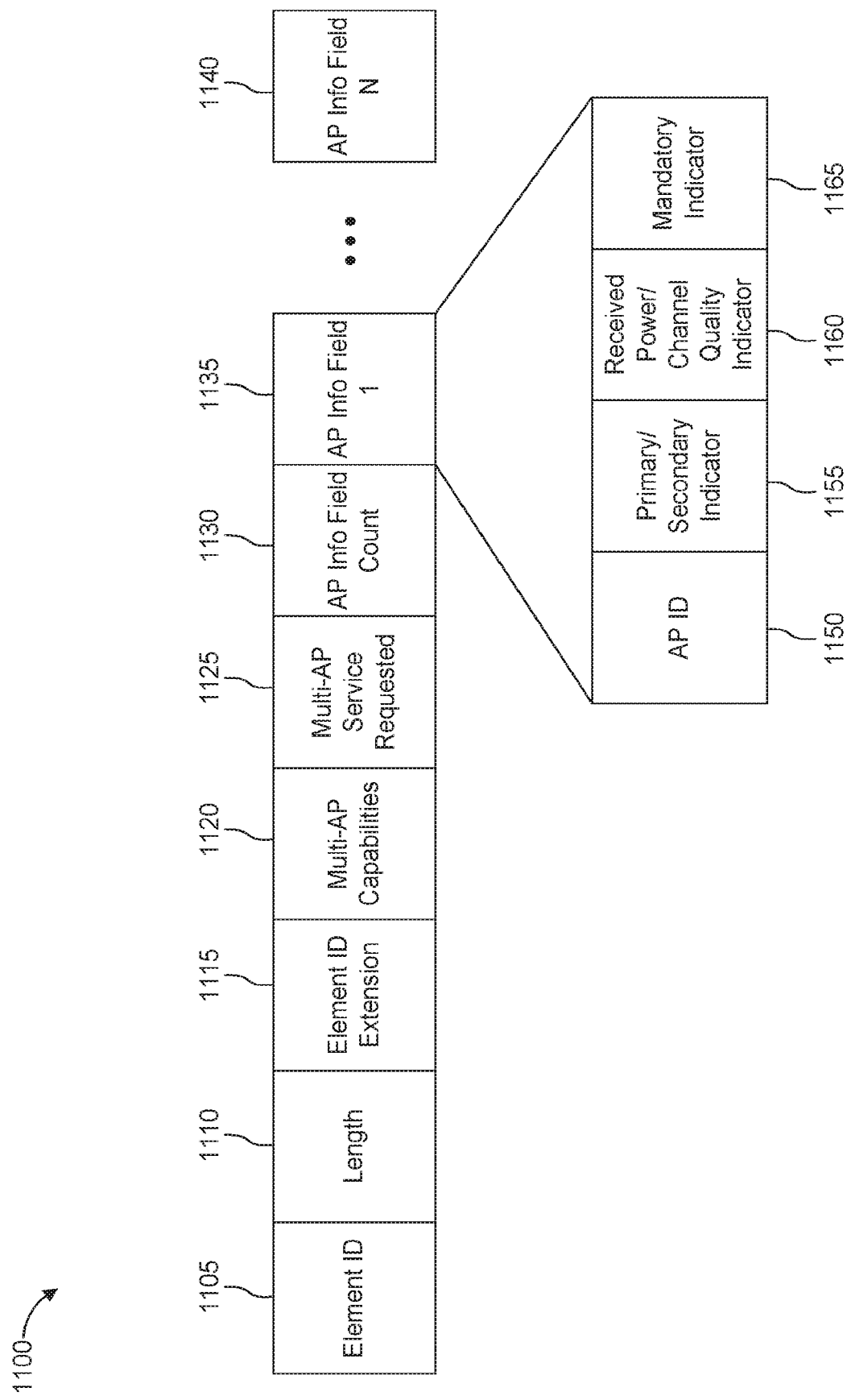
FIG. 11 is a diagram illustrating an example multiple AP selection element.

The multiple AP association request frame 825 may indicate the type or types of coordination requested. In one example, the STA 802 may request a specific coordination type. In some embodiments, the STA 802 may request all the coordination types that it is able to support. Examples of the coordination types may include, but are not limited to, coordinated beamforming, coordinated OFDMA, joint transmission, and multiple AP HARQ. On receipt of the multiple AP association request frame 825, the APs 814*a*, 814*b* may perform some AP coordination procedures 830 to ensure that they are able to coordinate in the manner requested. This may involve higher layer signaling through a backhaul or an AP coordinator. Alternatively or additionally, the primary AP (e.g., AP1 814*a*) may send an over the air (OTA) signal to the secondary AP (e.g., AP2 814*b*) with details of the coordination request and type of data needed. The multiple AP association request 825 may be sent by the STA 802 to add, remove or change the APs 814*a*, 814*b* which the STA 802 is associated with, such as in the case of blockage of an AP in the previously requested multiple AP service set. As an example, the multiple AP association request frame 825 may include a multiple AP selection element as illustrated in FIG. 11. The multiple AP association request frame 825 may be broadcasted to all the APs 814a, 814b in the multiple AP service set or transmitted to the individual APs 814a, 814b separately.

The APs 814a, 814b may then send multiple AP association response frames 835a, 835b to the STA 802. In embodiments, each AP 814a, 814b may send an independent multiple AP association response frame 835a, 835b to the STA 802. The multiple AP association response frame 835a, 835b may be sent in a manner that ensures separability in the code, time, frequency and/or space domains. Alternatively or additionally, the multiple AP association response frame 835a, 835b may be sent using the DL multiple AP scheme requested, such as joint transmission, as a test of the system. The multiple AP association response frame 835a, 835b may accept the multiple AP scheme requested by the STA 802 (e.g., by the multiple AP association request frame 825). The multiple AP response frame 835a, 835b may reject the multiple AP scheme requested by the STA 802 (e.g., by the multiple AP association request frame 825). The multiple AP association response frame 835a, 835b may suggest an alternative or additional scheme to the scheme requested by the STA.

The STA 802 may then reply with a multiple AP association acknowledgement (ACK) frame 840a, 840b to both APs 814a, 814b to ensure that both APs 814a, 814b know that the STA 802 is now ready for the multiple AP transmission/reception setup. On a condition that one of the APs 814a, 814b is unable to accept the multiple AP association requested by the STA 802 and does not send a multiple AP association response frame 835a, 835b, the multiple AP ACK frame 840a, 840b may ensure that the other AP (e.g., AP1 814a or AP2 814b) is aware that it is the primary AP and should not set up a multiple AP transmission/reception procedures. For example, in case that AP2 814b does not accept the multiple AP association request frame 825 requested by the STA 802 and does not send the multiple AP association response frame 835b, the STA 802 may transmit the multiple AP association ACK frame 840a to AP1 814a to ensure that AP1 814a is the primary AP that is not going to set up the multiple AP transmission/reception procedures. Once the STA 802 receives the multiple AP association ACK frames 840a, 840b from the APs 814a, 814b, the STA 802 may initiate multiple AP transmission/reception scheme with the APs 814a, 814b and perform data transmission 845 with the APs 814a, 814b.

Assuming that AP1 814a and AP2 814b are in the same multiple AP service set, packets may be transmitted from the APs 814a, 814b in the multiple AP service set such that they do not overlap at the STA 802. For example, AP1 814a and AP2 814b may send probe response frames 810a, 810b such that they do not overlap and such that the AP1's probe response frame 810a has time to be decoded before arrival of the AP2's probe response frame 810b. This may also be applicable to the multiple AP association response. For example, AP1 814a and AP2 814b may send multiple AP association response frames 835a, 835b such that they do not overlap and such that the AP1's multiple AP association response frame 835a has time to be decoded before arrival of the AP2's multiple AP association response frame 835b. In other words, the APs 814a, 814b may send packets (e.g., probe response frames 810a, 810b or multiple AP association response frames 835a, 835b) to the STA 802 based on a predetermined order or random order such that the packets do not overlap each other at the STA 802. The order may be determined by the APs 814a, 814b, the STA 802, a network operator, or a network controller.

Figure 8B:
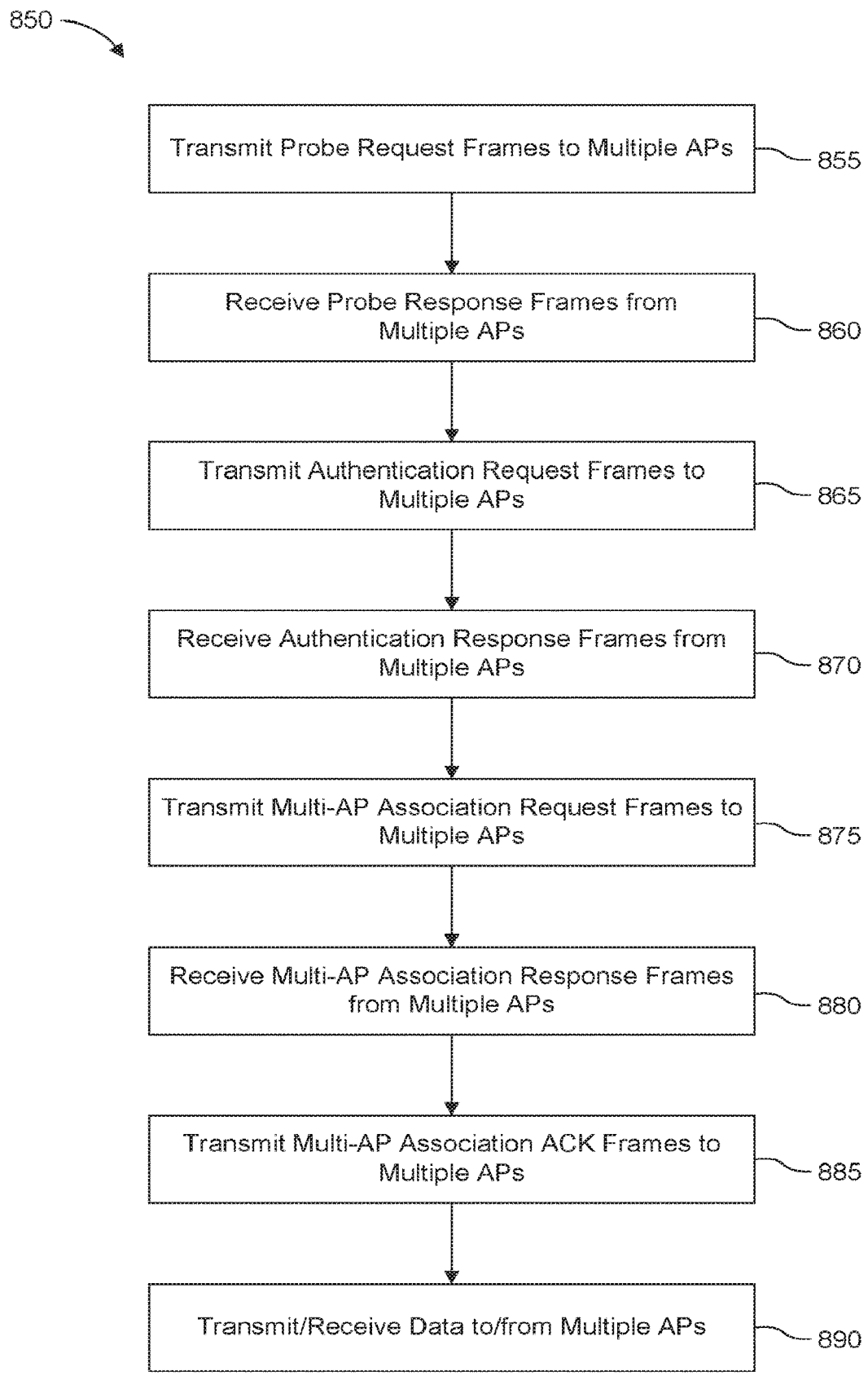
FIG. 8B is a diagram illustrating an example multiple AP association procedure.

FIG. 8B illustrates an example multiple AP association procedure 850, which may be used in combination of any of other embodiments described herein. At step 855, a STA may transmit one or more probe request frames to multiple APs in its proximity to indicate that the STA is able to support multiple AP operation such as transmission and/or reception with the multiple APs. Before sending the probe request frames, the STA may select the multiple APs based on active scanning. For example, if the STA has no information about APs around the STA, the STA may broadcast the probe request frames to all the neighbor APs. If the STA has the information about the network operators or network carrier for which the APs support, the STA may select specific APs with the service set identifiers (SSIDs) that correspond to the network operator or network carrier. The STA may then transmit probe request frames to the specific APs to elicit probe response frames from the selected APs. If the STA has the information of particular APs' addresses (e.g., BSSIDs), the STA may select those APs to send probe request frames and receive probe response frames from those APs. The probe request frame may include one or more indicators indicating that the STA is able to support the multiple AP operation with the multiple APs. The probe request frame may also include one or more indicators requesting the AP whether the AP received the probe request frame are part of a multiple AP service set that provides the STA the multiple AP operation.

Figure 10:
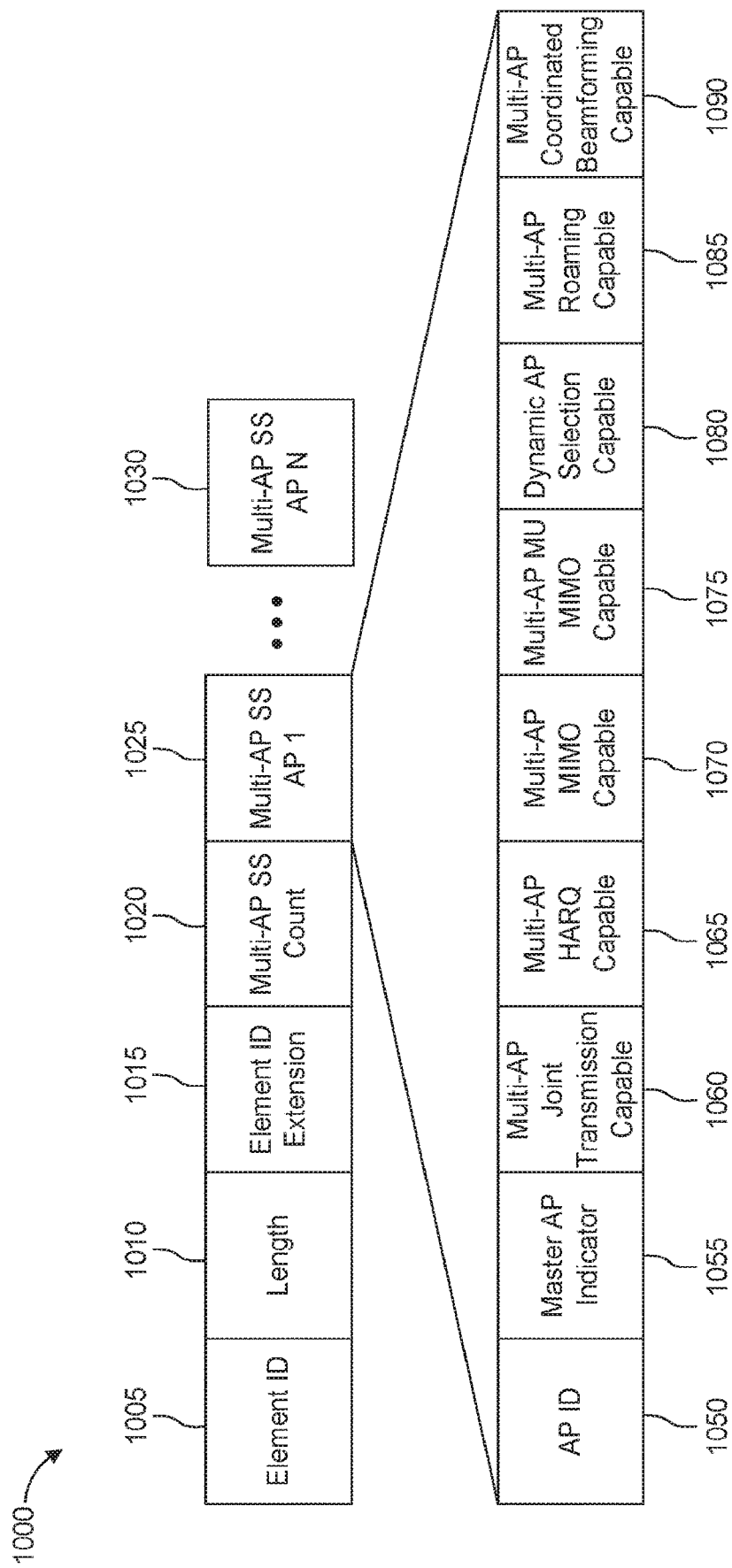
FIG. 10 is a diagram illustrating an example multiple AP service set (SS) element.

At step 860, the STA may receive, from the multiple APs, probe response frames in response to the probe request frame(s). Each of the probe response frames may include one or more indicators indicating multiple AP operation capabilities of the APs that transmitted the probe response frames to the STA. For example, each of the probe response frames includes a multiple AP service set element, as illustrated in FIG. 10, for each of the APs that transmitted the probe response frame. Based on the multiple AP service set element, the STA may identify multiple AP parameters (e.g., group and multiple AP service set) for the multiple AP operation with the multiple APs. The multiple AP service set element may include, but are not limited to, a multiple AP joint transmission capability, a multiple AP hybrid automatic repeat request (HARQ) capability, a multiple AP multiple-input multiple-output (MIMO) capability, a dynamic AP selection capability, a multiple AP roaming capability, and a multiple AP coordinated beamforming capability.

In one embodiments, if AP1, AP2 and AP3 belong to the same multiple AP service set that provide the multiple AP operation to the STA, each of the probe response frames provides capability information for each of AP1, AP2, and AP3. For example, the probe response frame transmitted by AP1 includes capability information of AP2 and AP3 in addition to the capability information of transmitting AP1. Similarly, the probe response frame transmitted by AP2 includes capability information of AP1 and AP3 in addition to the capability information of transmitting AP2.

In another embodiment, if AP1 and AP2 belong to the same multiple AP service set, but AP3 does not belong to the multiple AP service set to which AP1 and AP2 belong, each of the probe response frames transmitted from AP1 and AP2 includes capability information of each of AP1 and AP2. However, the probe response frame transmitted from AP3 may not include capability information for AP1 and AP2, but may include capability information of other APs in a different multiple AP service set to which AP3 belongs. For example, the probe response frame transmitted by AP1 includes capability information of AP2 in addition to the capability information of AP1. However, the probe response frame transmitted by AP3 may include capability information of AP3, AP4 and AP5 where AP3, AP4, and AP5 form a different multiple AP service set than the multiple AP service set to which AP1 and AP2 belong.

Figure 9:
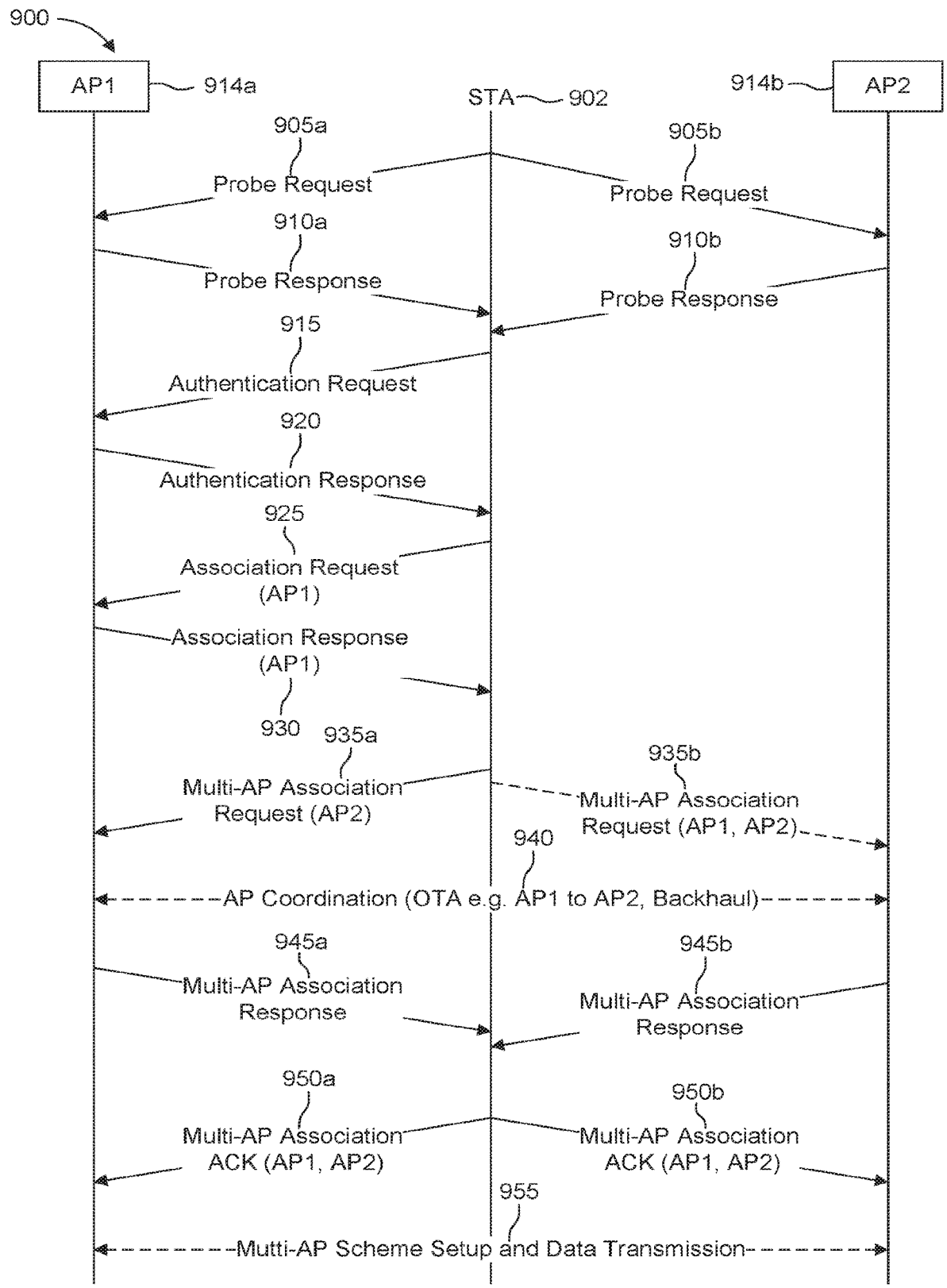
FIG. 9 is a diagram illustrating an example multiple AP association initiated by STA.

At step 865, the STA may transmit authentication request frames to the multiple APs and receive, at step 870, authentication response frames from the multiple APs. In one example, as illustrated in FIG. 8A, the STA may transmit an authentication request frame 815a to AP1 814a and receive an authentication response frame 820a from AP1 814a. The STA may then transmit another authentication request frame 815b to AP2 814b and receive another authentication response frame 820b from AP2 814b. In another example, as illustrated in FIG. 9, the STA may only transmit an authentication request frame 915 to AP1 914a and receive an authentication response frame 920 from AP1 914a in case that the STA is associated with AP1 914a before the multiple AP association procedure is initiated with AP2 914b.

At step 875, the STA may transmit one or more multiple AP association request frames to the multiple APs for the multiple AP association. Specifically, the multiple AP association request frame may enable the multiple APs to coordinate each other to form the multiple AP association that provides the multiple AP operation to the STA. For example, once the APs receive the multiple AP association request frame, the APs may communicate each other APs via the backhaul link between the APs until all the APs in the multiple AP service set become aware of the STA's association with the APs in the multiple AP service set. In an example, a primary AP may send OTA signals to secondary APs (and tertiary APs) to inform that the STA is associated with the multiple AP service set that includes the APs (e.g., the primary, secondary, and tertiary APs) for the multiple AP operation. The multiple AP association request frame may be broadcasted to all the APs in the multiple AP service set or individually transmitted to each of the multiple APs in the multiple AP service set.

At step 880, the STA may receive, from the multiple APs, multiple AP association response frames that includes one or more indicators indicating acceptance or rejection of the multiple AP operation with the multiple APs. For example, the STA may receive, from AP1, a first multiple AP association response frame that includes an indicator indicating acceptance or rejection of the multiple AP operation with AP1. The STA may then receive, from AP2, a second multiple AP association response frame that includes an indicator indicating acceptance or rejection of the multiple AP operation with AP2. The multiple AP association response frames may be received at the STA in a predetermined order or a random order until all the multiple AP association response frames are received correctly. For example, the multiple AP association response frames may be received in the order of APs listed in the multiple AP service set. The multiple AP association response frames received at the STA may not overlap each other so that the STA has time to decode the multiple AP association response frame from AP1 before the STA receives the next multiple AP association response frame from AP2.

At step 885, the STA may transmit multiple AP association acknowledge (ACK) frames to the multiple APs that transmitted the multiple AP association response frames if the multiple AP association response frames are correctly received (regardless of whether the multiple AP association response frames include acceptance or rejection for the multiple AP operation). The STA may also transmit multiple AP association negative acknowledge (NACK) frames to the multiple APs that transmitted the multiple AP association response frames if the multiple AP association frames are not correctly received (regardless of whether the multiple AP association response frames include acceptance or rejection for the multiple AP operation). For example, if a first multiple AP association response frame from AP1 is correctly decoded at the STA, the STA may transmit, to AP1, a first multiple AP association ACK frame. If the first multiple AP association response frame from AP1 is not correctly decoded at the STA, the STA may transmit, to AP1, a first multiple AP association NACK frame. Similarly, if a second multiple AP association response frame from AP2 is correctly decoded at the STA, the STA may transmit, to AP2, a second multiple AP association ACK frame. If the second multiple AP association response frame from AP2 is not correctly decoded at the STA, the STA may transmit, to AP2, a second multiple AP association NACK frame.

At step 890, once the STA received the multiple AP association response frames from the APs in the multiple AP service set and the multiple AP association response frames indicate acceptance of the multiple AP operation with the APs, the STA may initiate the multiple AP operation with the APs by transmitting and/or receiving data to and/or from the APs. Specifically, if the first multiple AP association response frame received from AP1 indicate acceptance of the multiple AP operation with AP1 and the second multiple AP association response frame received from AP2 indicate acceptance of the multiple AP operation with AP2, the STA may transmit and/or receive data with the AP1 and AP2, for example, using coordinated orthogonal frequency-division multiple access (OFDMA) or coordinated nulling. The STA may also perform, with the multiple APs (e.g., AP1 and AP2), joint transmission/reception, HARQ feedback, MIMO, dynamic AP selection, and multiple AP roaming.

FIG. 9 illustrates an example multiple AP association 900 initiated by a STA, which may be used in combination of any of other embodiments described herein. As illustrated in FIG. 9, a STA 902 may identify candidate APs (e.g., AP1 914a and AP2 914b) using the existing IEEE 802.11 probe request/probe response mechanism and associate with a single AP (e.g., AP1 914a). For example, the STA 902 may identify the candidate APs (e.g., AP1 914a, AP2 914b) in its proximity based on active scanning as described above. The candidate APs (e.g., AP1 914a and AP2 914b) may be included in a multiple AP service set or multiple AP service set that provide the support for the multiple AP association, transmission, and/or reception between the STA and the candidate APs. In an example, AP1 914a may be identified as a primary AP and AP2 914b may be identified as a secondary AP in the same multiple AP service set. Once the candidate APs 914a, 914b are identified, the STA 902 may transmit probe request frames 905a, 905b to the APs 914a, 914b and receive probe response frames 910a, 910b from the APs 914a, 914b. The STA 902 may then perform authentication and association procedures with an AP (e.g., AP1 914a). For example, the STA may transmit an authentication request frame 915 to AP1 914a and receive an authentication response frame 920 from AP1 914a. Once the STA 902 is authenticated by AP1 914a, the STA 902 may send an association request frame 925 to AP1 914a and receive an authentication response frame 930 from AP1 914a. The STA 902 may then initiate a multiple AP association with information on one or more suitable candidate APs, f or example, in the multiple AP service set. The candidate APs (e.g., AP1 914a and AP2 914b) may be identified from probe response frames 910a, 910b from other APs during the probe request/probe response phase.

In case that the STA 902 is first associated with the primary AP (e.g., AP1 914a) as illustrated in FIG. 9, the STA 902 may send a multiple AP association request frame 935a (or announcement frame) to its primary AP (e.g., AP1 914a) with information on the candidate APs (e.g., AP1 914a and AP2 914b) or multiple APs in the multiple AP service set. Alternatively or additionally, the STA 902 may send a multiple AP association request frame 935b (or announcement frame) to the candidate AP (e.g., AP2 914b) with information on the other AP (e.g., AP1 914a) or other multiple APs in the multiple AP service set. The STA 902 may sequentially add one new AP to its own multiple AP service set. The APs 914a, 914b may track one or more STAs (e.g., STA 902) connected to or associated with each of the multiple AP service sets and may use this information to schedule the multiple AP schemes or multiple AP operation with the STAs.

In an embodiment, the STA 902 may send an indication of a priority in which the multiple APs (e.g., AP1 914a and AP2 914b) are to be associated in the multiple AP service set, including the capability of changing the primary AP (e.g., AP1 914a) to secondary AP (e.g., AP2 914b), tertiary AP, or so forth, as well as indicating the new primary AP. The priority order may be explicitly signaled in the multiple AP association request frames 935a, 935b, or the AP priority may be implicitly signaled by the order in which the AP identifiers appear in the multiple AP association request frames 935a, 935b. On receipt of the multiple AP association request frames 935a, 935b, the APs 914a, 914b may perform some AP coordination procedures 940, such as transferring security information from the primary AP (e.g., AP1 914a) to the secondary AP (e.g., AP2 914b) and/or ensuring that the AP (e.g., AP1 914a) can only connect to the secondary AP (e.g., AP2 914b) to ensure that they are able to coordinate in the manner requested. This may involve higher layer signaling through a backhaul or an AP coordinator. Alternatively or additionally, the primary AP (e.g., AP1 914a) may send an OTA signal to the secondary AP (e.g., AP2 914b) with details of the coordination request and type of data needed.

The APs 914a, 914b may then send multiple AP association response frames 945a, 945b to the STA 902 as illustrated in FIG. 9. In one embodiment, each AP 914a, 914b may send an independent multiple AP association response frame 945a, 945b to the STA 902. The multiple AP association response frames 945a, 945b may be sent in a manner that ensures separability in code, time, frequency and/or space. Alternatively or additionally, the multiple AP association response frames 945a, 945b may be sent using the downlink multiple AP scheme as requested (e.g., joint transmission or as a test of the system). The multiple AP association response frames 945a, 945b may accept the multiple AP scheme requested by the STA 902 in the multiple AP association request frames 935a, 935b, or reject the multiple AP scheme requested by the STA 902 in the multiple AP association request frames 935a, 935b. Alternatively or additionally, the multiple AP association response frames 945a, 945b may suggest an alternative scheme to the scheme requested by the STA 902.

The STA 902 may then reply with a multiple AP association ACK frame 950a, 950b to both APs 914a, 914b to ensure that both APs 914a, 914b know that the STA 902 is now ready for the multiple AP transmission/reception setup. Although it is not illustrated in FIG. 9, on a condition that one of the APs 914a, 914b is unable to accept the multiple AP association request (e.g., 935a or 935b) and does not send a multiple AP association response (e.g., 945a or 945b), the multiple AP association ACK frame (e.g., 950a or 950b) may ensure that the other AP (e.g., 914a or 914b) is aware that it is the primary AP and should not set up a multiple AP transmission/reception procedure 955. For example, assuming that AP2 914b is unable to accept the multiple AP association request 935b and does not send the multiple AP association response 945b (not illustrated in FIG. 9), the multiple AP association ACK frame 950a may ensure that AP2 914b is aware that AP1 914a is the primary AP and AP2 914b should not set up a multiple AP transmission/reception procedure 955. This may enable a fall back to single AP association if the multiple AP association procedure is unsuccessful.

In an embodiment, an AP may transmit a multiple AP service set element to indicate that the AP is part of a multiple AP service set (SS). Being part of a multiple AP SS may imply that the AP is capable of conducting multiple AP transmissions/receptions. Such capabilities may also be explicitly indicated.

FIG. 10 illustrates an example multiple AP service set (SS) element 1000, which may be used in combination of any of other embodiments described herein. As illustrated in FIG. 10, the multiple AP SS element 1000 may comprise element ID 1005 and element ID extension fields 1015, a length field 1010, a multiple AP SS AP count field 1020, and multiple AP SS AP 1-N fields 1025, 1030. A combination of the element ID 1005 and element ID extension fields 1015 may indicate that the current element is a multiple AP SS element 1000. The length field 1010 may be used to indicate the length of the multiple AP SS element 1000. The multiple AP SS AP count field 1020 may indicate how many information fields are included in the multiple AP SS element 1000. In an embodiment, if only one field is contained, such as the information field regarding the transmitting STA, then the multiple AP SS AP count field 1020 may be omitted. In other embodiments, this multiple AP SS AP count field 120 may be used to indicate the size of the multiple AP service set, such as by indicating how many APs are contained in the multi-STA service set.

The N multiple AP SS AP fields 1020, 1030 may comprise information regarding each of the APs that are a part of the multiple AP service set. In an embodiment, the number of fields may be indicated in the multiple AP SS AP count field 1020. In other embodiments, only one AP may be contained in the information. The information included in the one or more subfields of the N multiple AP SS AP fields 1020, 1030 may include, for each of the APs, the AP ID 1050 (such as MAC address of the AP or other identifier or identifiers), the master AP indicator 1055 (e.g., an indication of whether the AP included in this field is the master or primary AP or a slave AP, various multiple AP capability indications. Examples of the various multiple AP capabilities may include, but are not limited to, capability to support multiple AP joint transmission 1060, multiple AP HARQ 1065, multiple AP MIMO 1070, multiple AP MU-MIMO 1075, dynamic AP selection 1080, multiple AP roaming 1085 and multiple AP coordinated beamforming 1090, and order (e.g., a subfield that may indicate the order of the each member AP being identified in the multiple AP service set). In embodiments, the order subfield associated with a member AP may indicate the order of the AP within the multiple AP service set.

The designs, fields and subfields just described are examples and may be implemented using existing or new fields, subfields, elements, MAC/PLCP headers, or any part of a transmitted frame.

An AP may include a multiple AP SS element, for example, in its beacon, short beacon, probe response, association response, or fast initial link setup (FILS) discovery frame, to indicate that the AP is a part of a multiple AP service set. The AP may also indicate its own multiple AP capabilities, including, for example, support for multiple AP joint transmission, multiple AP HARQ, multiple AP MIMO, multiple AP MU-MIMO, dynamic AP selection, multiple AP roaming and multiple AP coordinated beamforming. The AP may also indicate whether it is a master (coordinator) or slave AP within the multiple AP service set. The AP may also indicate whether the field is related to the transmitting AP or receiving AP. In addition, the multiple AP SS element may include information of one or more member APs in the same multiple AP service set. The multiple AP SS element may provide information regarding other member APs' multiple AP capabilities, such as whether they support multiple AP joint transmission, multiple AP HARQ, multiple AP MIMO, multiple AP MU-MIMO, dynamic AP selection, multiple AP roaming and multiple AP coordinated beamforming. The multiple AP SS element may also indicate whether other member APs are master or slave APs. In some embodiments, the AP may also provide information regarding one or more or all other member APs in the same multiple AP SS in another element, such as an indication using one of the reserved bits in the reduced neighbor report element or neighbor report elements, including indication of the IDs (BSSIDs, SSIDs), capabilities or their being master or slave APs. In addition, the member APs in the multiple AP service set may be ordered in such a way that the order of the member APs included in the multiple AP SS element is the multiple AP SS (MASS), which may be identified by an SSID or a MASSID and/or provided in the multiple AP SS element.

A non-AP STA may monitor the medium for, for example, beacons, short beacon, or FILS discovery frames, to discover the appropriate AP or MASS. The non-AP STA may send a probe request targeting an AP and/or MASS in order to discover one or more APs within its range that are members of a particular MASS. A non-AP STA may include a multiple AP capabilities element in the probe request frames, which may imply that it can support multiple AP transmission and/or reception. It may include the STA's capabilities for supporting multiple AP transmissions, such as supporting multiple AP joint transmission, multiple AP HARQ, multiple AP MIMO, multiple AP MU-MIMO, dynamic AP selection, multiple AP roaming and multiple AP coordinated beamforming. Such capabilities may also be included in a capabilities element, such as an extremely high throughput (EHT) capabilities element.

A non-AP STA that receives a multiple AP SS element from an AP, which may be included in a beacon, short beacon, probe response, association response frame, FILS discovery frame, or any other kind of frame, may understand that the AP is part of a multiple AP service set and that certain multiple AP transmission capabilities may be supported by the APs in the multiple AP service set. In addition, it may discover the identities and/or the capabilities of one or more member APs in the same multiple AP SS (MASS).

After discovering the information for one or more member APs of the same MASS, the STA may send another frame, such as a probe request frame, multiple AP probe request or MASS probe request, that may include the SSID, the MASS ID and/or one or more IDs, such as MAC address, of the member APs that the STA is targeting. In other embodiments, the STA may send a probe request frame targeting the MASS ID, and the probe request frame may include a bit map with one or more bits set to 1, which may indicate a member AP that may be associated with the order of the member AP in the MASS, for which a probe response is being requested. The probe request frame may also include an indication that it is a probe request for a MASS. A member AP of the MASS, after receiving the probe request targeted at the MASS ID, including its MAC address, or identified by a bit 1 in the bitmap, may respond with a probe response. In other embodiments, a member AP of the MASS, after receiving the probe request targeted at the MASS ID, may respond with a probe response.

Alternatively or additionally, the probe request sent by the non-AP STA may also include the transmit power used to transmit the probe request and a received power threshold. Any targeted member AP, such as from a targeted MASS, that received the probe request frame below the received power threshold may ignore the probe request frame. Otherwise, the AP may respond with a probe response.

The non-AP STA may have a list of parameters, such as MCS, RSSI or other channel quality parameters, of member APs of a MASS that it discovered after monitoring the medium and receiving targeted probe responses, beacons, short beacons, FILS Discovery frames, or other type of frames from the member APs. It may select one or more member APs in the MASS to be its designated APs. One of the designated APs may serve as the primary AP while one or more APs may serve as one or more secondary APs for the STA.

If the AP and/or the MASS satisfies requirements of the non-AP STA, it may send an association request or a multiple AP association request to the selected AP, including a multiple AP selection element. FIG. 11 illustrates an example multiple AP selection element 1100, which may be used in combination of any of other embodiments described herein.

The multiple AP selection element 1100 may include element ID 1105 and element ID extension fields 1115, a length field 1110, a multiple AP capabilities field 1120, a multiple AP service requested field 1125, an AP information count field 1130, and N AP information fields 1135, 1140. A combination of the element ID 1105 and element ID extension fields 1115 may indicate that the current element is a multiple AP selection element 1100. The length field 1110 may be used to indicate the length of the multiple AP selection element 1100. The multiple AP capabilities field 1120 may be used to indicate the capabilities of the STA for multiple AP transmissions/reception, including, for example, multiple AP joint transmission, multiple AP HARQ, multiple AP MIMO, multiple AP MU-MIMO, dynamic AP selection, multiple AP roaming and multiple AP coordinated beamforming. The multiple AP service requested field 1125 may indicate the multiple AP services that are being requested by the transmitting AP, including multiple AP joint transmission, multiple AP HARQ, multiple AP MIMO, multiple AP MU-MIMO, dynamic AP selection, multiple AP roaming and multiple AP coordinated beamforming. The AP information count field 1130 may indicate the number of AP information fields that are included. The N AP information fields 1135, 1140 may include information on member APs for which multiple AP service is being requested. Examples of the N AP information fields 1135, 1140 may include, but are not limited to, an AP ID 1150, a primary/secondary indicator 1155, a received power/channel quality indication 1160 and a mandatory indicator 1165. The AP ID 1150 may be a MAC address or order of the member AP in the MASS. The primary/secondary indicator 1155 may indicate a request for the AP to be accepted as a primary or secondary AP, if applicable. The received power/channel quality indication field 1160 may indicate the channel quality between the AP and the transmitting STA, such as RSSI, RSRP or RCPI. The mandatory indicator 1165 may indicate whether the transmitting STA is requesting that the target AP be mandatory or optionally accepted. Alternatively or additionally, if a STA does not have sufficient information regarding the member APs of the targeted MASS, it may indicate, in the multiple AP selection element 1100, that it is requesting information on other member APs that support multiple AP services. The AP may respond with a frame, such as a probe response or beacon, short beacon, or FILS discovery frame, which may include a multiple AP element to provide the requested information.

In embodiments, the non-AP STA may send one or more association request frames or multiple AP association request frames to all desired member APs that include the multiple AP selection element. After receiving the association request frame or the multiple AP association request frame, the AP may decide whether it will accept the association as a primary/secondary AP as requested. Alternatively or additionally, the primary AP identified in the probe request frame may forward the association request to any secondary APs that are identified in the association/authentication request or multiple AP association/authentication request. If the primary AP is a slave AP, the primary AP may forward the association/authentication request for one or more secondary APs to the master AP, which may conduct association with the secondary APs on the STA's behalf. Such forwarding and responding may take place on the wireless medium, use wired backbones, use a different band, or use frequency channels. Once the secondary APs respond, the primary AP may send a multiple AP association/authentication response frame to the requesting STA. The multiple AP association/authentication response frame may include the status as to whether the association/authentication with the primary AP and the secondary APs is successful.

In one embodiment, a non-AP STA may request association with a first AP, such as a selected primary AP. Once the STA is associated with the primary AP, the STA may receive a list of other member APs of the same MASS in the AP's beacon, short beacon, probe response, association response, or other type of frame. The STA may send one or more probe request frames targeting the SSID of the MASS and/or one or more IDs, such as MAC addresses, of the member APs that the STA is targeting. In another embodiment, the STA may send a probe request frame targeted at the MASS ID, and the probe request frame may include a bit map with each bit set to 1, which may indicate a member AP that may be associated with the order of the member AP in the MASS for which a probe response is being requested. The probe request frame may also include an indication that it is a probe request for a MASS. A member AP of the MASS, after receiving the probe request frame that is at least one of targeted at the MASS ID and/or its MAC address or identified by a bit 1 in the bitmap, may respond with a probe response frame.

Alternatively or additionally, the probe request frame sent by the non-AP STA may also include the transmit power used to transmit the probe request and a received power threshold. Any targeted member AP that received the probe request frame below the received power threshold may ignore the probe request frame.

The non-AP STA may have a list of parameters, such as MCS, RSSI or other channel quality parameters of member APs of a MASS that it discovered after monitoring the medium and receiving targeted probe response frame. The STA may select one or more member APs in the MASS to be its secondary APs.

The non-AP STA may subsequently send a frame, such as a multiple AP association request frame or a multiple AP service negotiation frame, to its primary AP. The multiple AP association request frame or multiple AP service negotiation frame may contain the multiple AP selection element, which may indicate a request for certain multiple AP service and/or a number of secondary APs. The primary AP may then decide whether to provide the multiple AP service to the STA. Alternatively or additionally, such decision may be made at the master AP of the MASS. The primary AP may forward the multiple AP request to any secondary APs that are identified in the multiple AP association request frame or multiple AP negotiation frame. If the primary AP is a slave AP, it may forward the multiple AP association request frame or multiple AP service negotiation request for one or more secondary APs to the master AP, which may then conduct the multiple AP service negotiation with the secondary APs on the STA's behalf. Such forwarding and responding may take place on the wireless medium (e.g., OTA), use wired backbones, use a different band, or use different frequency channels. Once the secondary APs respond, the primary AP may send the multiple AP association response frame or multiple AP service negotiation response frame to the requesting STA including the status that indicates: (1) whether the multiple AP service will be provided; (2) which multiple AP service will be provided; (3) which member APs are successfully added as the STA's secondary APs; and (4) which multiple AP service will be provided.

For coordinated OFDMA, in embodiments, a STA may autonomously estimate if the STA is located in a BSS edge (i.e. BSS edge STA) or a BSS center (i.e. BSS center STA) relative to its primary or serving BSS. For example, path loss, geography or BSS position may be used for the estimation. However, in a dense network, such as an apartment building with many overlapping basic service sets (OBSSs), the interaction between the BSSs may determine if a STA needs to be placed in the BSS-edge group. This may require a procedure that involves the BSSs and the STA. The terms BSS center STA and cell center STA may be interchangeably used throughout this disclosure. The terms BSS edge STA and cell edge STA may be interchangeably used throughout this disclosure.

In an embodiment, multiple APs such as AP1 and AP2 may need to coordinate to decide to implement the coordinated OFDMA. In one example, AP1 may review the multiple AP associated STAs (i.e. STAs associated with multiple APs) and identify AP2 as an AP to coordinate with. The APs may automatically assign any STAs that are identified as multiple AP associated STAs as the BSS edge STAs. Alternatively or additionally, the APs may coordinate to send information to assist the STAs in estimating whether they are BSS edge or BSS center STAs.

In one embodiment, following steps may be performed for the coordinated edge/center discovery. At step 1, AP1 may send AP2 a coordination request frame (e.g., over the air or through a backhaul link). At step 2, AP1 may receive a coordination acknowledgement frame from AP2 if it is willing and able to coordinate with AP1. At step 3, AP1 may send a null data packet announcement (NDPA) frame to the AP2 and STAs in its BSS (i.e. both non-multiple AP associated STAs and multiple AP associated STAs). In one example, the AP2 may send an NDPA frame as an ACK to AP1 and to announce the upcoming NDP to STAs in its BSS (i.e. both non-multiple AP associated STAs and multiple AP associated STAs). This procedure may be used for general coordination or joint transmission. Alternatively or additionally, the steps described in this embodiment may be replaced by the multiple AP association procedures described above.

At step 4, AP1 and AP2 may send NDPs to the STAs in their BSSs. In one embodiment, AP1 and AP2 may send the NDPs at the same time. In such an embodiment, the difference in received RSSI between the NDPA and NDP may indicate if a STA is a BSS edge STA or a BSS center STA. If the difference in RSSI between the NDPA and NDP is less than a threshold, then the STA may be considered to be a BSS center STA because it may indicate that the signal from AP2 is not received. If the difference in RSSI between the NDPA and NDP is greater than a threshold, then the STA may be considered to be a BSS edge STA.

In another embodiment, the NDP frames from the APs may be orthogonal. In one example, the NDP frames may be orthogonal in time with the NDP from the AP2 sent a SIFS after the NDP from AP1. In another example, the NDP frames may be orthogonal in frequency (e.g., interlaced in frequency). The positions of the NDP frames may depend on NDP subcarrier spacing (e.g., Ng). As an example, if Ng equals four (NG=4) with interlace value which equals two (interlace value=2), then AP1 may send its NDP on subcarriers 0, 4, 8, . . . while AP2 may send its NDP on subcarriers 2, 6, 10, . . . In another example, the NDP frames may be sent as orthogonal or semi-orthogonal sequences.

Each STA may measure the RSSI of the NDP signal from each AP and then estimate the RSSI difference/ratio between the signal from its primary AP (e.g., AP1) and its secondary AP (e.g., AP2). If the RSSI difference/ratio is less than a threshold, then the STA may be considered to be a BSS edge STA. If the RSSI difference/ratio is greater than a threshold, then the STA may be considered to be a BSS center STA.

At step 5, the STAs, upon identifying whether they are BSS edge or BSS center STAs, may feedback this information to the APs. In one example, the AP may poll each STA for the feedback information. In another example, the STAs may use the NDP feedback report to provide the feedback information. In this example, the AP may send an NDP feedback report poll (NFRP) trigger frame with parameters that indicate a request for the information whether the STA is a BSS center or edge STA. In another example, the NFRP trigger frame may transmit one or more additional parameters indicating the cut-off values for cell center/cell edge classification (e.g., edge Tx power, signal-to-interference ration (SIR) cut-off value or RSSI difference). At SIFs duration after the receipt of the NFRP trigger frame, the STAs may transmit the required information in an NDP feedback report. In an example, only STAs of a certain type may transmit the information, implying that any STA that does not transmit the NDP feedback report is of the other type. The APs may recognize the STAs that transmitted the NDP feedback reports as the BSS center STA/BSS edge STAs and the STAs that did not transmit the NDP feedback reports as the BSS edge STAs/BSS center STAs. In another example, all STAs may send feedback with information specifying the type of STA (e.g., BSS edge or center STA). In another example, the STAs may use an HE-CQI report to feedback the RSSI or RSSI difference. This may be for a single spatial-temporal subband (STS) and averaged over the entire bandwidth.

Figure 12:
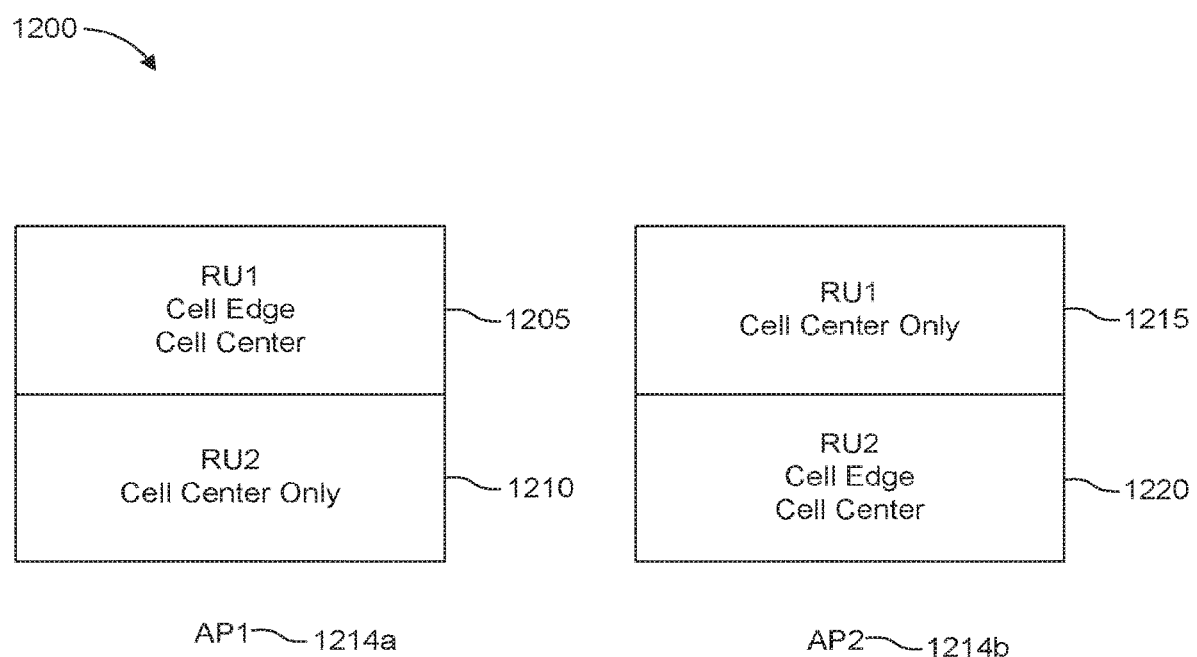
FIG. 12 is a diagram illustrating an example of scheduled/random access coordinated OFDMA.

From the STA point of view, the STA that is associated with multiple APs and identifies primary and secondary APs, may first identify a multiple AP discovery NDPA from AP1. The STA may identify the multiple AP discovery NDPA from AP2. The STA may then estimate the required measurement from the NDP. For example, the STA may identify SIR NDP and estimating SIR (RSSI1-RSSI2; per tone or averaged). The STA may identify SIR cut-off for center/edge determination from NFRP. The STA may send signals to the APs that includes center/edge indicators. Alternatively or additionally, the STA may send SIR in an HE-CQI frame and allow the APs to decide whether the STA is the BSS center or edge STA FIG. 12 illustrates an example of scheduled/random access coordinated OFDMA 1200, which may be used in combination of any of other embodiments described herein. The data transmission may be scheduled or random access coordinated OFDMA. For the scheduled data transmission in the downlink and uplink, APs 1214a, 1214b may schedule the appropriate STAs in the corresponding resources with transmit power control or coordinated beamforming/nulling (CB/N). Assuming that AP1 1214a is assigned RU1 1205 and AP2 1214b is assigned RU2 1220, cell edge STAs may be assigned by AP1 1214a in RU1 1205, cell edge STAs may be assigned by AP2 1214b in RU2 1220 and cell center STAs may be assigned by AP1 1214a in both RU1 1205 and RU2 1210 and by AP2 1214b in both RU1 1215 and RU2 1220. The cell center STAs may transmit as is with power control to limit the amount of interference with the cell center/edge STAs of the other BSS. The cell center STAs may transmit using a CB/N scheme, as described in more detail below, to limit the amount of interference with the cell center/edge STAs of the other BSS.

For random access (RA) data transmission in the uplink, the APs 1214a, 1214b may use coordinated uplink OFDM random access. As illustrated in FIG. 12, AP1 1214a may allow both edge and center STAs to set RU1 1205 as an eligible RA-RU (e.g., an RA-RU for which the HE STA is capable of generating an HE TB PPDU). AP1 1214a may set RU2 1210 as an eligible RA-RU for center STAs only. Similarly, AP2 1214b may allow both edge and center STAs to set RU2 1220 as an eligible RA-RU (e.g., an RA-RU for which the HE STA is capable of generating an HE TB PPDU). AP2 1214b may set RU1 1215 as an eligible RA-RU for center STAs only.

For simplified signaling, in some embodiments, center and edge STAs may be manually assigned to a group ID. The group ID may be assigned to specific RA-RUs. Alternatively or additionally, cell edge and center STAs may be assigned to specific AIDs/AID groups, and RA-RUs may be assigned to those specific AIDs/AID groups.

Figure 13:
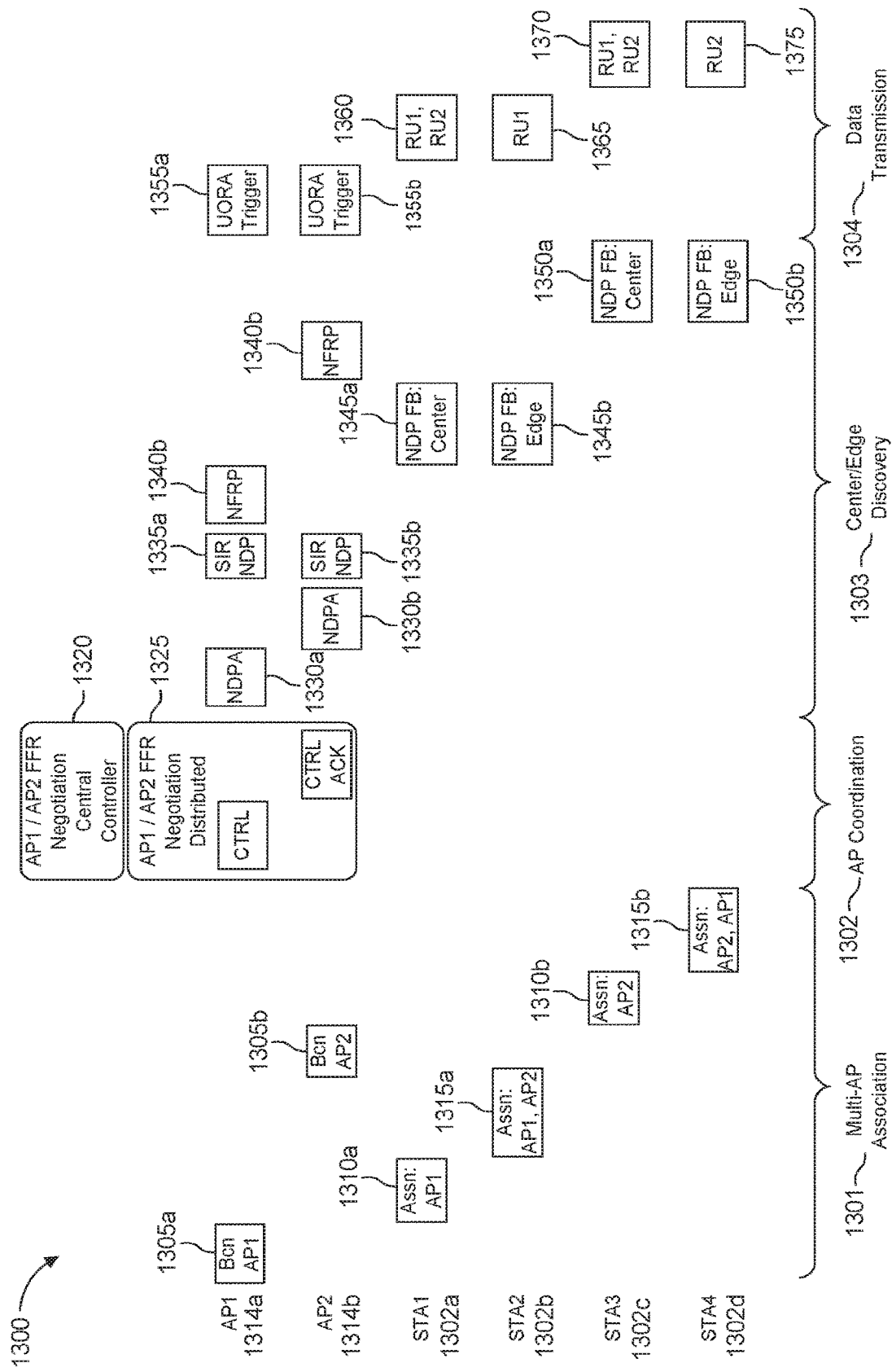
FIG. 13 is a signaling diagram illustrating an example of multiple AP association, cell center/cell edge discovery and data transmission.

FIG. 13 is a system diagram of an example 1300 of multiple AP association, cell center/cell edge discovery and data transmission, which may be used in combination of any of other embodiments described herein. In this example, it is assumed that STA1 1302a is a BSS center STA relative to AP1 1314a, STA2 1302b is a BSS edge STA relative to AP1 1314a, STA3 1302c is a BSS center STA relative to AP2 1314b, and STA4 1302d is a BSS edge STA relative to AP2 1314b. It is also assumed that STA2 1302b and STA4 1302d are located in cell edges from AP1 1314a and AP2 1314b. As illustrated in FIG. 13, during the multiple AP association phase 1301, STA1 1302a may receive a beacon frame 1305a from AP1 1314a and perform the association procedure with AP1 1314a. STA2 1302b located in the cell edges from AP1 1314a and AP2 1314b may receive both the beacon frames 1305a, 1305b from AP1 1314a and AP2 1314b and perform multiple AP association procedure with AP1 1314*a* and AP2 1314*b* as described above. Similarly, STA3 1302*c* may receive a beacon frame 1305*b* from AP2 1314*b* and perform the association procedure with AP2 1314*b*. STA4 1302*d* located in the cell edges from AP1 1314*a* and AP2 1314*b* may receive both the beacon frames 1305*a*, 1305*b* from AP1 1314*a* and AP2 1314*b* and perform multiple AP association procedure with AP1 1314*a* and AP2 1314*b* as described above.

During or after the multiple AP association phase 1301, AP1 1314*a* and AP2 1314*b* may perform AP coordination procedures 1302 to ensure that the APs 1314*a*, 1314*b* are able to provide multiple AP operation to STA2 1302*b* and STA 4 1302*d*. The AP coordination procedures 1302 may be performed in a centralized manner or a distributed matter. In one example, AP1 1314*a* and AP2 1314*b* may negotiate fractional frequency reuse (FFR) through a centralized controller that communicates with AP1 1314*a* and AP2 1314*b* via backhaul links or OTA signals as illustrated in step 1320. In another example, AP1 1314*a* and AP2 1314*b* may directly negotiate fractional frequency reuse (FFR) via the backhaul link or OTA signals as illustrated in step 1325. Specifically, AP1 1314*a* may send a control message to AP2 1314*b* and receive an ACK from AP2 1314*b* for the FFR negotiation.

During the center/edge discovery phase 1303, AP1 1314*a* may send an NDPA frame 1330*a* to AP2 1314*b* and STAs 1302*a*, 1302*b* in its BSS. Similarly, AP2 1314*b* may send an NDPA frame 1330*b* to AP1 1314*a* and STAs 1302*c*, 1302*d* in its BSS. AP1 1314*a* may then send an signal-to-noise interference ration (SIR) NDP frame 1335*a* to STAs 1302*a*, 1302*b* in its BSS so that STAs 1302*a*, 1302*b* may estimate the SIR, for example, the RSSI difference between the received NDPA frame 1330*a* and the received SIR NDP frame 1335*a*. Similarly, AP2 1314*b* may then send an SIR NDP frame 1335*b* to STAs 1302*c*, 1302*d* in its BSS so that STAs 1302*c*, 1302*d* may estimate the SIR, for example, the RSSI difference between the received NDPA frame 1330*b* and the received SIR NDP frame 1335*b*. At this point, STAs 1302*a*, 1302*b*, 1302*c*, 1302*d* may identify whether they are cell edge or center STAs, for example, based on the estimated SIR. AP1 1314*a* may send an NDP feedback report poll (NFRP) frame 1340*a* to STA1 1302*a* and STA2 1302*b* to request the information whether the STAs 1302*a*, 1302*b* are cell center or edge STAs. Upon receiving the NFRP frame 1340*a*, STA1 1302*a* may respond an NDP feedback frame 1345*a* indicating that STA1 1302*a* is the cell center STA and STA2 1302*b* may respond an NDP feedback frame 1345*b* indicating that STA2 1302*b* is the cell edge STA. Similarly, AP2 1314*b* may also send an NFRP frame 1340*b* to STA3 1302*c* and STA4 1302*d* to request the information whether the STAs 1302*c*, 1302*d* are cell center or edge STAs. Upon receiving the NFRP frame 1340*b*, STA3 1302*c* may respond an NDP feedback frame 1350*a* indicating that STA3 1302*c* is the cell center STA and STA4 1302*d* may respond an NDP feedback frame 1350*b* indicating that STA4 1302*d* is the cell edge STA.

During the data transmission phase 1304, AP1 1314*a* and AP2 1314*b* may transmit random access trigger frames to the STAs 1302*a*, 1302*b*, 1302*c*, 1302*d* to allocate resource units (RUs) for random access. For example, AP1 1314*a* may send a UL-OFDMA random access (UORA) trigger frame 1355*a* to STA1 1302*a* and STA2 1302*b* to indicate that STA1 1302*a* (i.e. cell center STA) is allocated to use RU1 and RU2 and STA2 1302*b* (i.e. cell edge STA) is allocated to use RU1. Upon receiving the UORA trigger frame 1355*a*, STA1 1302*a* may transmit data using RU1 and RU2 1360*a*, and STA2 1302*b* may transmit data to one or more APs 1314*a*, 1314*b* using RU1 1365. Similarly, AP2 1314*b* may send a UORA trigger frame 1355*b* to STA3 1302*c* and STA4 1302*d* to indicate that STA3 1302*c* (i.e. cell center STA) is allocated to use RU1 and RU2 and STA4 1302*d* (i.e. cell edge STA) is allocated to use RU1. Upon receiving the UORA trigger frame 1355*b*, STA3 1302*c* may transmit data using RU1 and RU2 1370, and STA4 1302*d* may transmit data to one or more APs 1314*a*, 1314*b* using RU1 1375.

In one embodiment, for coordinated OFDMA, a set of guard resources or guard RUs may be negotiated between resources allocated for coordinated OFDMA. This may allow for some inter-carrier interference without the need for tight synchronization.

Figure 14:
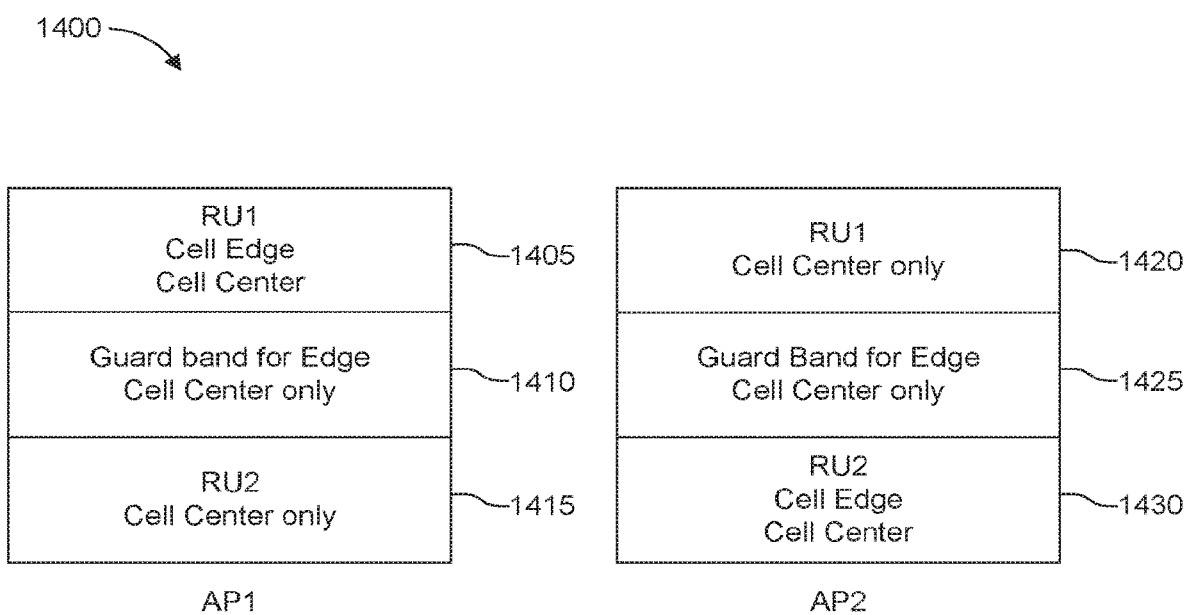
FIG. 14 is a diagram illustrating an example guard band for fractional coordinated OFDMA.

FIG. 14 illustrates an example guard band 1400 for fractional coordinated OFDMA, which may be used in combination of any of other embodiments described herein. As illustrated in FIG. 14, for AP1, RU1 1405 is allocated to the cell edge and center STAs and RU2 1415 is allocated to the cell center STAs. In this example, the resources allocated to the cell edge STAs (i.e. RU1 1405) may have a set of guard resources or guard RUs 1410. Similarly, for AP2, RU2 1430 is allocated to the cell edge and center STAs and RU1 1415 is allocated to the cell center STAs. The resources allocated to the cell edge STAs (i.e. RU2 1430) may have a set of guard resources or guard RUs 1430.

In one embodiment, cyclic prefix (CP) length modification may be used to ensure that CP length is larger than the sum of: (1) maximum timing offset of the STAs associated with BSS1; (2) the maximum timing offset of the STAs associated with BSS2; and (3) the maximum channel impulse response (CIR) length of BSS1 and BSS2. Although it is not described in the above example, this scheme is applicable to more than two BSSs by summing up the parameters for all BSSs in the coordinated BSS set.

In IEEE 802.11ax, a STA that transmits an HE TB PPDU in response to a triggering PPDU, such as a PPDU that includes a trigger frame or a frame having a triggered response scheduling (TRS) control subfield, from an AP, may ensure that the arrival time of the HE TB PPDU at the AP is within ±0.4 μs of TXTIME+aSIFSTime+RTD from the transmission start time of the triggering PPDU. Here, TXTIME may be that of the triggering PPDU and RTD may be the round-trip delay between the AP and the STA. In one embodiment, this may be modified in coordinated OFDMA to ensure that the existing CP length is adequate (e.g., the tolerance time may be halved for a 2 BSS coordination set). Additionally or alternatively, the tolerance time may be kept constant but the maximum CP length may be doubled for a 2 BSS coordination set. In a simple example, rather than 3 possible CP lengths in IEEE 802.11ax, six possible CP lengths may be used.

In another embodiment, each AP may calibrate the response timing of the STAs in its BSS and send timing advance/timing retardation requests to each STA in order to reduce the timing difference between the STAs. The maximum timing differences may then be sent to each AP to enable each AP to estimate the CP to be used. The information may be sent via a backhaul link to a centralized AP, which may estimate a common CP and send this information to each AP. Alternatively or additionally, the information may be sent via a backhaul link to a centralized AP, which may estimate BSS and/or STA specific CPs that may be sent to each AP. Alternatively or additionally, the information may be sent to each AP in the coordination set and the AP may then independently set its CPs. The information may be sent via a backhaul link or over the air (OTA) signals. For the OTA, in one example, the information may be transmitted in a special frame or in the extremely high throughput (EHT) preamble by edge STAs to allow neighboring APs in the set to overhear the information.

In one embodiment, a coordinated OFDMA synchronization trigger frame may be sent from a master AP. The master AP may be a separate AP that coordinates all the APs in the coordination set, such as the set of BSSs involved in the coordinated OFDMA transmission. Alternatively or additionally, the master AP may be one of the APs in the coordination set. This AP may be pre-determined, selected randomly or elected by the APs in the coordination set.

In another embodiment, a coordinated OFDMA synchronization trigger and/or sequence may be used. On receipt of a master trigger frame, all the APs in the group may send triggers to their respective STAs with a predetermined timing tolerance to ensure orthogonality. In some embodiments, the master trigger frame may be sent before any individual AP sends an individual trigger frame. Additionally or alternatively, the master trigger frame may be sent at configurable intervals. The individual trigger frames may be sent at specific times after the master trigger frame is received. The intervals may be configured statically or dynamically. If they are configured dynamically, an individual AP may request a master trigger transmission on a condition that its inter-carrier interference (ICI) exceeds a pre-determined threshold.

In another embodiment, the master AP may send a specific synchronization signal or sequence to initiate the start of the individual AP triggers, rather than a separate master trigger frame. In some embodiments, the master AP may send a trigger frame to all the edge STAs and request a calibration transmission. The other coordinating AP may then calibrate the start of its trigger frame based on the timing difference between the receipt of the end of the master trigger frame and the receipt of the start of the response of its edge STA. As such, on receipt of the master trigger frame from the master AP, it may be able to transmit its trigger frame to ensure that the transmitted frames within its BSS are synchronized with the master AP trigger.

In another embodiment, the master trigger frame may comprise information regarding the maximum length of the expected trigger frame expected. If the trigger frame for each AP is less than a required length, the AP may add padding to the trigger frame to ensure that the transmissions begin in such a manner as to ensure orthogonality. In some embodiments, the padding may be AP specific to provide a timing advance/timing retardation and allow for synchronization of the transmissions in the multiple BSSs.

Embodiments for coordinated beamforming/coordinated nulling (CB/CN) are described herein. In coordinated beamforming, the transmitting device (or STA), desired device (or STA) and non-desired device (or STA) may determine the procedure used and the type of feedback requested. Various architectures and embodiments are described herein that may be used.

Figure 15:
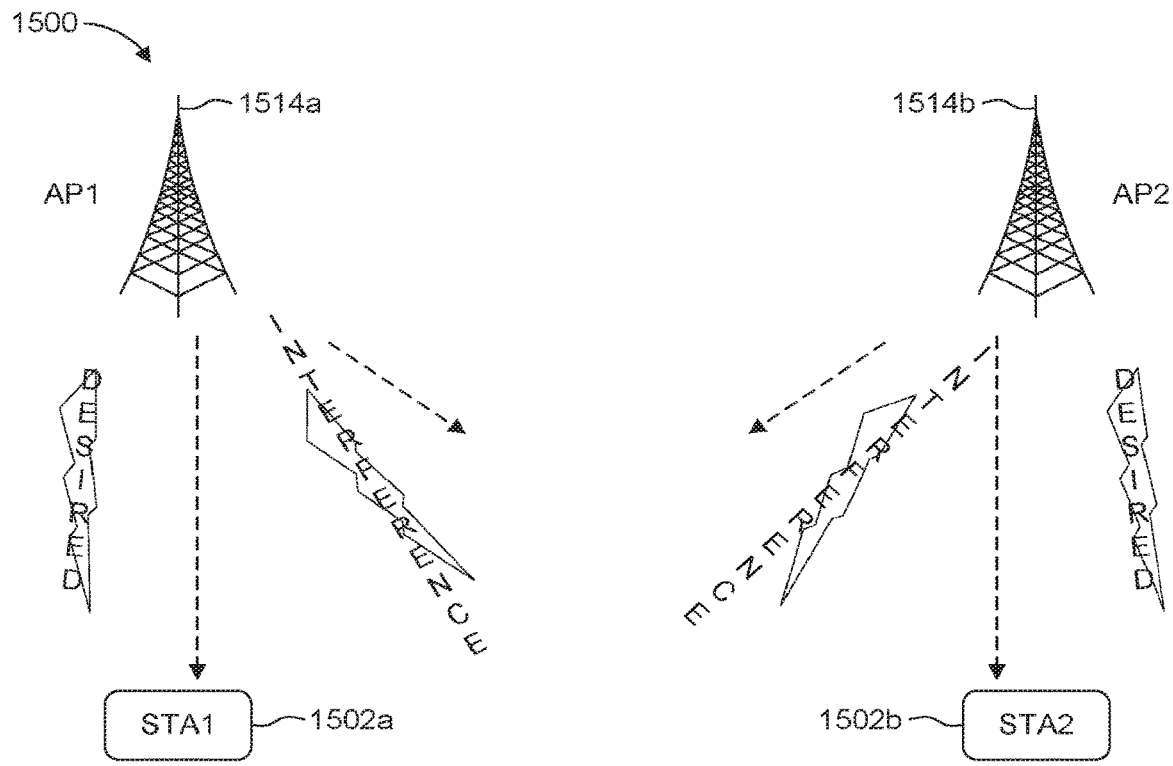
FIG. 15 is a diagram illustrating an example of downlink-downlink CB/CN.

FIG. 15 illustrates an example architecture 1500 for downlink-downlink CB/CN, which may be used in combination of any of other embodiments described herein. As illustrated in FIG. 15, the transmitting devices may be both AP1 1514 and AP2 1514*b*, and the desired and non-desired devices may be both STA1 1502*a* and STA2 1502*b* for the downlink-downlink CB/CN.

Figure 16:
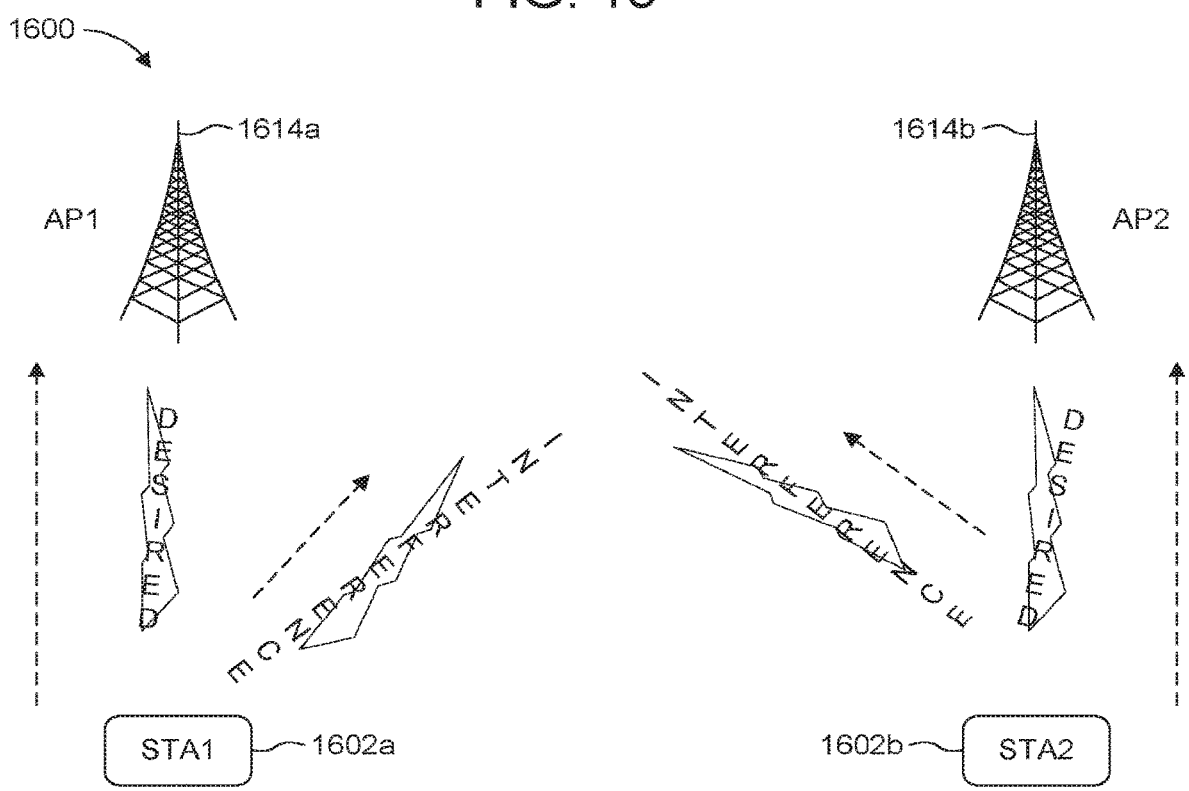
FIG. 16 is a diagram illustrating an example of uplink-uplink CB/CN.

FIG. 16 illustrates an example architecture 1600 for uplink-uplink CB/CN, which may be used in combination of any of other embodiments described herein. As illustrated in FIG. 16, the transmitting devices may be both STA1 1602*a* and STA2 1602*b*, and the desired and non-desired devices may be both AP1 1614*a* and AP2 1614*b*.

Figure 17:
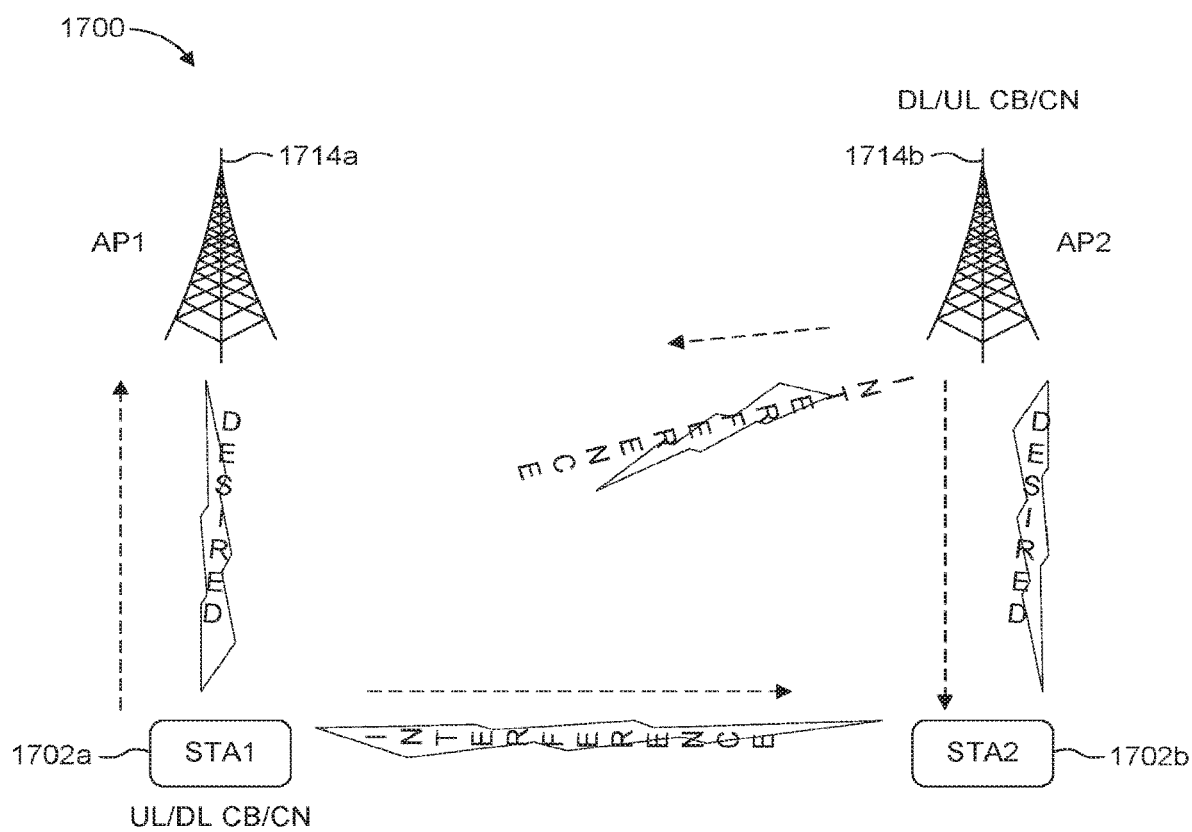
FIG. 17 is a diagram illustrating an example of uplink-downlink CB/CN.

FIG. 17 illustrates an example architecture 1700 for uplink-downlink CB/CN, which may be used in combination of any of other embodiments described herein. As illustrated in FIG. 17, for the uplink-downlink CB/CN, the transmitting device may be STA1 1702*a*, the desired device may be AP1 1714*a*, and the non-desired device is STA2 1702*b*. In contrast, for the downlink-uplink CB/CN, the transmitting device may be AP2 1714*b*, the desired device may be STA2 1702*b*, and the non-desired device may be AP1 1714*a*.

Embodiments for channel information acquisition for downlink-downlink CB/CN and downlink-uplink CB/CN are described herein. In coordinated beamforming or nulling, the transmitting device may need channel feedback for the channel to both the desired receiver and the non-desired receiver. For downlink-downlink CB/CN, this channel feedback information may be received from a desired STA and a non-desired STA. In one example, an AP may send an NDPA/NDP to each STA and request or poll for feedback from each STA individually. However, for downlink transmission, a trigger frame based NDPA/NDP procedure may be used to acquire the feedback from each STA in a more efficient manner.

FIG. 18 illustrates an example singling flow 1800 for independent NDPA/NDP and trigger based feedback, which may be used in combination of any of other embodiments described herein. As illustrated in FIG. 18, each AP (e.g., AP1 1814*a* and AP2 1814*b*) may independently send an NDPA/NDP frame combination (e.g., the combination of NDPA1 1805 and NDP1 1810, and the combination of NDPA2 1815 and NDP2 1820) to the STAs (e.g., STA1 1802*a*, and STA2 1802*b*) with independent trigger frames (e.g., a trigger frame 1825, and a trigger frame 1840) to each STA to acquire the feedback (e.g., FB1 1830, FB2 1835, FB1 1845, and FB2 1850). As each STA (e.g., STA1 1802*a*, and STA2 1802*b*) is associated with both APs (e.g., AP1 1814*a* and AP2 1814*b*), each AP may be able to trigger the STAs for the feedback (e.g., in an OFDMA manner).

The NDPA frames (e.g., NDPA1 1805 and NDPA2 1815) may indicate the need for the type of feedback and STA or STAs that should be measuring the NDP frames (e.g., NDP1 1810 and NDP2 1820) to acquire the channel from the AP. The NDPA frames (e.g., NDPA1 1805 and NDPA2 1815) may indicate measurement and full channel feedback of the channel from the AP to the desired device. The NDPA frames (e.g., NDPA1 1805 and NDPA2 1815) may indicate measurement and full channel feedback of the channel from the AP to the non-desired device. The NDPA frames (e.g., NDPA1 1805 and NDPA2 1815) may indicate measurement and partial channel feedback of the channel from the AP to the non-desired device. Partial information may be defined as any information that is not the full IEEE 802.11 channel information feedback required for the desired channel. The partial channel feedback may be used to determine a nullspace that the designed precoder should be orthogonal to and, as such, may not need as detailed information to improve performance. Examples of partial channel feedback may include, but are not limited to, reduced quantization channel feedback, increased sub-carrier sampling (Ng) channel feedback, channel feedback based on the channel correlation, and channel feedback based on a sector or codebook.

A trigger frame (e.g., a trigger frame 1825 or a trigger frame 1840) from each AP may indicate the manner in which the feedback (e.g., FB1 1830, FB2 1835, FB1 1845, and FB2

1850) from each receiving device is sent to the announcer. The feedback (e.g., FB1 1830, FB2 1835, FB1 1845, and FB2 1850) may be separated by frequency (e.g., OFDMA), time (e.g., time staggered), or space (e.g. uplink MU-MIMO). In this case, each AP may independently request information from each STA.

FIG. 19 illustrates an example 1900 of master trigger based NDPA/NDP and master trigger based feedback, which may be used in combination of any of other embodiments described herein. As illustrated in FIG. 19, a master AP (e.g., AP1 1914*a*) may send an NDPA trigger frame 1905 to a secondary/slave AP (e.g., AP2 1914*b*) and both STAs 1902*a*, 1902*b* to indicate the start of an NDP measurement campaign. Both APs 1914*a*, 1914*b* may send NDP frames (e.g., NDP1 1910 and NDP2 1915) to the STAs 1902*a*, 1902*b*. The NDPs (e.g., NPD1 1910 and NDP2 1915) may be separable at the STAs 1902*a*, 1902*b*. The NDPs (e.g., NPD1 1910 and NDP2 1915) may be sent at different times. For example, AP1 1914*a* sends NDP1 1910, and then AP2 1914*b* sends NDP2 1915. The NDPs (e.g., NPD1 1910 and NDP2 1915) may be sent at the same time but using different sub-carriers. In one example, both AP1 1914*a* and AP2 1914*b* may set Ng=x (e.g., determined by the NDPA trigger frame 1905), but offset in such a manner that there is no overlap. For example, with Ng=4, AP1 1914*a* may use subcarrier indices 0, 4, . . . , while AP2 1914*b* may use subcarrier indices 2, 6, . . . . This may require tight synchronization (similar to joint precoding) between AP1 1914*a* and AP2 1914*b* to ensure that there is no frequency, time or synchronization offset at the received STAs 1902*a*, 1902*b*. The master AP (e.g., AP1 1914*a*) may send a trigger frame 1920 to both STAs 1902*a*, 1902*b* and the slave AP (e.g., AP2 1914*b*) to feed back the desired and undesired information to both APs 1914*a*, 1914*b*. For example, STA1 1902*a* may send FB1 1925 to AP1 1914*a* and STA2 1902*b* may send FB2 1930 to AP2 1914*b*.

For scenarios where there may be a cluster of AP-STA groups, such as 3 APs and 3 STAs, this operation may be implemented in a pairwise manner where only two APs/STAs may be allowed to transmit simultaneously. Additionally or alternatively, a single directed, and two non-desired, feedback packets may be sent with the precoder designed to operate in the null space of the two non-desired channels.

Figure 20:
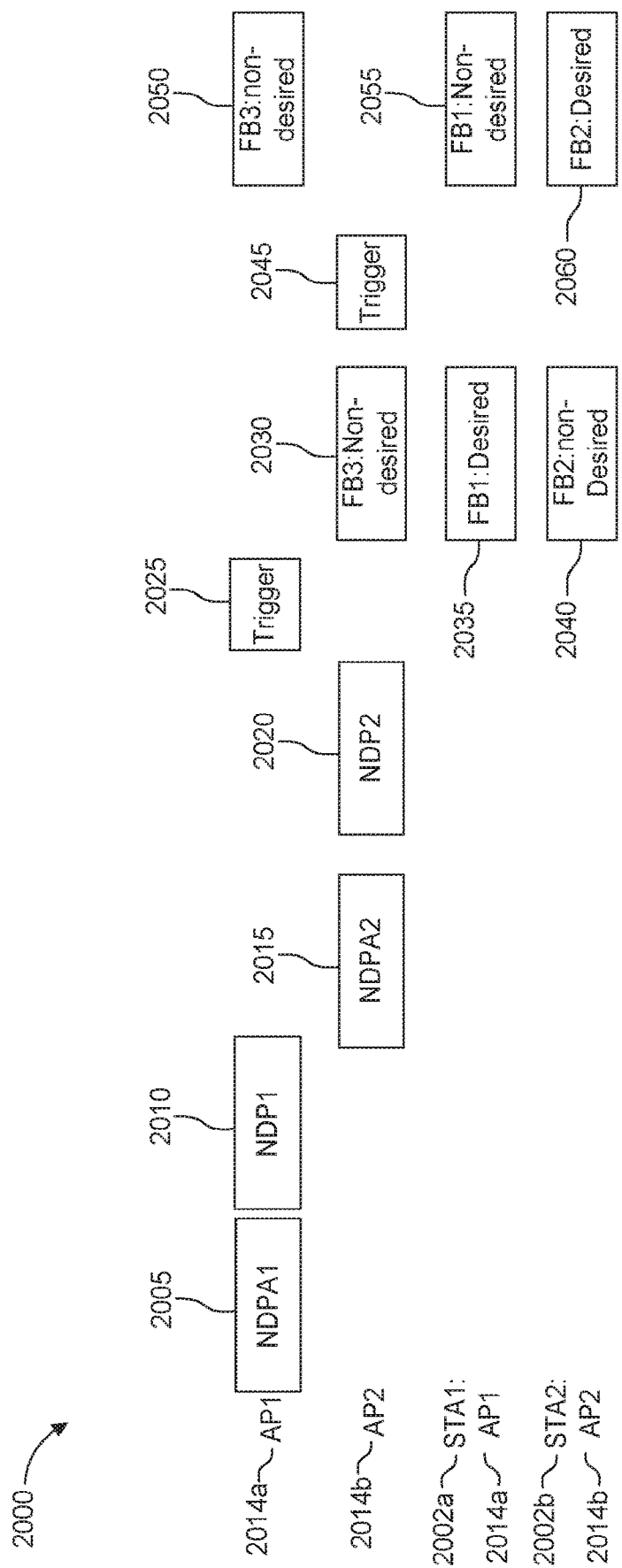
FIG. 20 is a signaling diagram illustrating an example of an NDP feedback request from an AP.

FIG. 20 illustrates an example 2000 of an NDP feedback request from an AP, which may be used in combination of any of other embodiments described herein. As illustrated in FIG. 20, AP1 2014*a* may send NDPA1 2005 and NDP1 2010 to AP2 2014*b* and both STAs 2002*a*, 2002*b* to indicate the start of an NDP measurement campaign. Similarly, AP2 2014*b* may send NDPA2 2015 and NDP2 2020 to AP1 2014*a* and both STAs 2002*a*, 2002*b* to indicate the start of an NDP measurement campaign. AP1 2014*a* may then send a trigger frame 2025 to AP2 2014*b* and both STAs 2002*a*, 2002*b* to feedback the desired and undesired information to AP1 2014*a*. For example, upon receiving the trigger frame 2025, AP2 2014*b* may send FB3 2030 to AP1 2014*a*, STA1 2002*a* may send FB1 2035 to AP1 2014*a* and STA2 2002*b* may send FB2 2040 to AP1 2014*a*. AP2 2014*b* may then send a trigger frame 2045 to AP1 2014*a* and both STAs 2002*a*, 2002*b* to feedback the desired and undesired information to AP2 2014*b*. For example, upon receiving the trigger frame 2045, AP1 2014*a* may send FB3 2050 to AP2 2014*b*, STA1 2002*a* may send FB1 2055 to AP2 2014*b* and STA2 2002*b* may send FB2 2060 to AP2 2014*b*. The example illustrated in FIG. 20 that an AP requests feedback from another AP may be used for downlink-uplink CB/CN.

Figure 21:
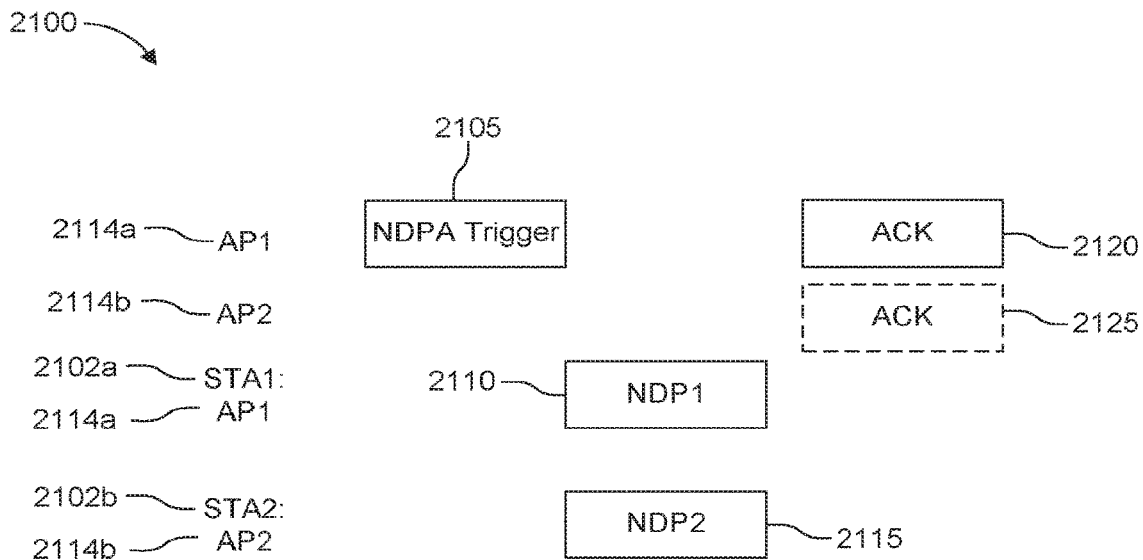
FIG. 21 is a signaling diagram illustrating an example of an NDP trigger for implicit multiple AP sounding.

FIG. 21 illustrates an example 2100 of an NDP trigger for implicit multiple AP sounding, which may be used in combination of any of other embodiments described herein. As illustrated in FIG. 21, a master AP (e.g., AP1 2114*a*) may send an NDPA trigger frame 2105 to a secondary or slave AP (e.g., AP2 2114*b*)_and both STAs 2102*a*, 2102*b* to indicate the start of implicit NDP measurement. The STAs 2102*a*, 2102*b* may send NDP frames (e.g., NDP1 2110 and NDP2 2115) or sounding frames to the APs 2114*a*, 2114*b* so that the APs 2114*a*, 2114*b* may estimate the uplink channel and derive the downlink channel from the uplink channel. Upon receiving the NDP frames (e.g., NDP1 2110 and NDP2 2115) or sounding frames, the APs 2114*a*, 2114*b* may respond ACK frames 2120, 2125 to the STAs 2102*a*, 2102*b*. For scenarios where there may be a cluster of AP-STA groups (e.g., three APs and three STAs), the trigger frame may indicate the start of each uplink STA transmission or may indicate that the STAs transmit simultaneously to the APs.

Embodiments for channel information for uplink-uplink CB/CN and uplink-downlink CB/CN are described herein. For uplink-uplink CB/CN, each STA may need to have knowledge of the channel to its desired AP and non-desired AP. As the trigger frame is used for downlink (i.e. triggers are sent from the AP to the STA), the NDPA/NDP/feedback procedure described in the downlink-downlink CB/CN scenario may need to be modified. In one example, reciprocity may be used (e.g., the channel obtained during the DL/DL CB/CN at the STA may be suitable for uplink, and the NDPA/NDP procedure described above may be used without any need for feedback). The NDPA may be used to indicate that the following NDP may be used for measurement for uplink coordinated beamforming.

Figure 22:
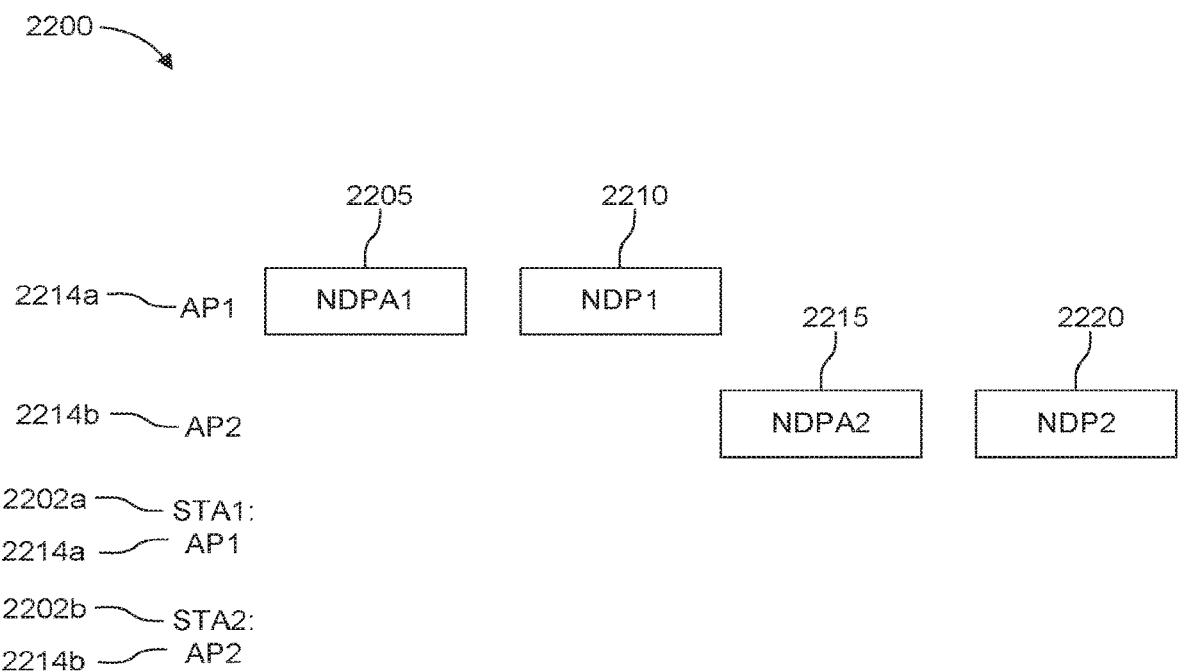
FIG. 22 is a signaling diagram illustrating an example of independent NDPA/NDP for reciprocity-based uplink-uplink (UL/UL) CB/CN.

FIG. 22 illustrates an example 2200 of independent NDPA/NDP for reciprocity-based UL/UL CB/CN, which may be used in combination of any of other embodiments described herein. Each of the STAs 2202*a*, 2202*b* may obtain the knowledge of the channel to its desired AP and non-desired AP among the APs 2214*a*, AP2 2214*b*, for example, its downlink CB/CN. As illustrated in FIG. 22, with the channel information, AP1 2214*a* may send NDPA1 2205 to STAs 2202*a*, 2202*b* to indicate that following NDP1 2210 is used for the measurement of the uplink coordinated beamforming. Similarly, AP2 2214*b* may send NDPA2 2215 to STAs 2202*a*, 2202*b* to indicate that following NDP2 2220 is used for the measurement of the uplink coordinated beamforming.

Figure 23:
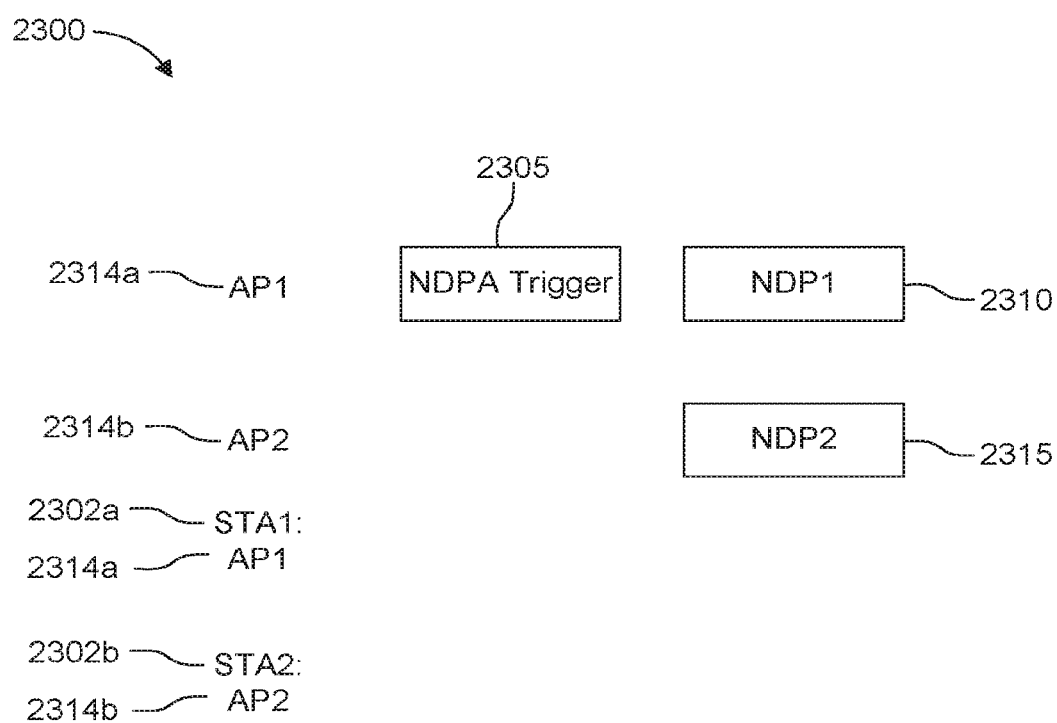
FIG. 23 is a signaling diagram illustrating an example of master-trigger-based NDPA/NDP for UL/UL CB/CN.

FIG. 23 illustrates an example 2300 of master-trigger-based NDPA/NDP for UL/UL CB/CN, which may be used in combination of any of other embodiments described herein. As illustrated in FIG. 23, a master AP (e.g., AP1 2314*a*) may send an NDPA trigger frame 2305 to a secondary/slave AP (e.g., AP2 2314*b*) and both STAs 2302*a*, 2302*b* to indicate following NDP frames 2310, 2315 are used for the measurement of the uplink coordinated beamforming. Both APs 2314*a*, 2314*b* may send NDP frames (e.g., NDP1 2310 and NDP2 2315) to the STAs 2302*a*, 2302*b*. The NDPs 2310, 22315 may be separable at the STAs 2302*a*, 2302*b*. The NDPs 2310, 2315 may be sent at different times, or at the same time but using different sub-carriers.

Figure 24:
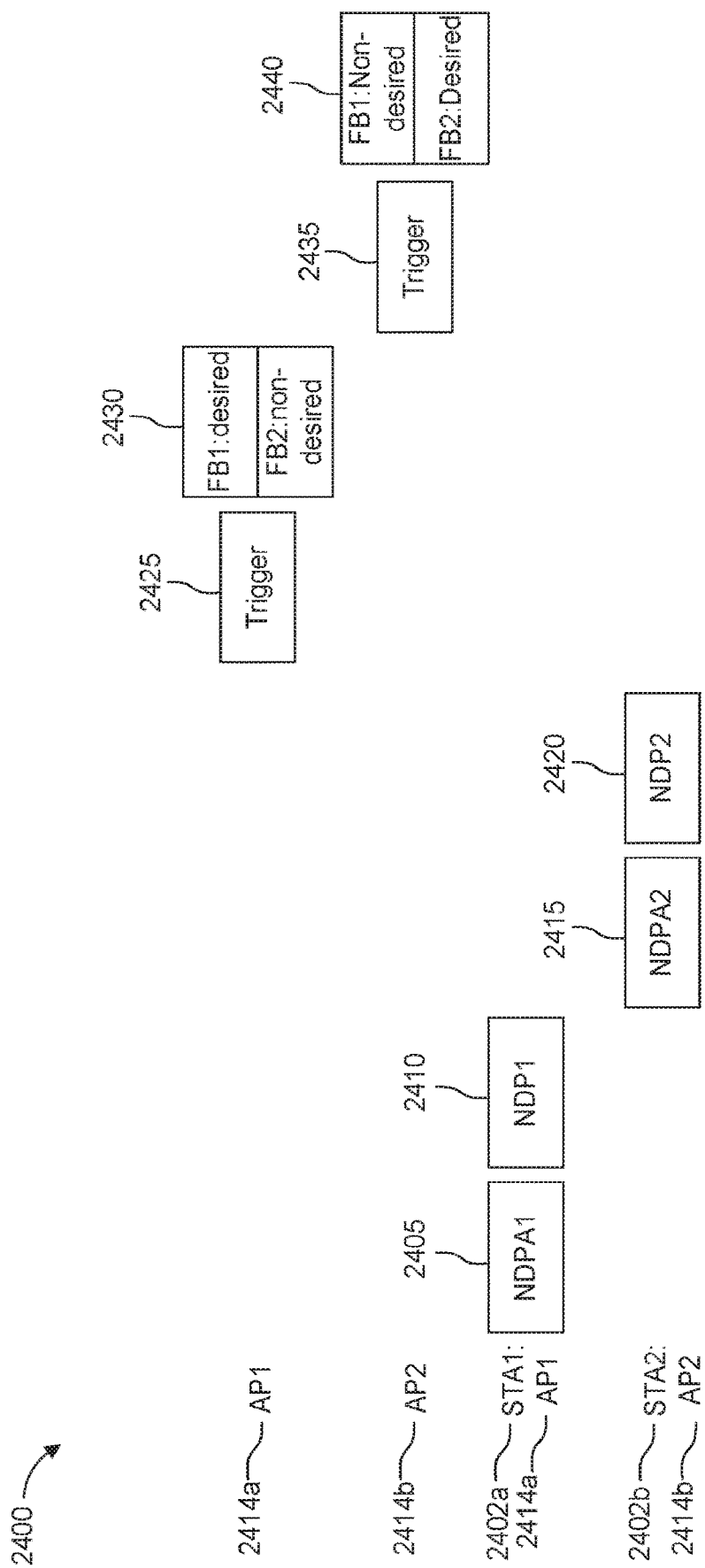
FIG. 24 is a signaling diagram illustrating an example of STA-initiated channel acquisition.

FIG. 24 illustrates an example 2400 of STA-initiated channel acquisition, which may be used in combination of any of other embodiments described herein. If reciprocity is not applicable, as illustrated in FIG. 24, STAs 2402*a*, 2402*b* may initiate the channel acquisition by sending NDPs (e.g., NDP1 2410 and NDP2 2420) to the APs 2414*a*, 2424*b* and requesting feedback from the APs 2414*a*, 2414*b* in the case of UL/UL CB/CN. In one example, each STA 2402*a*, 2402*b* may send an NDPA 2405, 2415 and NDP 2410, 2420 to the APs 2414*a*, 2424*b* and request feedback 2430, 2435 from the APs 2414*a*, 2424*b*. Specifically, STA1 2402*a* may send NDPA1 2405 to the APs 2414*a*, 2424*b* to obtain the channel information and send NDP1 2410 to request feedback from the APs 2414*a*, 2424*b*. Similarly, STA2 2402*b* may send NDPA2 2415 to obtain the channel information and NDP2 2420 to the APs 2414*a*, 2424*b* to request feedback from the APs 2414*a*, 2424*b*. Alternatively or additionally, each AP 2414*a*, 2424*b* may send a feedback trigger frame 2425, 2435 or announcement frame to the STAs 2402*a*, 2402*b* and provide feedback 2430, 2440 with the channel information for the desired and non-desired STA, as illustrated in FIG. 24.

Figure 25:
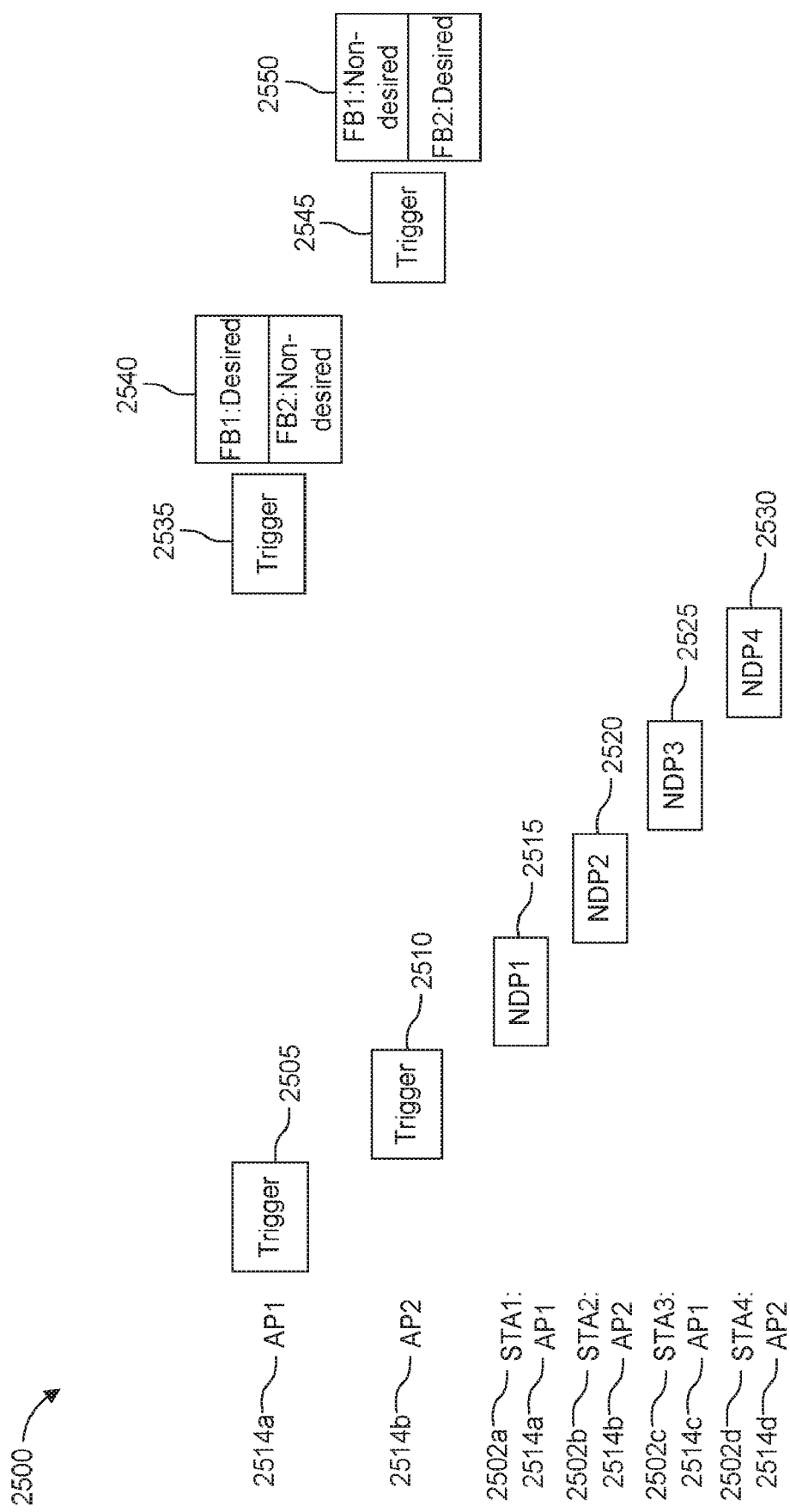
FIG. 25 is a signaling diagram illustrating an example of AP-initiated channel acquisition.

FIG. 25 illustrates an example 2500 of AP-initiated channel acquisition, which may be used in combination of any of other embodiments described herein. In a scenario where there may be many STAs, and the STA-initiated method may result in a lot of overhead, a master AP (e.g., AP1 2514*a*) may trigger the secondary AP (e.g., AP2 2514*b*) and all the STAs (e.g., STA1 2502*a*, STA2 2502*b*, STA3 2502*c*, and STA4 2502*d*) in the joint BSSs to send a series of NDPs (e.g., NDP1 2515, NDP2 2520, NDP3 2525, and NDP4 2530) to both APs 2514*a*, 2514*b*. The APs 2414*a*, 2424*b* may send feedback trigger frames 2535, 2545 or announcement frame to the STAs 2502*a*, 2502*b*, 2502*c*, 2502*d* and provide feedback 2540, 2550 with the desired and non-desired channels to the STAs 2502*a*, 2502*b*, 2502*c*, 2502*d*, as illustrated in FIG. 25.

For UL-DL CB/CN, the NDPA may address the non-desired STA and request for feedback from the STA at a later time.

As mentioned above, the APs may need to know the DL channel state information (CSI) for all STAs. In embodiments, this may be done using implicit DL channel acquisition where, for example, an AP may acquire the DL channels from the UL channels.

Figure 26:
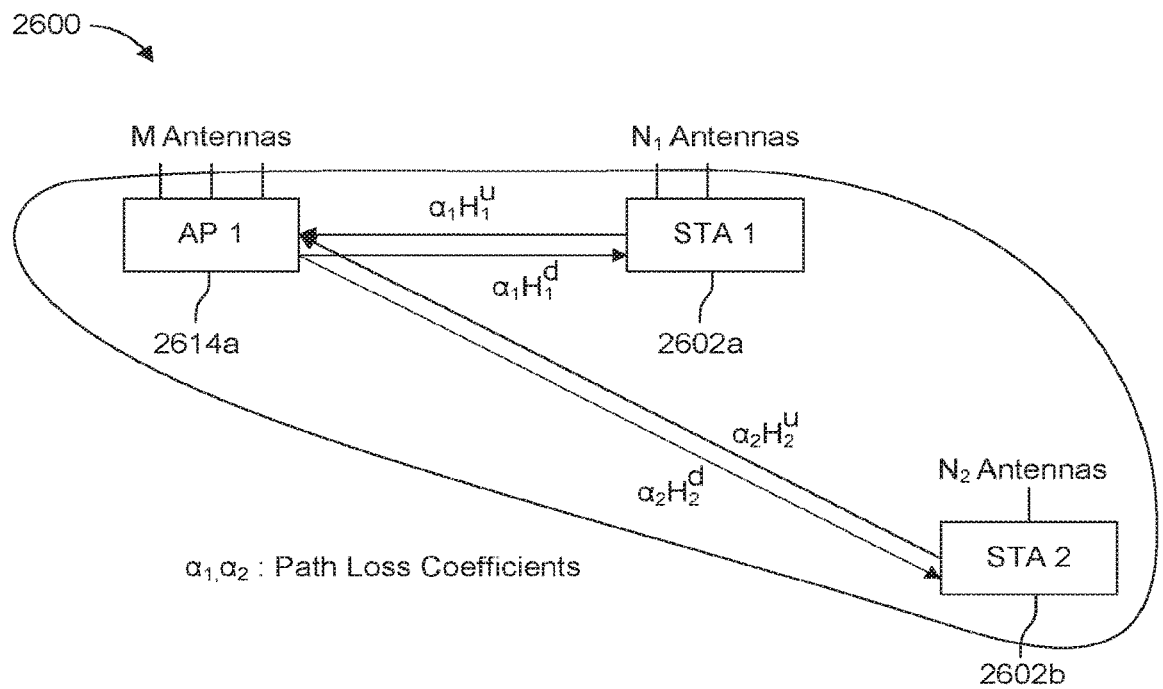
FIG. 26 is a diagram illustrating an example of implicit DL channel acquisition.

FIG. 26 illustrates an example 2600 of implicit DL channel acquisition, which may be used in combination of any of other embodiments described herein. As illustrated in FIG. 26, AP1 2614*a* may infer the DL (e.g., normalized) channel $H_1^d$ and $H_2^d$ from the UL (e.g., normalized) channels $H_1^u$ and $H_2^u$. AP1 2614*a* may broadcast the desired received signal strength (RSS) at its own location via, for example, RSS indication (RSSI) through a trigger frame STA1 2602*a* and STA2 2602*b* may set their transmit powers, $P_1$ and $P_2$, respectively, based on the RSSI. This may enable mitigating the inter-cell interference (ICI) due to carrier frequency offset (CFO) differences under near-far scenarios. In this scenario, the received signal at AP1 2614*a* may be expressed as:

$$y_1 = \underbrace{\alpha_1 P_1 H_1^u}_{\ell_1} x_1 + \underbrace{\alpha_2 P_2 H_2^u}_{\ell_2} x_2 = \ell_1 [H_1^u \ H_2^u]\begin{bmatrix} x_1 \\ x_2 \end{bmatrix},$$

where $x_1$ and $x_2$ are the transmitted symbols with unity power, $\alpha_1$ and $\alpha_1$ are path loss coefficients, and $\ell_1 = \ell_2$ because of the power setting at STAs 2602*a*, 2602*b* to achieve desired identical RSSs. AP1 2614*a* may learn the DL channels from the UL channels as:

$$[H_1^d H_2^d]^H = [H_1^u H_2^u]^H$$

Since power setting may cause the RSSs to be identical, the relative path loss information may be lost. On the other hand, the optimal beamforming vectors for various purposes, such as CB/CN, AP1 2614*a* may need the matrix given by:

$$\left[ H_1^u \ \frac{\alpha_1}{\alpha_2} H_2^u \right]^H,$$

which may be a function of relative path loss, $$\frac{\alpha_1}{\alpha_2}.$$

To obtain $\alpha_1$ and $\alpha_2$ or $\alpha_1/\alpha_2$, the STAs 2602*a*, 2602*b* may use a deterministic power (e.g., maximum power) or power spectral density (e.g., power per Hz or power per 26 tone RU) in the UL to respond to the channel acquisition frame (e.g., NDP, NDPA or trigger frame) transmitted from AP1 2614*a*. The value of the deterministic power or power spectral density, if not maximum power, may be signaled in the channel acquisition frame. In this case, since all STAs 2602*a*, 2602*b* may transmit a signal using the same power, the pass losses can be measured at APs (including AP1 2614*a*).

The STAs 2602*a*, 2602*b* may report their maximum power via a MAC frame, such as an association or setup frame. If STAs 2602*a*, 2602*b* are power controlled (e.g., they may use different transmit power), the STAs 2602*a*, 2602*b* may indicate their transmit power or transmit power spectral density via PHY signaling, such as in one of the PHY headers, such as the SIG fields, or through a MAC frame while transmitting a UL PPDU. The STAs 2602*a*, 2602*b* may indicate their power headroom via PHY signaling, such as in in one of the PHY headers, such as the SIG fields, or through a MAC frame while transmitting a UL PPDU. If the channel acquisition signal from the APs (including AP1 2614*a*) includes the transmit power used at the APs (including AP1 2614*a*), the STAs 2602*a*, 2602*b* may generate the DL pass losses from different APs and feed them back to the APs (including AP1 2614*a*) using a UL channel or a SIG field.

Figure 27:
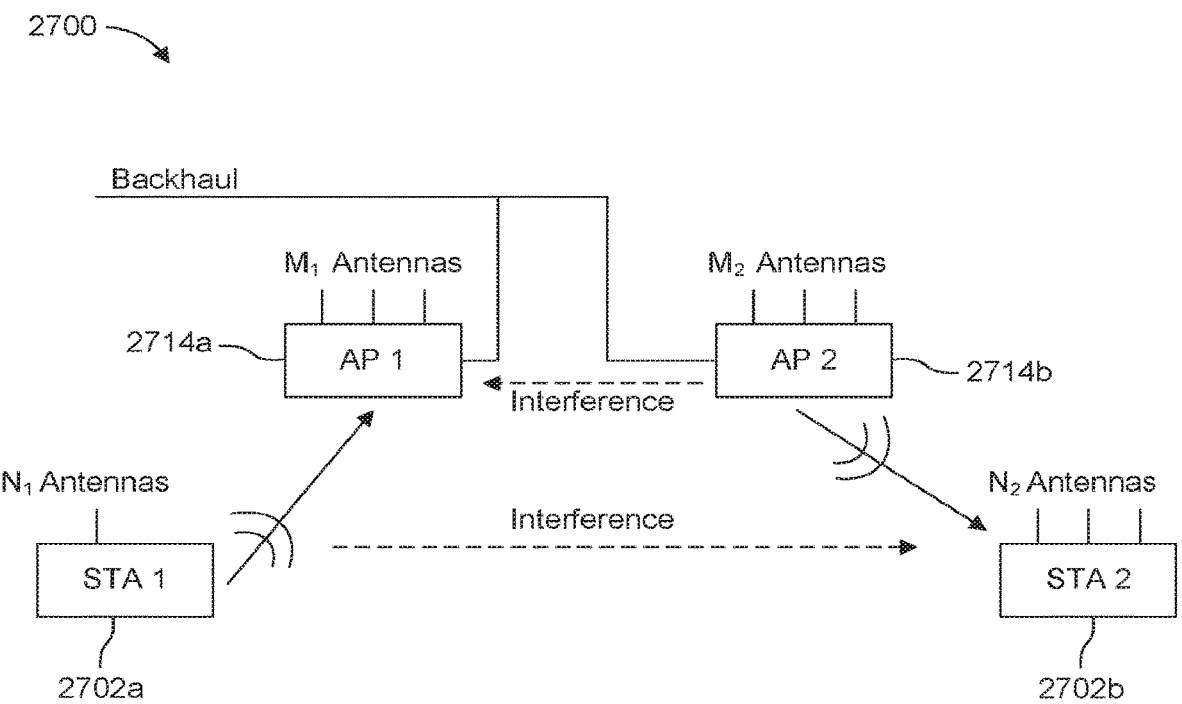
FIG. 27 is a diagram illustrating interference in an example scenario for simultaneous UL and DL traffic.

Embodiments for mesh sounding procedures are described herein. Latency in the network may be reduced by enabling UL and DL at the same time through multiple APs distributed in area. FIG. 27 illustrates interference in an example scenario 2700 for simultaneous UL and DL traffic, which may be used in combination of any of other embodiments described herein. As illustrated in FIG. 27, the traffic between AP1 2714*a* and STA1 2702*a* is UL. The traffic between AP2 2714*b* and STA2 2702*b* is DL. AP2 2714*b* may interfere with AP1 2714*a*, and STA1 2702*a* may interfere with STA2 2702*b*. To mitigate the interference, CB/CN may be used, but the AP1-AP2 channel at AP2 2714*b*, and the STA1-STA2 channel at STA1 2702*a* may need to be identified.

To address this, an AP/STA that desires to transmit information (also referred to as an initiator) may transmit a mesh sounding trigger (MST) frame. The MST frame may include the participants in the mesh (e.g., association IDs or MAC addresses). The MST frame may also include the role of each STA in the upcoming concurrent transmissions. For example, in FIG. 27, STA1 2702*a* and AP2 2714*b* may be transmitting STAs, and AP1 2714*a* and STA2 2702*b* may be receiving STAs. Transmitting STAs may need to null to mitigate the interference to the undesired receiving STA or STAs. The MST frame may include a transmission order field that may explicitly indicate the transmission order of the sounding frames. In some embodiments, this may be implicitly indicated by the STA roles.

The participant STAs/APs may access the medium via CSMA protocol and transmit NDP frames. The NDP frames may be transmitted through different STAs/APs sequentially in time. In some embodiments, STAs may access simultaneously via orthogonal channel estimation fields. Non-transmitting STAs/APs may use the received NDP to estimate the channel between the transmitting STA and themselves. Further, non-transmitting STAs/APs may set their MIMO precoding vectors to minimize the interference while ensuring beamforming toward the desired APs/STAs.

The initiator AP/STA may then transmit a mesh data trigger (MDT) frame. The MDT frame may include the participant STAs (e.g., their association IDs), which may join data transmission and the duration for data transmission, in the next frame. The MDT frame may include the role of each STA in the upcoming concurrent transmissions. For example, in FIG. 27, STA1 2702a and AP2 2714b may be transmitting STAs, and AP1 2714a and STA2 2702b may be receiving STAs. Transmitting STAs may need to null to mitigate the interference to the undesired receiving STA(s). The participant STAs may receive the MDT. If their AID is indicated, they may be allowed to transmit data via PPDUs. The initiator AP/STA and the STAs indicated in MDT may transmit data simultaneously. The OFDM symbols in the PPDUs may be aligned in time to minimize the interference.

Figure 28:
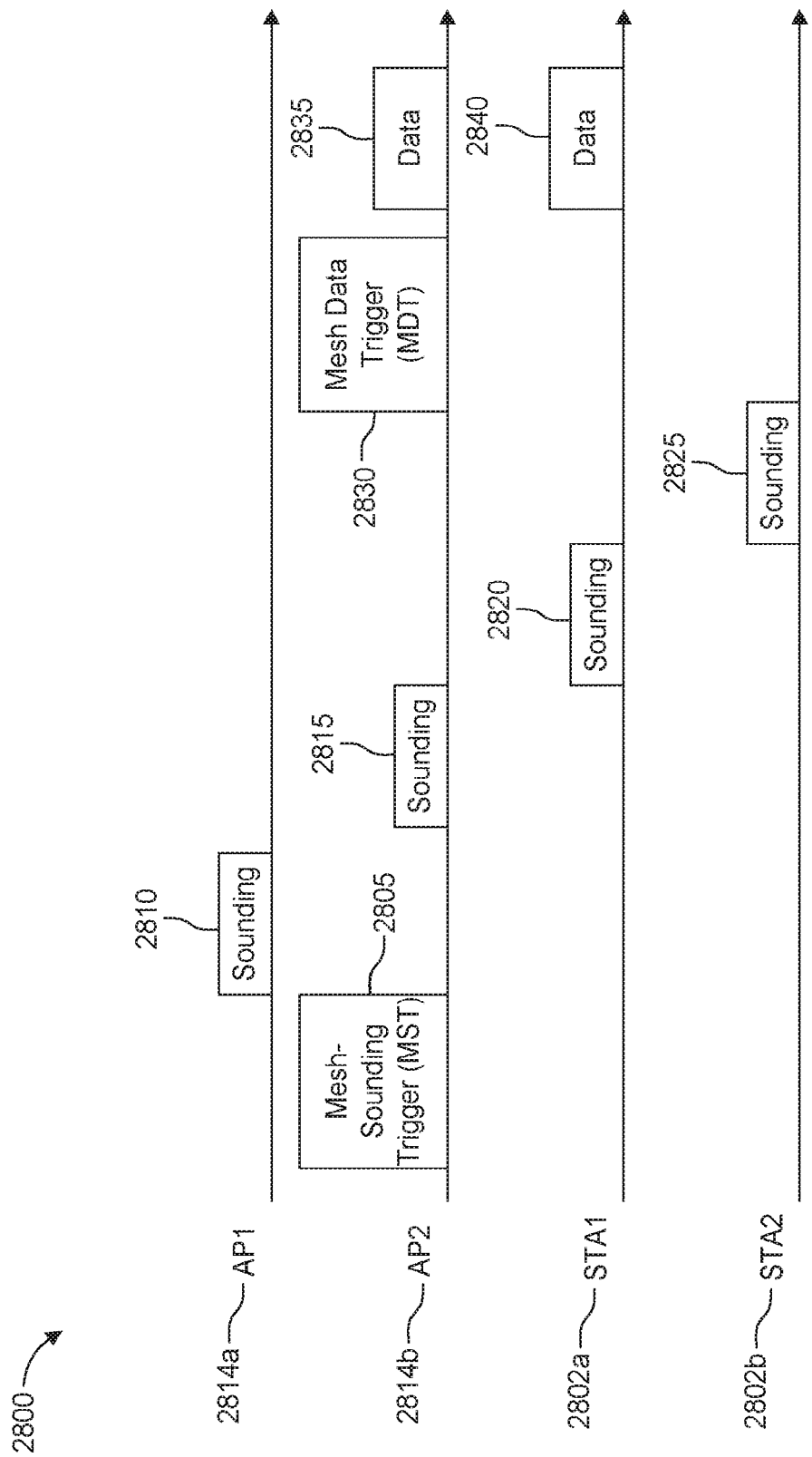
FIG. 28 is a diagram illustrating example utilization of mesh data trigger (MDT) and mesh-sounding trigger (MST) frames to CB/CN.

FIG. 28 illustrates example utilization 2800 of MDT and MST frames to CB/CN, which may be used in combination of any of other embodiments described herein. In the example illustrated in FIG. 28, AP2 2814b is the initiator and may transmit an MST frame 2805. AP1 2814a, STA1 2802a, and STA2 2802b may receive the MST frame 2805 and sequentially transmit sounding signals 2810, 2815, 2820, 2825 (e.g., NDPs or PPDUs) with information on the TX signal power. AP2 2814b may also transmit the sounding signal 2815. During the sounding signals 2810, 2815, 2820, 2825, all receiving STAs (e.g., STA1 2802a and STA2 2802b) and APs (e.g., AP1 2814a) may estimate the channel and adjust their beamforming vectors. AP2 2814b may then transmit an MDT trigger frame 2830, which may allow STA1 2802a to transmit. STA1 2802a and AP2 2918b may then transmit their data through synchronous PPDUs. Since they adjusted their beamforming vectors (e.g., CB/CN), STA1 2802a and AP2 2814b may mitigate the interference on AP1 2814a and STA2 2802b, respectively.

Figure 29:
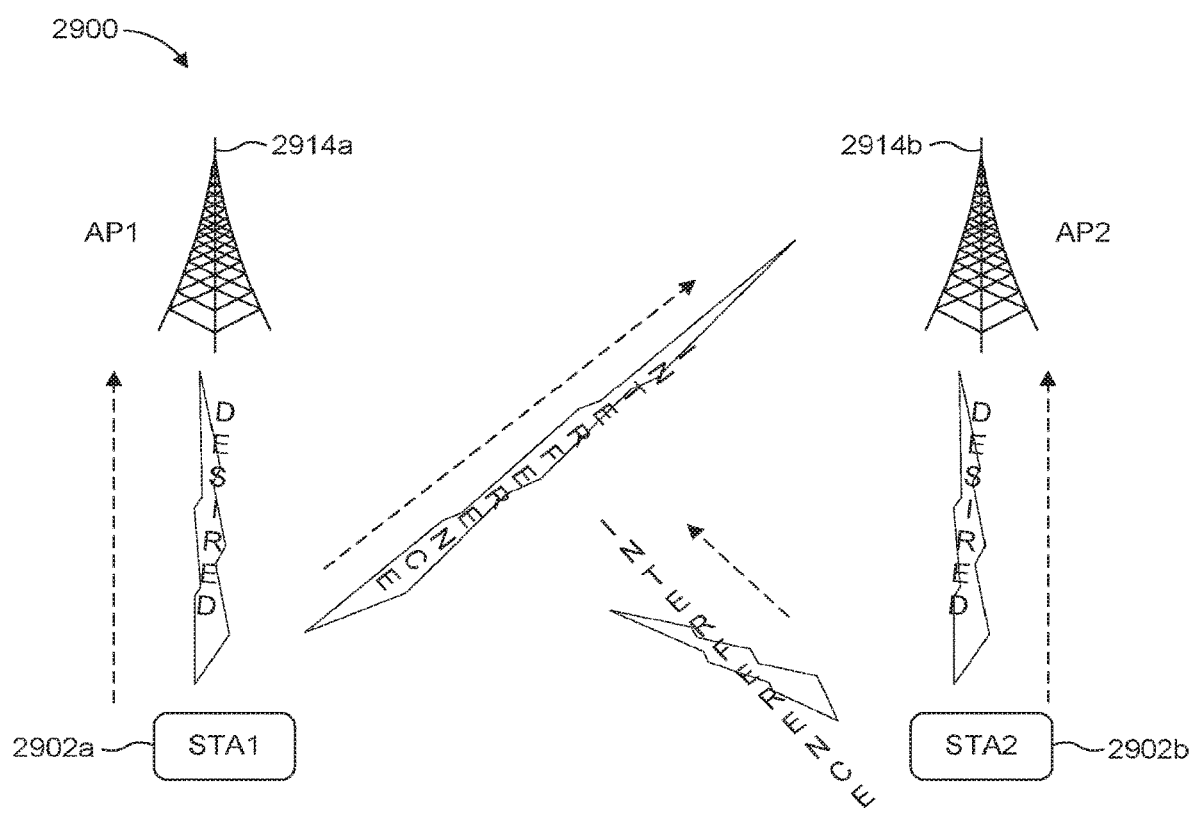
FIG. 29 is a diagram illustrating an example of uplink-uplink CB/CN using one-sided spatial reuse parameter (SRP) based spatial reuse (SR)

FIG. 29 illustrates an example 2900 of uplink-uplink CB/CN using one-sided spatial reuse parameter (SRP) based spatial reuse (SR), which may be used in combination of any of other embodiments described herein. An SR STA that receives the SRP information may incorporate a precoder into its SR transmission to lower the overall interference and transmit in a one-sided SR. For example, as illustrated in FIG. 29, the one-sided SR may imply that STA1 2902a transmits normally while STA2 2902b performs CB/CN to limit the interference to AP1 2914a during the transmission.

The STA may incorporate the gain/null of the beamformer into the SRP interference estimation. The maximum interference estimation in IEEE 802.11ax assumes an omni-directional antenna with a gain of 0 dB. The STA may then compensate for the nulling effect of the precoder in its estimation of the interference that will reach the non-desired AP, such as AP1. The SRP input may then become: SRP_INPUT=TXPWRAP−SCMA_gain+Acceptable Receiver Interference LevelAP−(AP2), where SCMA_gain may be estimated by the WTRU using SCA gain estimation types 1 and 2.

FIG. 30 illustrates an example 3000 of sparse code multiple access (SCMA) gain estimation type 1, which may be used in combination of any of other embodiments described herein. AP1 3014a may send an announcement 3005 that there will be a CB/CN gain estimation and indicate the STAs 3002a, 3002b to be tested and the APs 3014a, 3014b to be tested against. Each STA 3002a, 3002b may send an SCMA packet using the omni-directional antenna 3010, 3020 and the precoder antenna 3015, 3025 obtained from estimating the CB/CN precoder, as illustrated in FIG. 30. The STAs 3002a, 3002b may then receive a trigger frame 3030 indicating that the gain feedback 3035 will be sent. The gain feedback 3035 may be the RSSI difference between the received power of the frames transmitted with the two antennas. The gain feedback 3035 may be the RSSI received for each antenna. In this case, the STAs 3002a, 3002b may estimate the SCMA gain. The STAs 3002a, 3002b may receive (or estimate) the SCMA gain from the feedback.

FIG. 31 illustrates an example 3100 of SCMA gain estimation type 2, which may be used in combination of any of other embodiments described herein. As illustrated in FIG. 31, AP1 3114a may send an announcement 3105 that there will be a CB/CN gain estimation and indicate the STAs 3102a, 3102b to be tested and the APs 3114a, 3114b to be tested against. The STAs 3102a, 3102b may all transmit using the omni-directional antennas 3110, 3115 and then switch to the directional precoders 3120, 3125 to limit the need for fast switching of the antenna beams, as illustrated in FIG. 31. The STAs 3102a, 3102b may then receive a trigger frame 3130 indicating that the gain feedback 3135 will be sent. The gain feedback 3135 may be the RSSI difference between the received power of the frames transmitted with the two antennas. The gain feedback 3135 may be the RSSI received for each antenna. In this case, the STAs 3102a, 3102b may estimate the SCMA gain. The STAs 3102a, 3102b may receive (or estimate) the SCMA gain from the feedback.

Figure 32:
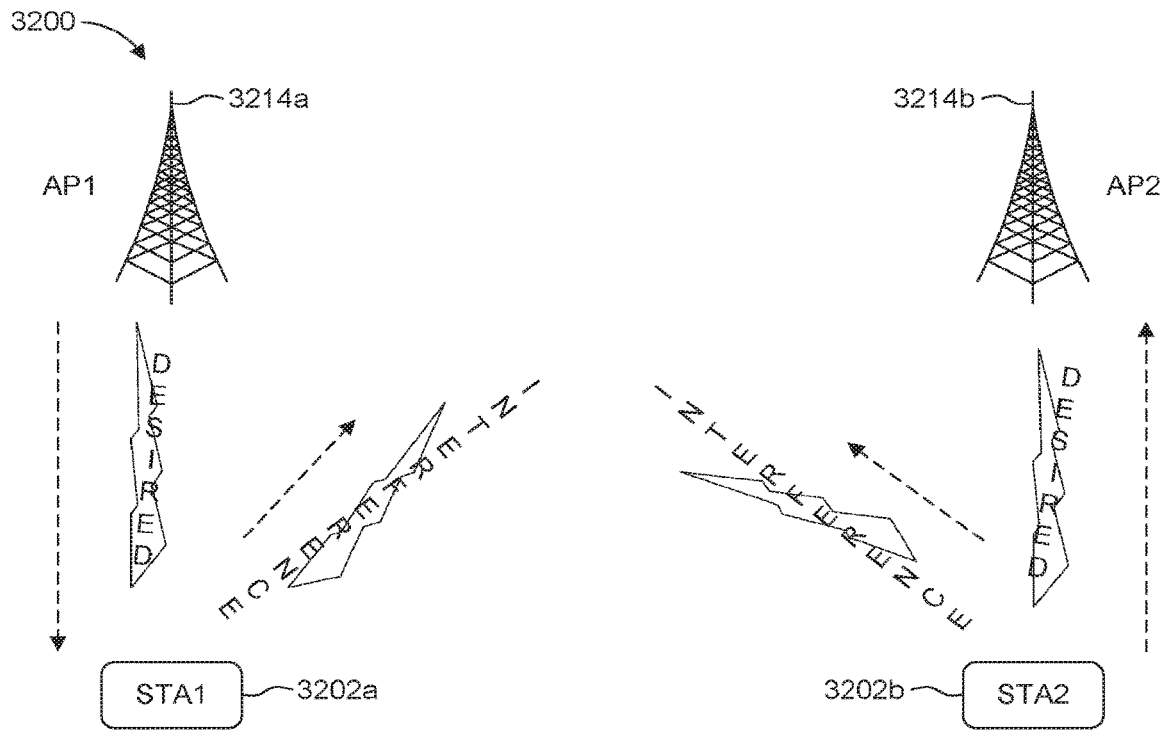
FIG. 32 is a diagram illustrating an example of uplink-uplink two sided SRP based SR.

FIG. 32 illustrates an example 3200 of uplink-uplink two sided SRP based SR, which may be used in combination of any of other embodiments described herein. In the example illustrated in FIG. 32, as the non-desired receiver (e.g., AP2 3214b) is known, the SRP trigger from AP1 3214a may include information on the candidate coordinating APs (e.g., AP2 3214b) in the trigger frame to STA1 3202a to enable STA1 3202a to design a precoder to limit its interference on its transmission. This may enable two-sided UL/UL CB/CN.

Figure 33:
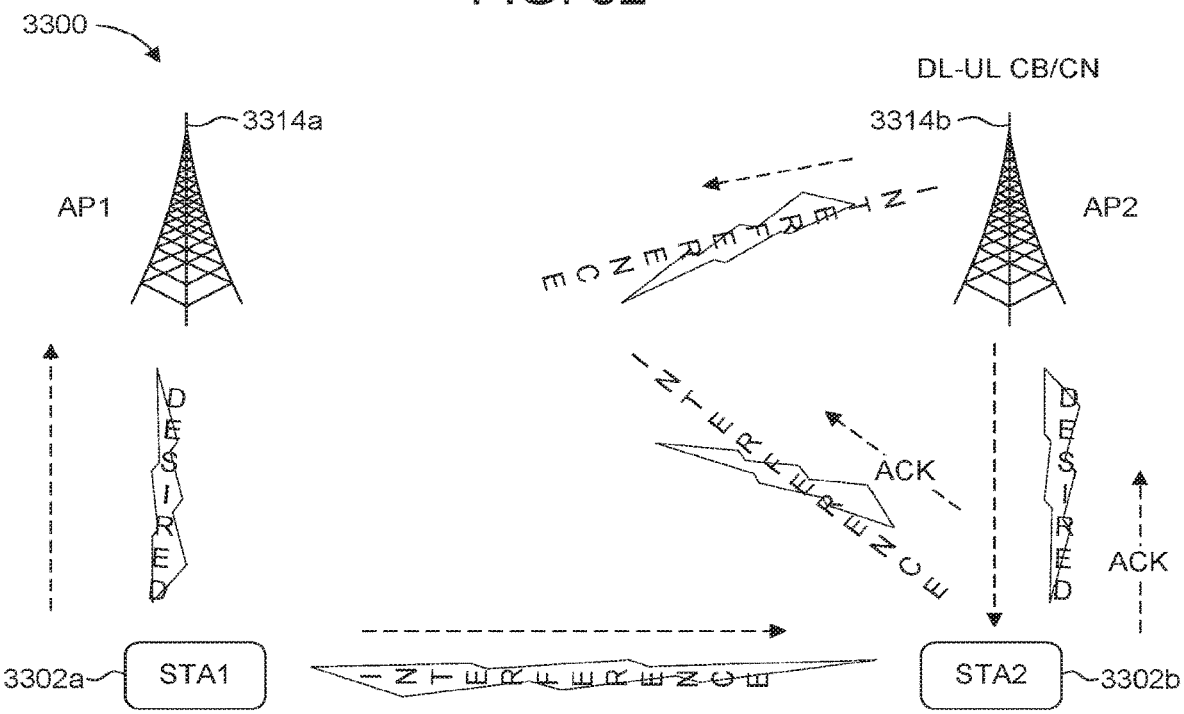
FIG. 33 is a diagram illustrating an example of one-sided DL/UL CB/CN with a primary UL/DL transmission.

FIG. 33 illustrates an example 3300 of one-sided DL/UL CB/CN with a primary UL/DL transmission, which may be used in combination of any of other embodiments described herein. In the example illustrated in FIG. 33, if the UL transmission from STA1 3302a to AP1 3314a is the primary transmission, the secondary AP (i.e. AP2 3314b) may elect to transmit to its STA (i.e. STA2 3302b) while limiting the interference to AP1 3314a. In this case, it may be necessary for the secondary AP (i.e. AP2 3314b) to request information feedback from the primary AP (i.e. AP1 3314a) as described above. The secondary STA (i.e. STA2 3302b) may also send an ACK to AP2 3302b to verify that it may receive information in the presence of the interference from STA1 3302a. The ACK may be transmitted to AP2 3314b with a precoder that limits interference to AP1 3314a.

Embodiments for coordinated beamforming for DL/DL or DL/UL architectures are described herein. For DL/DL CB/CN, if the interference offered to the interferee is known, one of a number of different methods may be used.

In one embodiment, the AP may send a CB/CN trigger to indicate that the STA need to send out its interference level. The target STA may respond with a tolerated interference level. It may send the interference level tolerated on a 20 MHz channel. Alternatively or additionally, it may send out its interference level using a per RU granularity. The AP may then send a downlink transmission. It may be optional as to whether to include interference levels. This may allow the listening STAs to estimate the relative interference level to the AP. The neighboring AP may use the information on the identified STA to set the precoder and transmit power based on the tolerated interference level. This may be one sided as the AP1 may not adjust its transmit precoder to accommodate the recipient STA for AP2. In a two-sided example, the AP may send information to STA 1 using a precoder that limits interference toward BSS2 (e.g., using a wide angle null space). Alternatively or additionally, the APs may exchange information on the desired STAs before initiating transmission.

In another embodiment, rather than requesting an instantaneous interference level one STA at a time, the AP may send a request for interference levels for a set of STAs in the BSS. The AP may send a CB/CN trigger frame to indicate that a set of STAs (e.g., all STAs) need to send out their desired interference levels. The AP may coordinate with neighboring APs to a have a quiet period during that session. The target STA may respond with a tolerated interference level. It may send the tolerated interference level on the 20 MHz channel. Additionally or alternatively, it may send out the interference level using a per RU granularity. The AP may then send a downlink transmission. It may be optional whether to include interference levels. This may allow the listening STAs to estimate the relative interference level to the AP. The neighboring AP may use the information on the identified STA to set the precoder and transmit power based on the tolerated interference level.

In another embodiment, for DL/UL primary with UL/DL secondary, AP1 may transmit to a STA (e.g., STA1) in its BSS with a limit on the interference to AP2. All STAs in BSS1 may send out their interference levels. STAs in BSS2 may compete and transmit information to AP1. The transmitter may have to get the channel to each STA, as mentioned above.

Embodiments for interference alignment (IA) procedures are described herein.

Figure 34:
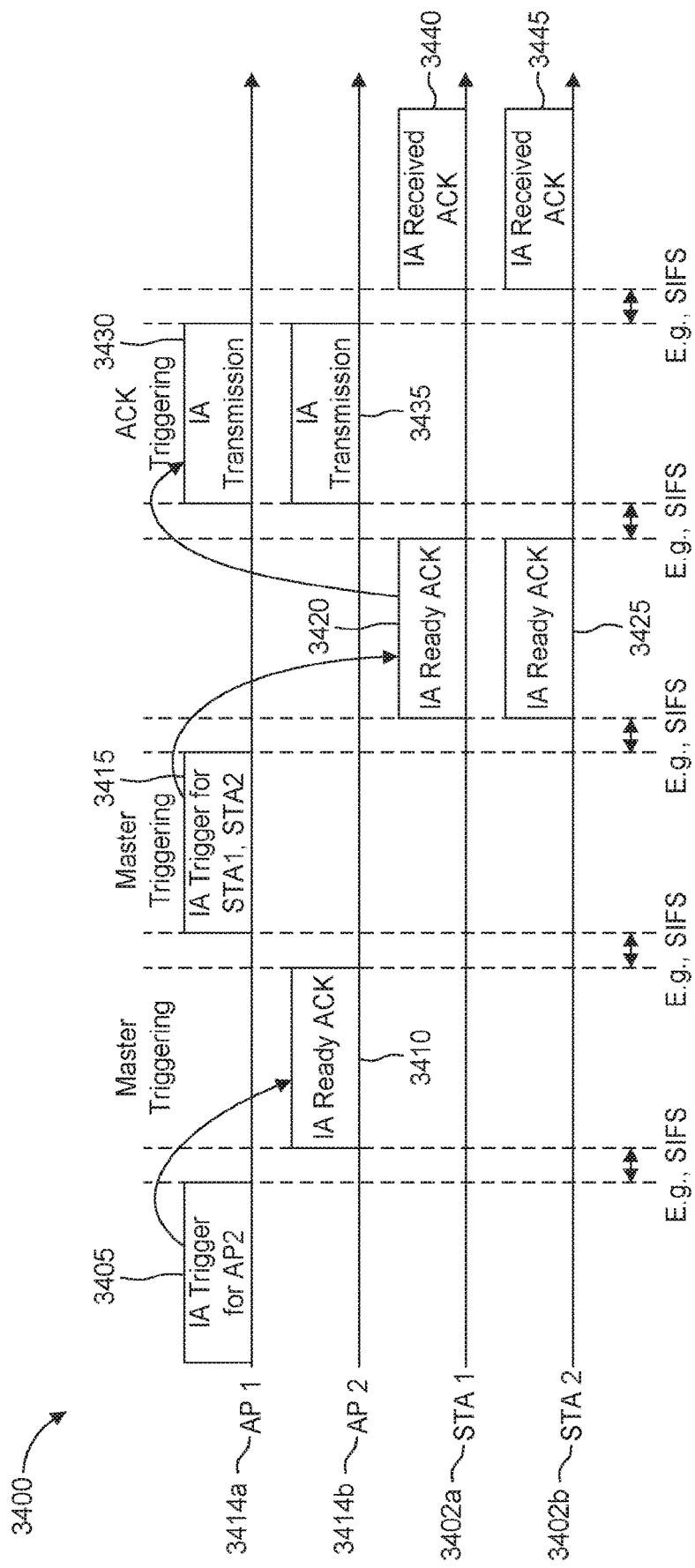
FIG. 34 is a diagram illustrating an example of multiple master triggering.

FIG. 34 illustrates an example 3400 of multiple master triggering, which may be used in combination of any of other embodiments described herein. As illustrated in FIG. 34, AP1 3414*a* may transmit an IA trigger frame (IATF) for AP2 3414*b* to transmit with an IA scheme in the upcoming transmissions. AP2 3414*b* may receive the IATF 3405 and understand that it will be part of IA transmission in the upcoming transmission. AP2 3414*b* may use V$_2$ for STA2 3402*b* as it is triggered. In one example, the IATF 3405 may indicate the interference basis used at the STAs (e.g., STA1 3402*a* and STA2 3402*b*). AP2 3414*b* may calibrate its carrier frequency to compensate for the potential frequency mismatch between them.

Upon receiving the IATF 3405, AP2 3414*b* may transmit an ACK (i.e. IA ready ACK frame 3410) that acknowledges AP1 3414*a* for IA transmission. AP2 3414*b* may enter a state in which it waits for ACKs from the STAs 3402*a*, 3402*b* for transmission. AP1 3414*a* may then transmit an IATF 3415 for STA1 3402*a* and STA2 3402*b*. STA1 3402*a* and STA2 3402*b* may receive the IATF 3415, determine that they are the recipients, and understand that IA transmission will occur. STA1 3402*a* and STA2 3402*b* may determine their interference bases as V$_1$ and V$_2$, respectively. The information may be in the IATF 3415. STA1 3402*a* and STA2 3402*b* may calibrate their carrier frequency to compensate the potential frequency mismatches. AP1 3414*a* may enter a state that waits for ACKs from the STAs 3402*a*, 3402*b* for transmission for the next transmission STA1 3402*a* and STA2 3402*b* may concurrently transmit ACKs (i.e. IA ready ACKs 3420, 3425) that may indicate that they are ready for IA and trigger IA transmission. AP1 3414*a* and AP2 3414*b* may have M≥3 antennas. Hence, they may decode the ACKs 3420, 3425 from up to 3 different transmitters. AP1 3414*a* and AP2 3414*b* may use the channel estimate to construct the IA precoders. AP1 3414*a* and AP2 3414*b* may be triggered for IA transmission in the next PPDU.

AP1 3414*a* and AP2 3414*b* may precode and transmit the information (i.e. IA transmissions 3430, 3435) based on an IA scheme. STA1 3402*a* and STA2 3402*b* may transmit the ACKs (i.e. IA received ACKs 3440, 3445) to indicate that they received the packets (i.e. IA transmissions 3430, 3435). STA1 3402*a* may discard the interference on the subspace spanned by the columns of V$_1$ and decode the rest of the subspace. STA2 3402*b* may discard the interference on the subspace spanned by the columns of V$_2$ and decode the rest of the subspace. ACKs may be transmitted on RUs different from RUs used for IA transmission by considering an OFDM-based system.

Figure 35:
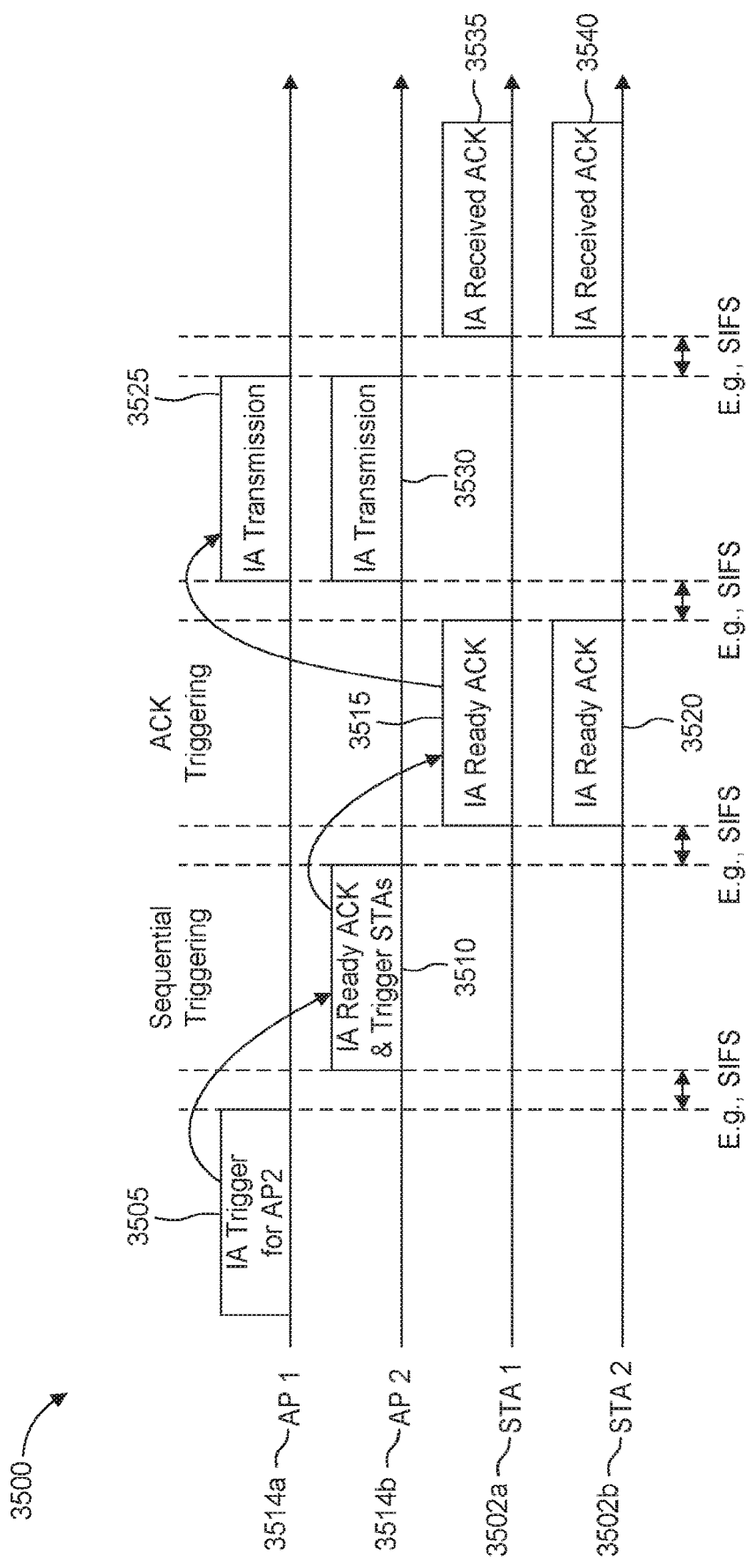
FIG. 35 is a diagram illustrating an example of sequential triggering.

FIG. 35 illustrates an example 3500 of sequential triggering, which may be used in combination of any of other embodiments described herein. As illustrated in FIG. 35, AP1 3514*a* transmits an IA trigger frame (IATF) 3505 for AP 2 3514*b* to transmit with IA scheme in the upcoming transmissions. AP2 3514*b* may receive the IATF 3505 and understand that it will be part of IA transmission in the upcoming transmission. AP2 3514*b* may use V$_2$ for STA2 3502*b* as it is triggered. In another embodiment, the IATF 3505 may indicate the interference basis used at the STAs 3502*a*, 3502*b*. AP2 3514*b* may calibrate its carrier frequency to compensate the potential frequency mismatch between them.

AP2 3514*b* may transmit an IA ACK & trigger frame (IATF-AT) 3510 that indicates ACK for AP1 3514*a* and trigger for STA1 3502*a* and STA2 3502*b*. AP1 3514*a* may then enter a state in which it waits for ACKs from the STAs 3502*a*, 3502*b* for transmission. STA1 3502*a* and STA2 3502*b* may receive the IATF-AT 3510, determine that they are the recipients, and understand that IA transmission will occur. STA1 3502*a* and STA2 3502*b* may determine their interference bases as V$_1$ and V$_2$, respectively. The information may be in the IATF-AT frame 3510. STA1 3502*a* and STA2 3502*b* may calibrate their carrier frequency to compensate the potential frequency mismatch among them. AP2 3514*b* may then enter a state in which it waits for ACKs from the STAs 3502*a*, 3502*b* for transmission after the transmission.

STA1 3502*a* and STA2 3502*b* may concurrently transmit ACKs (i.e. IA ready ACKs 3515, 3520) that may indicate that they are ready for IA and trigger IA transmission. AP1 3514*a* and AP2 3514*b* may have M≥3 antennas. Hence, they may decode the ACKs 3515, 3520 from up to 3 different transmitters. AP1 3514*a* and AP2 3514*b* may use the channel estimate to construct the IA precoders. AP1 3514*a* and AP2 3514*b* may be triggered for IA transmission in the next PPDU.

AP1 3514a and AP2 3514b may precode and transmit the information (i.e. IA transmissions 3525, 3530) based on an IA scheme. STA1 3502a and STA2 3502b may transmit the ACK (i.e. IA received ACKs 3535, 3540) to indicate that they received the packets (i.e. IA transmissions 3525, 3530). STA1 3502a may discard the interference on the subspace spanned by the columns of $V_1$ and decode the rest of the subspace. STA2 3502b may discard the interference on the subspace spanned by the columns of $V_2$ and decode the rest of the subspace. ACKs may be transmitted on RUs different than the RUs used for IA transmission by considering an OFDM-based system.

Figure 36:
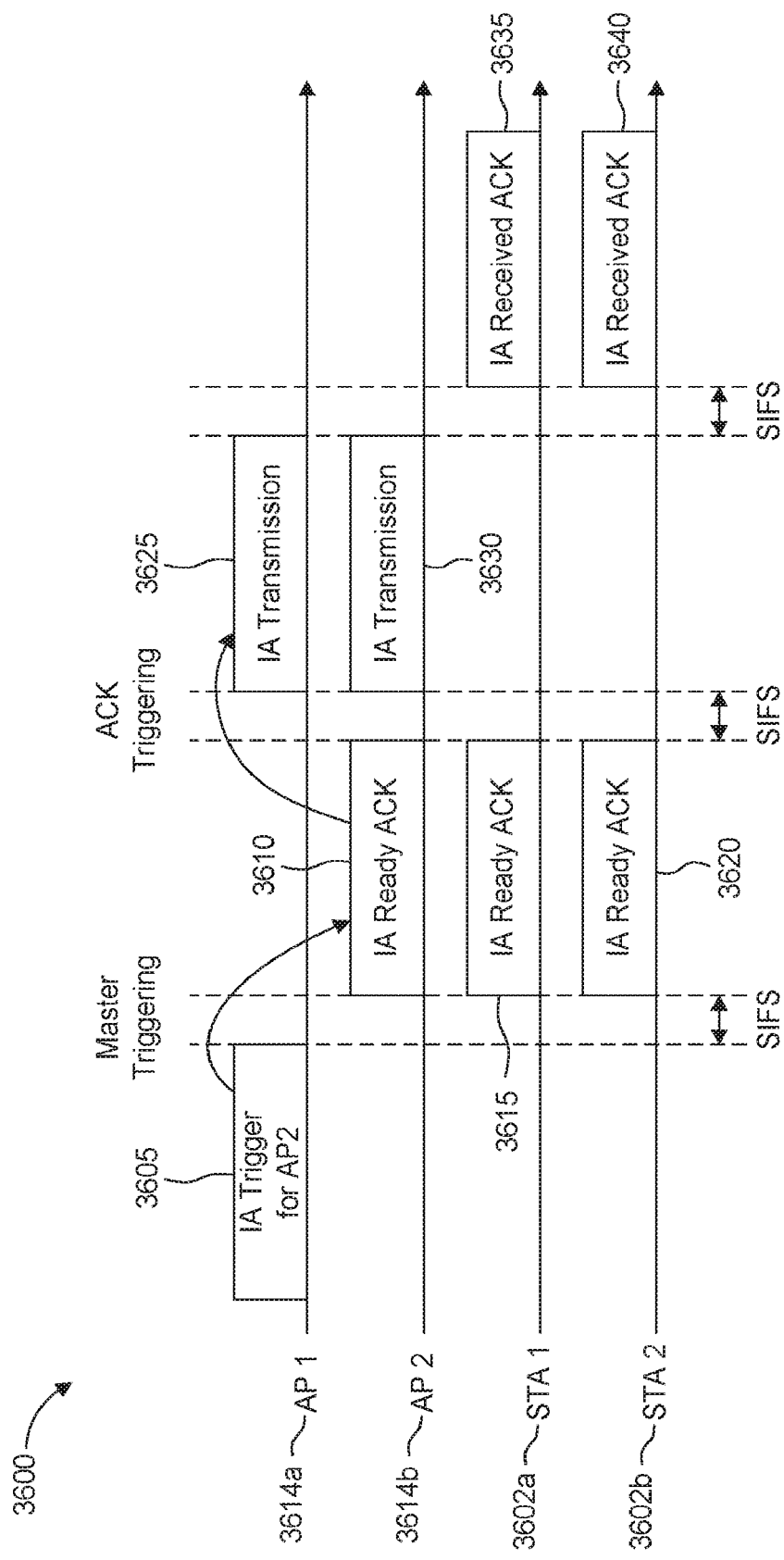
FIG. 36 is a diagram illustrating an example of pre-sounding-based master triggering.

FIG. 36 illustrates an example 3600 of pre-sounding-based master triggering, which may be used in combination of any of other embodiments described herein. As illustrated in FIG. 36, AP1 3614a transmits an IA trigger frame (IATF) 3605 for AP2 3614b to transmit and for STA1 3602a and STA2 3602b to receive with the IA scheme in the upcoming transmissions. AP2 3614b, STA1 3602a, and STA2 3602b may receive the IATF 3605 and understand that IA transmission will occur. AP2 3614b may determine that it will be part of the IA transmission in the upcoming transmission. AP2 3614b may use $V_2$ for STA2 3602b as it is triggered. In one example, the IATF 3605 may indicate the interference basis used at the STAs 3602a, 3602b. STA1 3602a and STA2 3602b may determine that they are the recipients. STA1 3602a and STA2 3602b may determine their interference bases as $V_1$ and $V_2$, respectively. AP2 3614b, STA1 3602a, and STA2 3602b may calibrate their carrier frequency to compensate the potential frequency mismatch among them.

AP2 3614b, STA1 3602a, and STA2 3602b may concurrently transmit ACK frames (i.e. IA ready ACKs 3610, 3615, 3620), which may indicate that they are ready for IA and trigger IA transmission. AP1 3614a may have M≥3 antennas. Hence, AP1 3614a may decode the ACKs (i.e. IA ready ACKs 3610, 3615, 3620) from 3 different transmitters, such as AP2 3614b, STA1 3602a, and STA2 3602b. AP1 3614a and AP2 3614b may precode and transmit the information (i.e. IA transmissions 3625, 3630) based on an IA scheme. STA1 3602a and STA2 3602b may transmit the ACKs (i.e. IA received ACKs 3635, 3640) to indicate that they received the packets (i.e. IA transmissions 3625, 3630). STA1 3602a may discard the interference on the subspace spanned by the columns of $V_1$ and decode the rest of the subspace. STA2 3602b may discard the interference on the subspace spanned by the columns of $V_2$ and decode the rest of the subspace. ACKs may be transmitted on RUs different than the RUs used for IA transmission by considering an OFDM-based system.

Embodiments for precoding for channel estimation field for interference alignment (IA) are described herein. In embodiments, in matrix form, the transmitted signals from AP1 and AP2 and the received signals at STA1 and STA2 may be expressed as:

$$t_1 = [H_{21}^{-1}V_2 \quad H_{11}^{-1}V_1]\begin{bmatrix}a_1\\b_1\end{bmatrix}$$

$$t_2 = [H_{22}^{-1}V_2 \quad H_{12}^{-1}V_1]\begin{bmatrix}a_2\\b_2\end{bmatrix},$$

$$r_1 = \underbrace{[H_{11}H_{21}^{-1}V_2 \quad H_{12}H_{22}^{-1}V_2 \quad V_1]}_{H_{sta_1}}\begin{bmatrix}a_1\\a_2\\b_1+b_2\end{bmatrix}$$

and $$r_2 = \underbrace{[H_{21}H_{11}^{-1}V_1 \quad H_{22}H_{12}^{-1}V_1 \quad V_2]}_{H_{sta_2}}\begin{bmatrix}b_1\\b_2\\a_1+a_2\end{bmatrix}$$

where $H_{sta1}$ and $H_{sta2}$ are the channel matrices that may be needed to decode the information. To enable the estimation of $H_{sta1}$ and $H_{sta2}$, the LTF may be expanded (e.g., multiple LTF transmission with different $a_1$, $a_2$, $b_1$, and $b_2$) considering the fact that the information symbols for one station do not come from the same AP in the IA scheme. In one embodiment, AP1 and AP2 may transmit multiple signals based on joint design, which may yield to the orthogonal channel estimation matrices at the receive sides. In other words, the transmission scheme at AP1 and AP2 may cause two orthogonal matrices when the signals reach to the receivers. For example, consider the following expansions:

$1^{st}$ transmission: $a_1=1_{M/3}$, $a_2=0_{M/3}$, $b_1=1_{M/3}$ and $b_2=0_{M/3}$, where $1_{M/3}$ and $0_{M/3}$ is an all one and zero column vectors of length M/3, respectively. This choice may lead to the following vectors at the STA1 and STA2, respectively:

$$\begin{bmatrix}a_1\\a_2\\b_1+b_2\end{bmatrix} = \begin{bmatrix}1_{M/3}\\0_{M/3}\\1_{M/3}\end{bmatrix}$$

and $$\begin{bmatrix}b_1\\b_2\\a_1+a_2\end{bmatrix} = \begin{bmatrix}1_{M/3}\\0_{M/3}\\1_{M/3}\end{bmatrix}$$

$2^{nd}$ transmission: $a_1=1_{M/3}$, $a_2=0_{M/3}$, $b_1=-1_{M/3}$, and $b_2=0_{M/3}$. This choice may lead to the following vectors at the STA1 and STA2, respectively:

$$\begin{bmatrix}a_1\\a_2\\b_1+b_2\end{bmatrix} = \begin{bmatrix}1_{M/3}\\0_{M/3}\\-1_{M/3}\end{bmatrix}$$

and $$\begin{bmatrix}b_1\\b_2\\a_1+a_2\end{bmatrix} = \begin{bmatrix}-1_{M/3}\\0_{M/3}\\1_{M/3}\end{bmatrix}$$

$3^{rd}$ transmission: $a_1=0_{M/3}$, $a_2=0_{M/3}$, $b_1=0_{M/3}$, and $b_2=\sqrt{2}\times 1_{M/3}$. This choice leads to the following vectors at the STA1 and STA2, respectively:

$$\begin{bmatrix}a_1\\a_2\\b_1+b_2\end{bmatrix} = \begin{bmatrix}0_{M/3}\\0_{M/3}\\\sqrt{2}\times 1_{M/3}\end{bmatrix}$$

and $$\begin{bmatrix}b_1\\b_2\\a_1+a_2\end{bmatrix} = \begin{bmatrix}0_{M/3}\\\sqrt{2}\times 1_{M/3}\\0_{M/3}\end{bmatrix}$$

At the end of $3^{rd}$ transmission, the information transmitted at AP1, AP2, STA1 and STA2, where each column is associated with different transmission instants ($a_1(i)$ is the ith transmission instant), may be given by:

$$P^{AP_1} = \begin{bmatrix} a_1(1) & a_1(2) & a_1(3) \\ b_1(1) & b_1(2) & b_1(3) \end{bmatrix} = \begin{bmatrix} 1_{M/3} & 1_{M/3} & 0_{M/3} \\ 1_{M/3} & -1_{M/3} & 0_{M/3} \end{bmatrix}$$

$$P^{AP_2} = \begin{bmatrix} a_2(1) & a_2(2) & a_2(3) \\ b_2(1) & b_2(2) & b_2(3) \end{bmatrix} = \begin{bmatrix} 0_{M/3} & 0_{M/3} & 0_{M/3} \\ 0_{M/3} & 0_{M/3} & \sqrt{2} \times 1_{M/3} \end{bmatrix}$$

$$P^{STA_1} = \begin{bmatrix} a_1(1) & a_1(2) & a_1(3) \\ a_2(1) & a_2(2) & a_2(3) \\ b_1(1)+b_2(1) & b_1(2)+b_2(2) & b_1(3)+b_2(3) \end{bmatrix} =$$

$$\begin{bmatrix} 1_{M/3} & 1_{M/3} & 0_{M/3} \\ 0_{M/3} & 0_{M/3} & 0_{M/3} \\ 1_{M/3} & -1_{M/3} & \sqrt{2} \times 1_{M/3} \end{bmatrix}$$

and $$P^{STA_2} = \begin{bmatrix} b_1(1) & b_1(2) & b_1(3) \\ b_2(1) & b_2(2) & b_2(3) \\ a_1(1)+a_2(1) & a_1(2)+a_2(2) & a_1(3)+a_2(3) \end{bmatrix} =$$

$$\begin{bmatrix} 1_{M/3} & 1_{M/3} & 0_{M/3} \\ 0_{M/3} & 0_{M/3} & \sqrt{2} \times 1_{M/3} \\ 1_{M/3} & -1_{M/3} & 0_{M/3} \end{bmatrix}.$$

While $p^{STA_2}$ may be an orthogonal matrix, $p^{STA_1}$ may not be an orthogonal matrix. Both STAs may estimate the channels $H_{sta_1}$ and $H_{sta_2}$. However, STA2's estimation may be more reliable than STA1's estimation since $P_{sta_1}$ is an orthogonal matrix. To be fair to both stations in terms of channel estimation, a $4^{th}$ transmission may occur:

4th transmission: $a_1=0_{M/3}$, $a_2=\sqrt{2}\times 1_{M/3}$, $b_1=0_{M/3}$, and $b_2=0_{M/3}$. This choice may lead to the following vectors at the STA1 and STA2, respectively:

$$\begin{bmatrix} a_1 \\ a_2 \\ b_1+b_2 \end{bmatrix} = \begin{bmatrix} 0_{M/3} \\ \sqrt{2} \times 1_{M/3} \\ 0_{M/3} \end{bmatrix}$$

and $$\begin{bmatrix} b_1 \\ b_2 \\ a_1+a_2 \end{bmatrix} = \begin{bmatrix} 0_{M/3} \\ 0_{M/3} \\ \sqrt{2} \times 1_{M/3} \end{bmatrix}$$

At the end of the $4^{th}$ transmission, the expansion matrices at AP1, AP2, STA1 and STA 2, where each column is associated with the transmission index, may be given by:

$$P^{AP_1} = \begin{bmatrix} 1_{M/3} & 1_{M/3} & 0_{M/3} & 0_{M/3} \\ 1_{M/3} & -1_{M/3} & 0_{M/3} & 0_{M/3} \end{bmatrix}$$

$$P^{AP_2} = \begin{bmatrix} 0_{M/3} & 0_{M/3} & 0_{M/3} & \sqrt{2} \times 1_{M/3} \\ 0_{M/3} & 0_{M/3} & \sqrt{2} \times 1_{M/3} & 0_{M/3} \end{bmatrix}$$

$$P^{STA_1} = \begin{bmatrix} 1_{M/3} & 1_{M/3} & 0_{M/3} & 0_{M/3} \\ 0_{M/3} & 0_{M/3} & 0_{M/3} & \sqrt{2} \times 1_{M/3} \\ 1_{M/3} & -1_{M/3} & \sqrt{2} \times 1_{M/3} & 0_{M/3} \end{bmatrix}$$

and $$P^{STA_2} = \begin{bmatrix} 1_{M/3} & 1_{M/3} & 0_{M/3} & 0_{M/3} \\ 0_{M/3} & 0_{M/3} & \sqrt{2} \times 1_{M/3} & 0_{M/3} \\ 1_{M/3} & -1_{M/3} & 0_{M/3} & \sqrt{2} \times 1_{M/3} \end{bmatrix}.$$

Since the $1^{st}$, $2^{nd}$ and $4^{th}$ transmissions may lead to an orthogonal matrix STA1's estimation, the channel estimation quality at STA1 may be improved.

Figure 37:
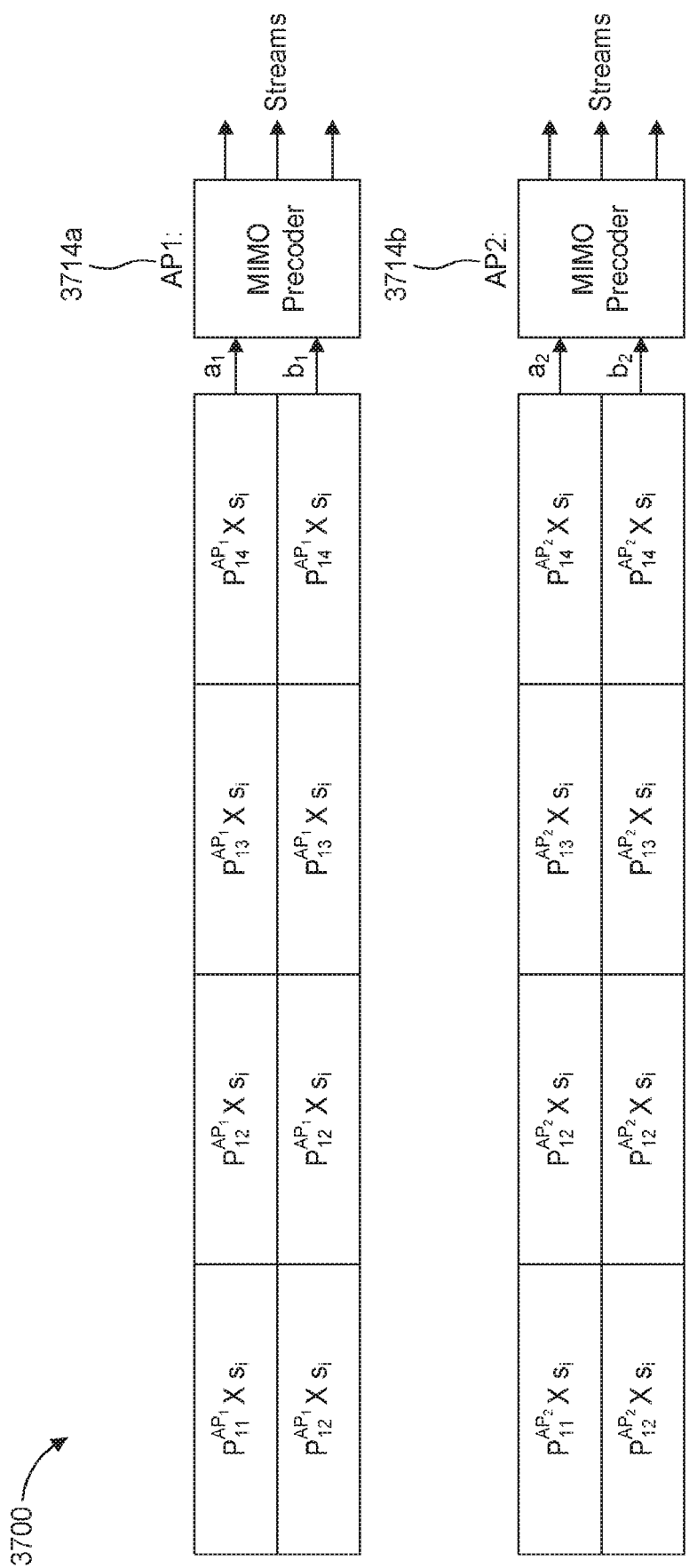
FIG. 37 is a diagram illustrating an example long training field (LTF) construction for AP1 and AP2 for interference alignment (IA)

FIG. 37 illustrates an example LTF construction 3700 for AP1 and AP2 for IA, which may be used in combination of any of other embodiments described herein. In the example illustrated in FIG. 37, s, is an element of the long training field (LTF) sequence (e.g., IEEE 802.11 legacy LTF), $P_{kl}^{AP_1}$ is an element of $P^{AP_1}$, and $P_{kl}^{AP_2}$ is an element of $P^{AP_2}$. To achieve similar power distribution at both AP1 3714a and AP2 3714b, the rows and columns $P^{AP_1}$ and $P^{AP_2}$ may alternate for different subcarriers and OFDM symbol indices.

In another example, AP1 and AP2 may share the row of a generic orthogonal expansion matrix. For example, assume that the generic expansion matrix P matrix is given by:

$$P = \begin{bmatrix} 1 & 1 & 1 & -1 \\ 1 & -1 & 1 & 1 \\ 1 & 1 & -1 & 1 \\ 1 & -1 & -1 & -1 \end{bmatrix}$$

$P^{AP_1}$ may be the first two rows of P matrix, and $P^{AP_1}$ may be the last two rows of P matrix. The matrices may only be about generating orthogonal streams, and the IA precoder may expand it to the antennas. In that case, STA1 may estimate $H_{sta_1}$ by using the rows of P associated with $a_1$, $a_2$ for the first and the second useful streams (e.g., the first row of P is for the first stream transmitted from AP1 and the third row of P is for the second stream transmitted from AP2), and one of the rows of P associated $b_1$ or $b_2$ for the interference subspace $V_1$. Similarly, the STA2 may estimate $H_{sta_2}$ by using the rows of P associated with $b_1$, $b_2$ for the first and the second useful streams (e.g., the second row of P is for the first stream transmitted from AP1 and the fourth row of P is for the second stream transmitted from AP2) and one of the rows of P associated $a_1$ or $a_2$ for the interference subspace $V_2$. As a numerical example, it is assumed that $r_{1,2,3,4}^{STA_1}$ and $r_{1,2,3,4}^{STA_2}$ are the observation vectors at STA 1 and STA 2 for one subcarrier for 4 OFDM symbols based on the aforementioned P matrix. $H_{sta_1}$ and $H_{sta_2}$ may be obtained as:

$$H_{sta_1} = \frac{1}{4}\begin{bmatrix} r_1^{STA_1} & r_2^{STA_1} & r_3^{STA_1} & r_4^{STA_1} \end{bmatrix} \begin{bmatrix} 1 & 1 & 1 & -1 \\ 1 & 1 & -1 & 1 \\ 1 & -1 & 1 & 1 \end{bmatrix}^H$$

$$H_{sta_2} = \frac{1}{4}\begin{bmatrix} r_1^{STA_1} & r_2^{STA_1} & r_3^{STA_1} & r_4^{STA_1} \end{bmatrix} \begin{bmatrix} 1 & -1 & 1 & 1 \\ 1 & -1 & -1 & -1 \\ 1 & 1 & 1 & -1 \end{bmatrix}^H$$

Embodiments for power enhanced implicit sounding are described herein. An AP may be able to transmit with higher power than the STA. With explicit sounding, the AP may transmit the sounding packet with relatively higher power as compared to the STA. The STA may perform channel estimation and then quantize the channel information and send it back to the AP. With implicit sounding, the STA may be able to transmit the sounding packet with a relatively lower power as compared to the AP, and the AP may perform channel estimation. The channel estimation based on the DL sounding frame may be more accurate than channel estimation based on the UL sounding frame due to the transmission power difference. Embodiments are described below that may compensate the transmission power difference between the AP and the STA.

To generalize, in the case that the device transmitting the NDP (either the AP or the STA) in the implicit channel acquisition is power limited, the device may autonomously modify its NDP transmission to improve the channel estimate or receive signaling from the receiver to modify its NDP transmission to improve the channel estimate. It may improve its channel estimate by one or more of the following methods restricting the bandwidth of the NDP (e.g., an RU) and boosting the power it transmits within the restricted bandwidth and changing the sounding duration (e.g., transmitting multiple repetitions of the NDP signal to increase the number of pilots/reference signals from which the channel is estimated).

For the case of UL sounding, in some embodiments, one or more STAs may transmit a UL sounding sequence in a narrower band (e.g., on a subset of subcarriers) so that the power density on each subcarrier may be increased when the total transmit power remains the same. This may be subject to a total power or power spectral density constraint. In some embodiments, the one or more STAs may transmit a UL sounding sequence with normal transmit power and power density. However, the UL sounding sequence may repeat several times in time domain so that the one or more APs may receive the sounding sequence with better SNR. The repetition of the sounding sequence may also be combined with changing the power spectral density of the signal transmitted.

Figure 38:
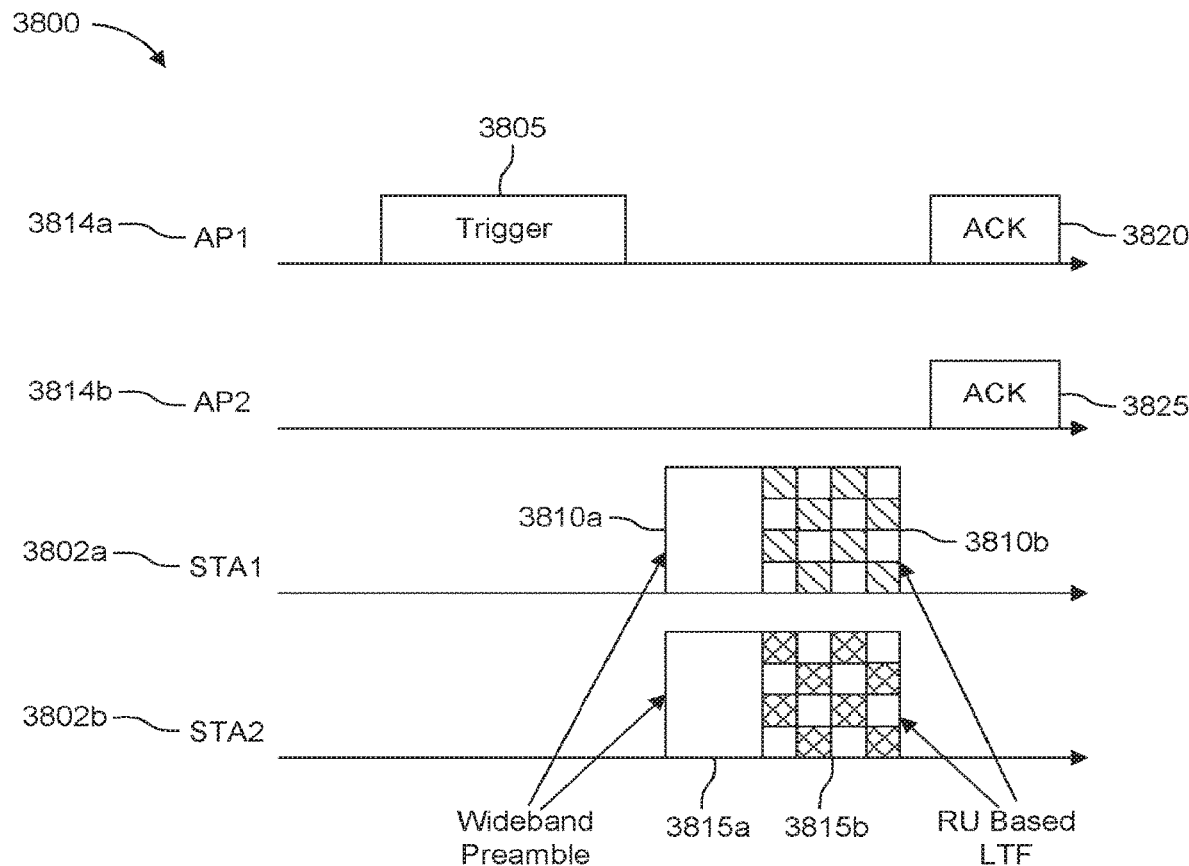
FIG. 38 is a diagram illustrating an example multiple AP implicit sounding procedure with a sounding frame.

FIG. 38 illustrates an example multiple AP implicit sounding procedure 3800 with a sounding frame, which may be used in combination of any of other embodiments described herein. As illustrated in FIG. 38, AP1 3814a may transmit a sounding trigger frame 3805 to the STAs 3802a, 3802b. Upon receiving the sounding trigger frame 3805, the STAs 3802a, 3802b may send sounding frames 3810, 3815 to the APs 3814a, 3814b. In the example illustrated in FIG. 38, a sounding frame 3810, 3815 may carry a wideband legacy preamble part 3810a, 3815a and an RU based LTF part 3810b, 3815b. The wideband preamble part 3810a, 3815a may carry L-STF, L-LTF, and L-SIG fields and additional SIG fields transmitted using legacy numerology. This wideband preamble part 3810a, 3815a may be transmitted normally using controlled power or maximum power. For the RU based LTF part 3810b, 3815b, the RU may be considered as a basic transmission unit. A STA may transmit one or more RU for LTF transmissions. Upon receiving the sounding frames 3810, 3815, the APs 3814a, 3814b may transmit ACK frames 3820, 3825 to the STAs 3802a, 3802b.

In some embodiments, the STA may transmit one or more RUs in one OFDM symbol. The RUs may be localized (e.g., adjacent to each other) or distributed. In some embodiments, the STA may allocate as much power as possible for the RUs. The STA may transmit more OFDM symbols for channel sounding. In some embodiments, the STA may transmit on the same set of RUs for all the OFDM symbols.

In one example, as illustrated in FIG. 38, the STAs 3802a, 3802b may transmit on the different set of RUs for all the OFDM symbols (e.g., as shown in FIG. 38, the STAs 3802a, 3802b may transmit on the same number of RUs but shift the RU locations). The RU allocation for each STA to transmit its sounding sequence may be indicated in the sounding trigger frame. The number of OFDM symbols to carry the sounding sequence may be indicated in the sounding trigger frame. In some embodiments, the STA transmitting the NDP may transmit multiple NDP frames with each frame on a different frequency resource or RU with the power and duration needed to ensure proper channel estimation quality on each resource. In some embodiments, the AP may signal the specific RUs and the order in which they are to be transmitted on. In one example, the AP may signal a starting RU and ending RU, and the STA transmitting the NDPs may transmit on the RUs in a predetermined order (e.g., consecutively) until the entire bandwidth is spanned.

If more than one STA may transmit concurrent UL sounding frames, the STA may be distinguished by P matrix or in the frequency domain. In some embodiments, the AP may signal multiple STAs to transmit their NDPs cycled in such a way that each STA spans its desired sounding BW and all STAs transmit on orthogonal resources.

To perform implicit channel sounding, an AP may need to be calibrated. In some embodiments, the AP may perform self-calibration so that it may not require non-AP STAs to estimate the channel and send CSI back.

Figure 39:
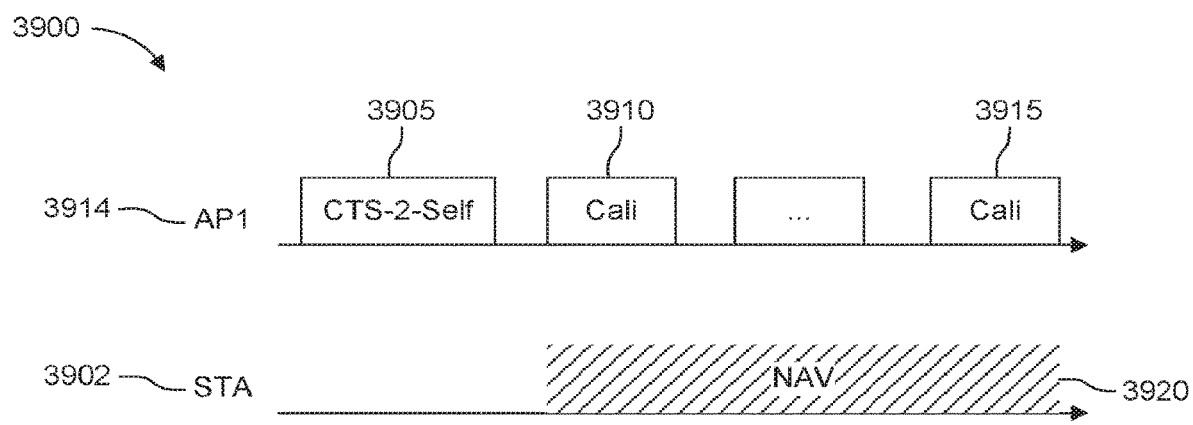
FIG. 39 is a diagram illustrating an example procedure for self-calibration.

FIG. 39 illustrates an example procedure 3900 for self-calibration, which may be used in combination of any of other embodiments described herein. The self-calibration may allow non-AP STAs (e.g., STA 3902) to know the duration of the self-calibration procedure so that the STAs may set NAV accordingly. In the example illustrated in FIG. 39, AP1 3914 may transmit a CTS-2-Self frame 3905 or other type of control/management frame with duration field set to cover the time used for self-calibration. Alternatively or additionally, AP1 3914 may transmit the self-calibration frames 3910, 3915 as part of an aggregated frame to multiple users (e.g., STA 3902), with the self-calibration sub-frame addressed to itself. For example, AP1 3914 may send the self-calibration frames 3910, 3915 to the STA 3902 while the STA 3902 is in NAV 3920.

The AP may transmit one or more self-calibration frames. In some embodiments, the self-calibration frame may be vendor defined and may not need to be understood by the other STAs in the system. In some embodiments, the self-calibration frame may use a Wi-Fi PPDU format so the other STAs may know they are Wi-Fi frames. At the end of calibration, the AP may transmit a TXOP end frame to indicate the completion of the self-calibration. As illustrated in FIG. 39, non-AP STAs (e.g., STA 3902) may check the CTS-2-self frame 3905 and set NAV 3920 accordingly. The STA may also enter power save mode if the AP is the serving AP for the STA.

Although features and elements are described herein considering IEEE 802.11 specific protocols, it may be understood that the solutions described herein are not restricted to this scenario and are applicable to other wireless systems as well.

Further, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, comprising:
  establishing, by a station (STA), a multi-access point (AP) communication session with a first AP and a second AP;

measuring, by the STA, parameters of a first communication received from the first AP and a second communication received from the second AP;

identifying, by the STA, membership of the STA in a communication group of a plurality of communication groups based on the measured parameters; and providing, by the STA, an identification of the membership of the STA in the communication group to each of the first AP and second AP.

2. The method of claim 1, wherein the first communication or the second communication comprises a null data packet (NDP) frame.

3. The method of claim 1, wherein the first communication and the second communication are received at the same time.

4. The method of claim 1, wherein the first communication and the second communication are received orthogonally or semi-orthogonally in time or frequency.

5. The method of claim 1, wherein measuring the parameters of the first communication and the second communication further comprises measuring a received signal strength of each of the first communication and the second communication.

6. The method of claim 5, further comprising determining whether a ratio of or a difference between the received signal strength from the first AP and the received signal strength from the second AP exceeds a threshold.

7. The method of claim 6, wherein identifying membership of the STA in the communication group further comprises identifying that the STA is associated with a group allowed to use a plurality of resource units associated with the first AP, responsive to the determined ratio or difference exceeding the threshold.

8. The method of claim 7, wherein identifying membership of the STA in the communication group further comprises identifying that the STA is not associated with a group allowed to use a plurality of resource units associated with the second AP, responsive to the determined ratio or difference exceeding the threshold.

9. The method of claim 7, wherein identifying membership of the STA in the communication group further comprises identifying that the STA is a cell center STA for the first AP, responsive to the determined ratio or difference exceeding the threshold.

10. A station (STA) comprising:
one or more transceivers configured to establish a multi-access point (AP) communication session with a first AP and a second AP; and
one or more processors configured to:
measure parameters of a first communication received from the first AP and a second communication received from the second AP, and
identify membership of the STA in a communication group of a plurality of communication groups based on the measured parameters; and
wherein the one or more transceivers are further configured to provide an identification of the membership of the STA in the communication group to each of the first AP and second AP.

11. The STA of claim 10, wherein the first communication or the second communication comprises a null data packet (NDP) frame.

12. The STA of claim 10, wherein the first communication and the second communication are received at the same time.

13. The STA of claim 10, wherein the first communication and the second communication are received orthogonally or semi-orthogonally in time or frequency.

14. The STA of claim 10, wherein the one or more processors are further configured to measure a received signal strength of each of the first communication and the second communication.

15. The STA of claim 14, wherein the one or more processors are further configured to determine whether a ratio of or a difference between the received signal strength from the first AP and the received signal strength from the second AP exceeds a threshold.

16. The STA of claim 15, wherein the one or more processors are further configured to identify that the STA is associated with a group allowed to use a plurality of resource units associated with the first AP, responsive to the determined ratio or difference exceeding the threshold.

17. The STA of claim 16, wherein the one or more processors are further configured to identify that the STA is not associated with a group allowed to use a plurality of resource units associated with the second AP, responsive to the determined ratio or difference exceeding the threshold.

18. The STA of claim 16, wherein the one or more processors are further configured to identify that the STA is a cell center station for the first AP, responsive to the determined ratio or difference exceeding the threshold.

19. A method for coordinated orthogonal frequency-division multiple access (OFDMA) transmission, the method comprising:
transmitting, by a first access point (AP) to a plurality of stations (STAs) engaged in a multi-AP communication session with the first AP and a second AP, a cell center/cell edge discovery communication;
receiving, by the first AP from each of the plurality of STAs, an identification of the respective STA as associated with a cell center or cell edge for the first AP; and
responsive to receipt of the identifications:
communicating, by the first AP, with one or more STAs associated with the cell center using a first group of resource units, and
communicating, by the first AP, with one or more STAs associated with the cell edge using a second group of resource units;
wherein a number of resource units of the first group exceeds a number of resource units of the second group.

20. The method of claim 19, wherein transmitting the cell center/cell edge discovery communication further comprises transmitting, by the first AP, the cell center/cell edge discovery communication orthogonally or semi-orthogonally in time or frequency with a cell center/cell edge discovery communication transmitted by the second AP.

* * * * *